(12) United States Patent
Sengoku

(10) Patent No.: US 9,672,176 B2
(45) Date of Patent: Jun. 6, 2017

(54) SLAVE IDENTIFIER SCANNING AND HOT-PLUG CAPABILITY OVER CCIE BUS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 14/511,165

(22) Filed: Oct. 9, 2014

(65) Prior Publication Data

US 2015/0100714 A1 Apr. 9, 2015

Related U.S. Application Data

(60) Provisional application No. 61/889,028, filed on Oct. 9, 2013.

(51) Int. Cl.
| | | |
|---|---|---|
| G06F 13/00 | (2006.01) | |
| G06F 13/36 | (2006.01) | |
| G06F 13/362 | (2006.01) | |
| G06F 13/40 | (2006.01) | |
| G06F 13/42 | (2006.01) | |

(52) U.S. Cl.
CPC .......... *G06F 13/362* (2013.01); *G06F 13/40* (2013.01); *G06F 13/4291* (2013.01)

(58) Field of Classification Search
None
See application file for complete search history.

(56) References Cited

U.S. PATENT DOCUMENTS

| | | | |
|---|---|---|---|
| 8,099,469 B2* | 1/2012 | Furtner | H04L 12/40019 709/208 |
| 2007/0294443 A1 | 12/2007 | Berenbaum et al. | |
| 2010/0131610 A1 | 5/2010 | Furtner et al. | |
| 2010/0306431 A1* | 12/2010 | Adkins | G06F 13/4291 710/110 |
| 2013/0132626 A1* | 5/2013 | Furlan | G06F 13/36 710/110 |
| 2014/0258576 A1* | 9/2014 | Maruyama | H04L 69/22 710/110 |

OTHER PUBLICATIONS

International Search Report and Written Opinion—PCT/US2014/059982—ISA/EPO—Mar. 5, 2015.

* cited by examiner

*Primary Examiner* — David E Martinez
(74) *Attorney, Agent, or Firm* — Loza & Loza LLP

(57) ABSTRACT

System, methods and apparatus are described that facilitate transmission of data, particularly between two or more devices within an electronic apparatus. Embodiments disclosed herein relate to scanning for slave identifiers (SIDs) on a CCIe bus. A disclosed method includes transmitting a first inquiry on a control data bus, where the first inquiry includes a first configuration of bits, determining presence of a slave device that has a slave identifier that includes a second configuration of bits that matches the first configuration of bits, and repetitively transmitting additional inquiries on the control data bus with different configurations of bits until all bits of the slave identifier are determined. The slave device may assert a response to each inquiry that includes a configuration of bits that matches a corresponding configuration of bits in the slave identifier.

28 Claims, 46 Drawing Sheets

| Ternary | Bits[19:0] | Address | Write | Read | 19 | 12 11 | 10 | 9 | 8 | 7 | 6 | 5 | 4 | 3 |
|---|---|---|---|---|---|---|---|---|---|---|---|---|---|---|
| 2222_2222_2222₃ | 0x81BF0 | | See FIG. 21 | | 1 | 1 1 | 1 | 1 | 1 | 1 | 1 | ? | ? | ? |
| 0x31 (49)↕ | 0x81BC0 | | | | | | | | | | | | | |
| 2222_2222_1012₃ | 0x81BBF | | | | 1 | 1 1 | 1 | 1 | 1 | 1 | 0 | x | x | x |
| 2222_2222_1011₃ | 0x81BBF | Master handover | | | | | | | | | | | | |
| [6-bits] 0x40 (64)↕ | 0x81B80 | | | | | | | | | | | | | |
| 2222_2221_1211₃ | 0x81B80 | | | | | | | | | | | | | |
| 2222_2221_1210₃ | 0x81B7F | | Reserved | Reserved | 1 | 1 1 | 1 | 1 | 1 | 0 | x | x | x | x |
| [7-bit] 0x80 (128)↕ | 0x81B00 | | | | | | | | | | | | | |
| 2222_2220_0002₃ | 0x81B00 | | | | | | | | | | | | | |
| 2222_2220_0001₃ | 0x81AFF | Reserved | | Reserved | 1 | 1 1 | 1 | 1 | 0 | x | x | x | x | x |
| [8-bits] 0x100 (256)↕ | 0x81A00 | | | | | | | | | | | | | |
| 2222_2202_2121₃ | 0x81A00 | | | | | | | | | | | | | |
| 2222_2202_2120₃ | 0x819FF | Reserved | Slave to slave grant | Slave to slave request | 1 | 1 1 | 0 | x | x | x | x | x | x | x |
| [9-bits] 0x200 (512)↕ | 0x81800 | | | | | | | | | | | | | |
| 2222_2112_1122₃ | 0x81800 | | | | | | | | | | | | | |
| 2222_2112_1121₃ | 0x817FF | CCIe register address | | Master bus request | 1 | 1 0 | x | x | x | x | x | x | x | x |
| [11-bits] 0x800 (2048)↕ | 0x81000 | | | | | | | | | | | | | |
| 2222_1121_0210₃ | 0x81000 | | | | | | | | | | | | | |
| 2222_1121_0202₃ | 0x80FFF | 8-bit CHK | 8-bit CHK | 8-bit CHK | 1 | 0 x | x | x | x | x | x | x | x | x |
| [12-bits] 0x1000 (4096)↕ | 0x80000 | | | | | | | | | | | | | |
| 2222_2201_2002₃ | 0x80000 | | | | | | | | | | | | | |
| 2221_2201_2001₃ | 0x7FFFF | 19-bit data region | | | 0 | x x | x | x | x | x | x | x | x | x |
| 0x80000 (524288)↕ | 0x00000 | | | | | | | | | | | | | |
| 0000_0000_0000₃ | | | | | | | | | | | | | | |

Bit[19] = 1 (bracket covering rows where Bits[19:0] ≥ 0x80000)

CCIe Bit19 mapping cont.

| Ternary | Bits[19:0] | Address | Write | Read | 19 | 12 | 11 | 9 | 8 | 7 | 6 | 5 | 4 | 3 | 2 | 1 | 0 |
|---|---|---|---|---|---|---|---|---|---|---|---|---|---|---|---|---|---|
| 2222_2222_2222₃ | 0x81BF0 | -SY- | | | | | | | | | | | | | | 0 | 0 |
| 2222_2222_2221₃ | 0x81BEF | | Prohibited | Prohibited | 1 | 1 | 1 | 1 | 1 | 1 | 1 | 1 | 1 | 1 | 0 | 1 | 0 |
| 0x2A (42) ↕ | | | | | | | | | | | | | | | | | |
| 2222_2222_1102₃ | 0x81BC6 | | | | | | | | | | | | | | | | |
| 2222_2222_1101₃ | 0x81BC5 | Heartbeat ♥ /-NC.↑ | | Prohibited | 1 | 1 | 1 | 1 | 1 | 1 | 1 | 0 | 0 | 0 | 1 | 0 | 1 |
| 2222_2222_1100₃ | 0x81BC4 | | Prohibited | | | | | | | | | | | | | | |
| 0x2A (42) ↕ | | | | | | | | | | | | | | | | | |
| 2222_2222_1000₃ | 0x81BBB | | | | | | | | | | | | | | | | |
| 2222_2222_0222₃ | 0x81BBA | Reserved | | Reserved | 1 | 1 | 1 | 1 | 1 | 1 | 0 | 1 | 1 | 1 | 0 | 1 | 0 |
| 2222_2222_0221₃ | 0x81BB9 | Reserved | | Reserved | 1 | 1 | 1 | 1 | 1 | 1 | 0 | 1 | 1 | 1 | 0 | 0 | 1 |
| 2222_2222_0220₃ | 0x81BB8 | Reserved | | Reserved | 1 | 1 | 1 | 1 | 1 | 1 | 0 | 1 | 1 | 1 | 0 | 0 | 0 |
| 2222_2222_0212₃ | 0x81BB7 | | | | 1 | 1 | 1 | 1 | 1 | 1 | 0 | 1 | 1 | 0 | x | x | x |
| [3-bits] 0x8 (8) ↕ | | | | | | | | | | | | | | | | | |
| 2222_2222_0121₃ | 0x81BB0 | Reserved | | Reserved | 1 | 1 | 1 | 1 | 1 | 1 | 0 | 1 | 1 | x | x | x | x |
| 2222_2222_0120₃ | 0x81BAF | | | | | | | | | | | | | | | | |
| [4-bits] 0x10 (16) ↕ | | | | | | | | | | | | | | | | | |
| 2222_2222_0000₃ | 0x81BA0 | | | | 1 | 1 | 1 | 1 | 1 | 1 | 0 | 1 | 0 | x | x | x | x |
| 2222_2221_2223₃ | 0x81B9F | | Prohibited | | | | | | | | | | | | | | |
| 0x10 (16) ↕ | | | | | | | | | | | | | | | | | |
| 2222_2221_2102₃ | 0x81B90 | | | | | | | | | | | | | | | | |
| 2222_2221_2101₃ | 0x81B8F | Prohibited | SID scan resp | Prohibited | 1 | 1 | 1 | 1 | 1 | 1 | 1 | 0 | 0 | 0 | 1 | 0 | 0 |
| 2222_2221_2100₃ | 0x81B8E | | Prohibited | | | | | | | | | | | | | | |
| 0xA (10) ↕ | | | | | | | | | | | | | | | | | |
| 2222_2221_2000₃ | 0x81B85 | | | | | | | | | | | | | | | | |
| 2222_2221_1222₃ | 0x81B84 | Reserved | | Reserved | 1 | 1 | 1 | 1 | 1 | 1 | 1 | 0 | 0 | 0 | 0 | 0 | 0 |
| 2222_2221_1221₃ | 0x81B83 | | | | | | | | | | | | | | | | |
| [2-bits] 0x4 (4) ↕ | | | | | | | | | | | | | | | | | |
| 2222_2221_1211₃ | 0x81B80 | | | | 1 | 1 | 1 | 1 | 1 | 1 | 1 | 0 | 0 | 0 | 0 | x | x |

1. Inquiry SID[0]=0 (SID[15:1] masked)
   - If responded by at least one slave device
     1. Inquiry SID[1]=0 (SID[15:2] masked)
        - If responded by at least one slave device
          1. Inquiry SID[2]=0 (SID[15:3] masked)
          ...
          2. Inquiry SID[2]=1
        - If no response, complete SID[1]=0 inquiry
     2. Inquiry SID[1]=1
        - If responded at least one slave device
          1. Inquiry SID[2]=0 (SID[15:3] masked)
          ...
          2. Inquiry SID[2]=1
        - If no response, complete SID[0]=0 inquiry
2. Inquiry SID[0]=1
   - If responded by at least one slave device
     - Inquiry SID[1]=0
   - If no response, complete SID[0]=1 inquiry

*FIG. 23*

SLAVE IDENTIFIER SCANNING AND HOT-PLUG CAPABILITY OVER CCIE BUS

CROSS-REFERENCE TO RELATED APPLICATIONS

This application claims priority to and the benefit of U.S. provisional patent application No. 61/889,028 filed Oct. 9, 2013, the entire content of which being incorporated herein by reference.

FIELD

The present disclosure pertains to enabling efficient operations over a shared bus and, more particularly, to techniques to efficiently identify slave devices coupled to the shared bus and facilitate hot-plugging of devices to the shared bus.

BACKGROUND

I2C (also referred to as I²C) is a multi-master serial single-ended bus used for attaching low-speed peripherals to a motherboard, embedded system, cellphone, or other electronic devices. The I2C bus includes a clock (SCL) and data (SDA) lines with 7-bit addressing. The bus has two roles for devices/nodes: master and slave. A master device is a device that generates the clock and initiates communication with slave devices. A slave device is a device that receives the clock and responds when addressed by the master. The I2C bus is a multi-master bus which means any number of master devices can be present. Additionally, master and slave roles may be changed between messages (after a STOP is sent). I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave devices). In one example, the CCI protocol may be implemented over an I2C serial bus between the image sensor and the baseband processor.

There is a need for techniques that allow the master device to identify slave devices and/or other devices coupled to the shared bus.

SUMMARY

Embodiments disclosed herein provide systems, methods and apparatus for data communications. In particular, certain aspects of the disclosure relate to scanning for slave identifiers (SIDs) on a CCIe bus.

In certain aspects of the disclosure, a method for scanning for SIDs includes transmitting a first inquiry on a control data bus, where the first inquiry includes a first configuration of bits, determining a presence of a slave device that has a slave identifier that includes a second configuration of bits that matches the first configuration of bits, and repetitively transmitting additional inquiries on the control data bus with different configurations of bits until all bits of the slave identifier are determined. The slave device may assert a response to each inquiry that includes a configuration of bits that matches a corresponding configuration of bits in the slave identifier.

In one aspect, the slave device identifies a match between the first configuration of bits and the second configuration of bits by comparing a word transmitted in the first inquiry with a copy of the slave identifier that has been masked by applying a mask transmitted in the first inquiry.

In another aspect, the additional inquiries may include a second inquiry. The method may further include modifying the mask to obtain a modified mask that exposes an additional bit of the slave identifier for comparison, and transmitting the second inquiry on the control data bus. The second inquiry may include the first configuration of bits and the modified mask.

In another aspect, the additional inquiries may include a third inquiry that is transmitted when no response to a preceding inquiry is received. The method may further include modifying the first configuration of bits to obtain a third configuration of bits by toggling a value of an effective most significant bit (MSB) of the first configuration of bits, where the effective MSB is defined as a bit corresponding to a highest value bit that is not suppressed in the slave identifier by application of the mask transmitted in the preceding inquiry, modifying the mask to obtain a modified mask that exposes an additional bit of the slave identifier for comparison, and transmitting the third inquiry on the control data bus. The third inquiry may include the third configuration of bits and the mask transmitted in the preceding inquiry.

In another aspect, the additional inquiries include a fourth inquiry that is transmitted after all bits of the slave identifier have been determined. The method may further include restoring the mask to obtain a restored mask having a value that was transmitted in a prior inquiry that caused at least one slave device to assert the response, modifying the configuration of bits transmitted in the prior inquiry to obtain a fourth configuration of bits, and transmitting the fourth inquiry on the control data bus. The fourth inquiry includes the fourth configuration of bits and the restored mask. A different slave device may respond to the fourth inquiry. The different slave device may assert the response when the fourth configuration of bits matches a corresponding configuration of bits in a different slave identifier that is associated with the different slave device.

In another aspect, a plurality of slave devices responds to the first inquiry. The plurality of slave devices may assert the same response when the first configuration of bits matches corresponding configurations of bits in respective slave identifiers of the plurality of slave devices. The response may be asserted using a first line of the control data bus.

In another aspect, the control data bus is a two-line bus. Both lines of the two-line bus may be used to transfer the first inquiry.

In another aspect, and after all bits of the slave identifier are determined, the method further includes repetitively transmitting additional inquiries on the control data bus with different configurations of bits until all slave identifiers for all slave devices coupled to the control data bus have been determined.

In another aspect, the first inquiry is directed to all slave devices coupled to the control data bus. The first inquiry may be directed to slave devices coupled to the control data bus that have not been previously identified. The first inquiry may define a response period in which the slave device must respond over the control data bus if there is a match between the second configuration of bits and the first configuration of bits. The response may be asserted by the slave device momentarily pulling down a first line of the control data bus if there is a match between the second configuration of bits and the first configuration of bits. Other devices coupled to the control data bus mask their input to the first line of the control data bus during a response period.

In certain aspects of the disclosure, a device adapted to scan for SIDs includes a slave device coupled to a control data bus, a master device coupled to the control data bus and adapted to manage communications on the control data bus. The master device may be configured to transmit a first inquiry on a control data bus, where the first inquiry includes a first configuration of bits, determine presence of a slave device that has a slave identifier that includes a second configuration of bits that matches the first configuration of bits, and repetitively transit additional inquiries on the control data bus with different configurations of bits until all bits of the slave identifier are determined. The slave device may assert a response to each inquiry that includes a configuration of bits that matches a corresponding configuration of bits in the slave identifier.

In certain aspects of the disclosure, a device adapted to scan for SIDs includes means for transmitting a first inquiry on a control data bus, where the first inquiry includes a first configuration of bits, and means for determining presence of a slave device that has a slave identifier that includes a second configuration of bits that matches the first configuration of bits. The means for transmitting may be configured to repetitively transmit additional inquiries on the control data bus with different configurations of bits until all bits of the slave identifier are determined. The slave device may assert a response to each inquiry that includes a configuration of bits that matches a corresponding configuration of bits in the slave identifier. The slave device may identify a match between the first configuration of bits and the second configuration of bits by comparing a word transmitted in the first inquiry with a copy of the slave identifier that has been masked by applying a mask transmitted in the first inquiry.

In certain aspects of the disclosure, a machine-readable storage medium has one or more instructions stored thereon. The one or more instructions, when executed by at least one processor may cause the at least one processor to scan for SIDs by transmitting a first inquiry on a control data bus, where the first inquiry includes a first configuration of bits, determining presence of a slave device that has a slave identifier that includes a second configuration of bits that matches the first configuration of bits, and repetitively transmitting additional inquiries on the control data bus with different configurations of bits until all bits of the slave identifier are determined. The slave device may assert a response to each inquiry that includes a configuration of bits that matches a corresponding configuration of bits in the slave identifier. The slave device may identify a match between the first configuration of bits and the second configuration of bits by comparing a word transmitted in the first inquiry with a copy of the slave identifier that has been masked by applying a mask transmitted in the first inquiry.

DRAWINGS

Various features, nature, and advantages may become apparent from the detailed description set forth below when taken in conjunction with the drawings in which like reference characters identify correspondingly throughout.

Figure 10:
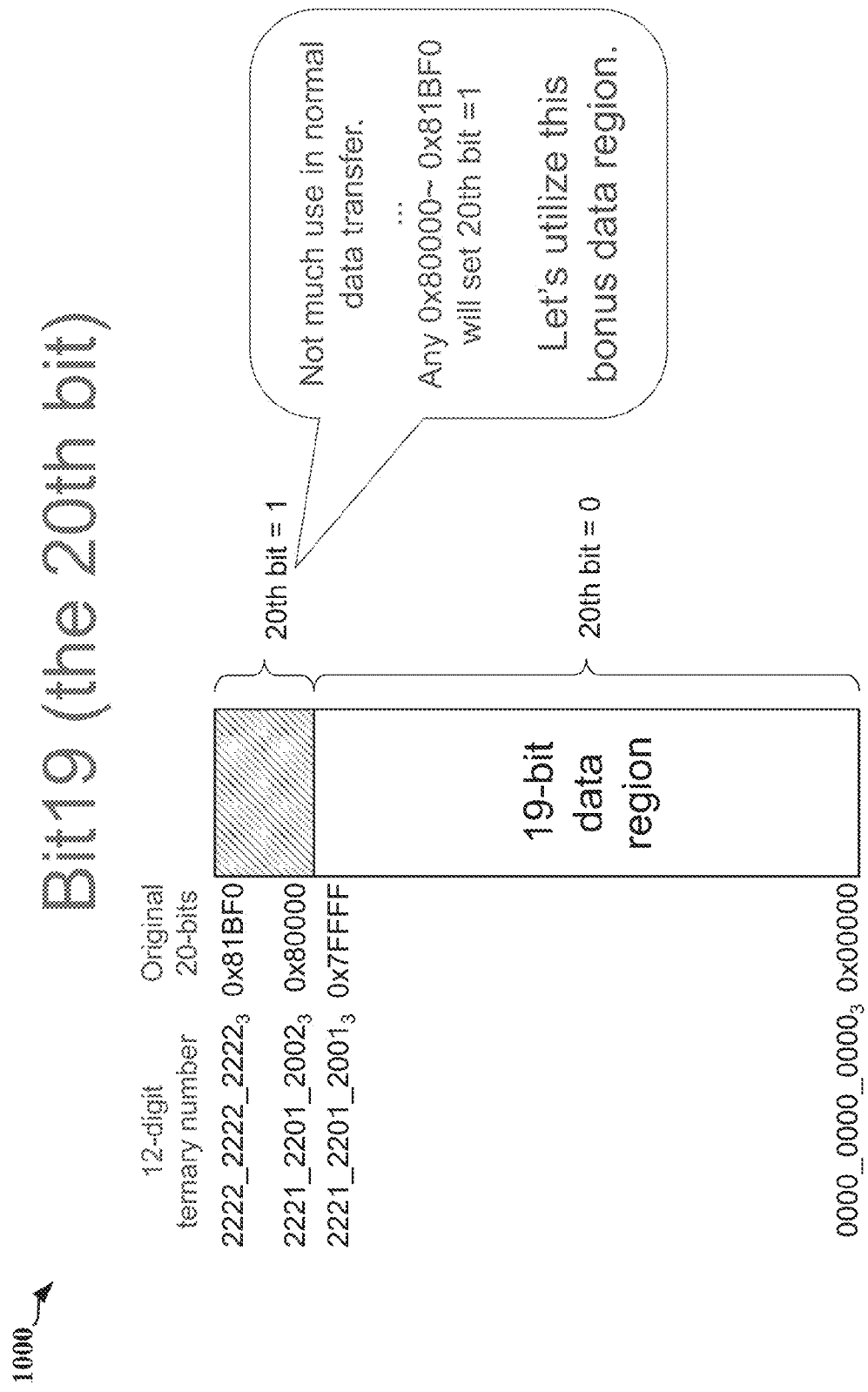

FIG. 10 conceptually illustrates a bit 19 (i.e., the $20^{th}$ bit when the bit count starts at the first bit being bit 0) is mostly unused in the CCIe protocol and may be used for commands between devices on the shared bus.

Figure 11:
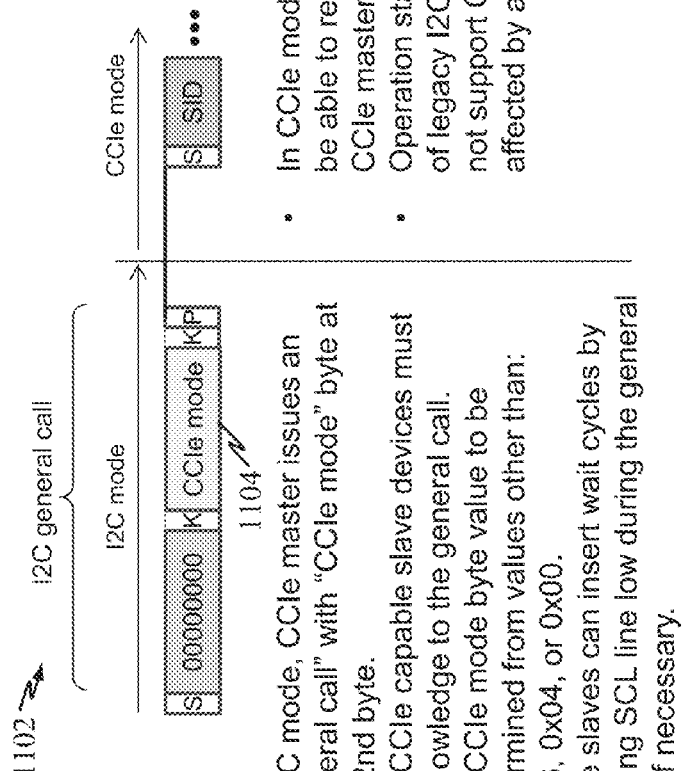

FIG. 11 illustrates an exemplary general call for CCIe mode entry indicator that may be sent by a master device over a shared bus to indicate to slave devices that the shared bus is switching to operate from I2C mode to CCIe mode.

Figure 12:
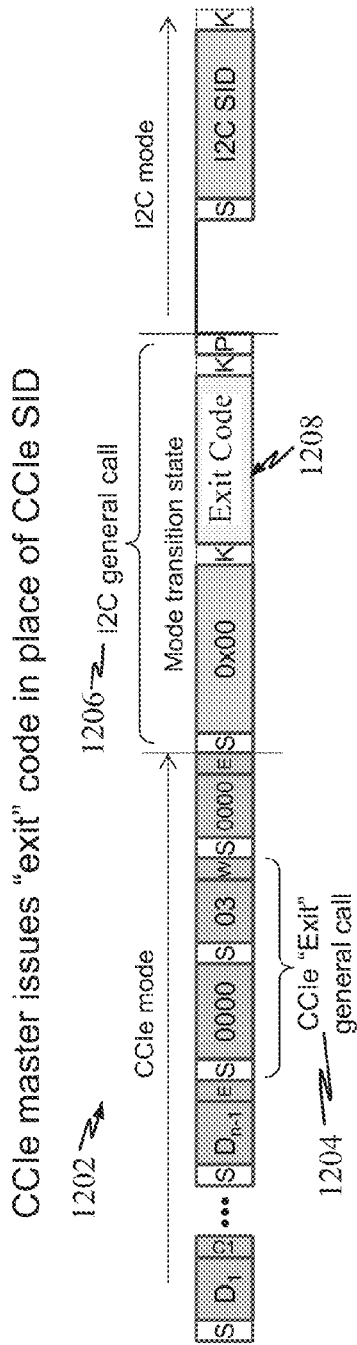

FIG. 12 illustrates an exemplary CCIe call that may be issued by a CCIe master device (e.g., master device in FIG. 1 while in I2C mode) to indicate a transition from CCIe mode to I2C mode to all CCIe able devices.

Figure 13:
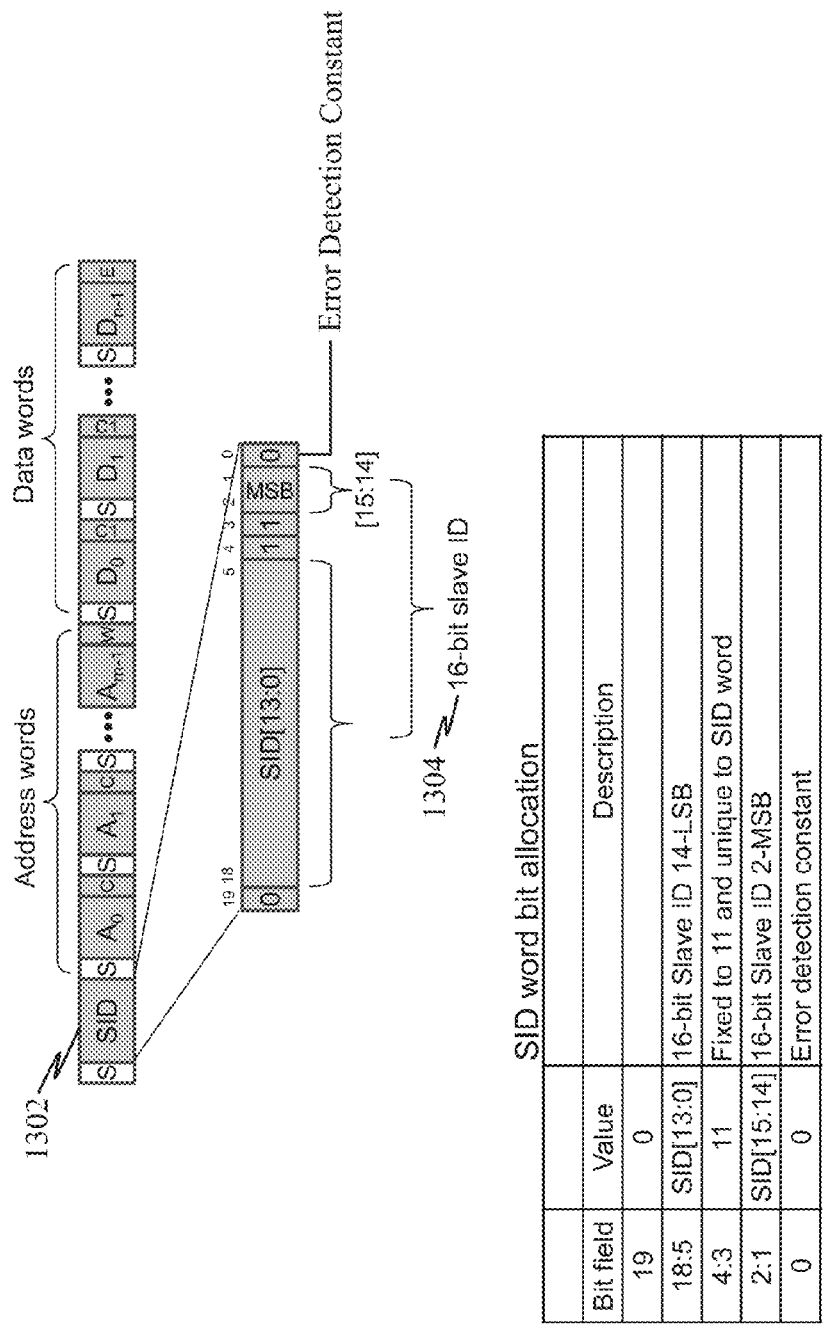

FIG. 13 illustrates an exemplary CCIe slave identifier (SID) word format. This illustrates the use of a 16-bit slave identifier (SID) as part of the CCIe SID word format.

Figure 14:
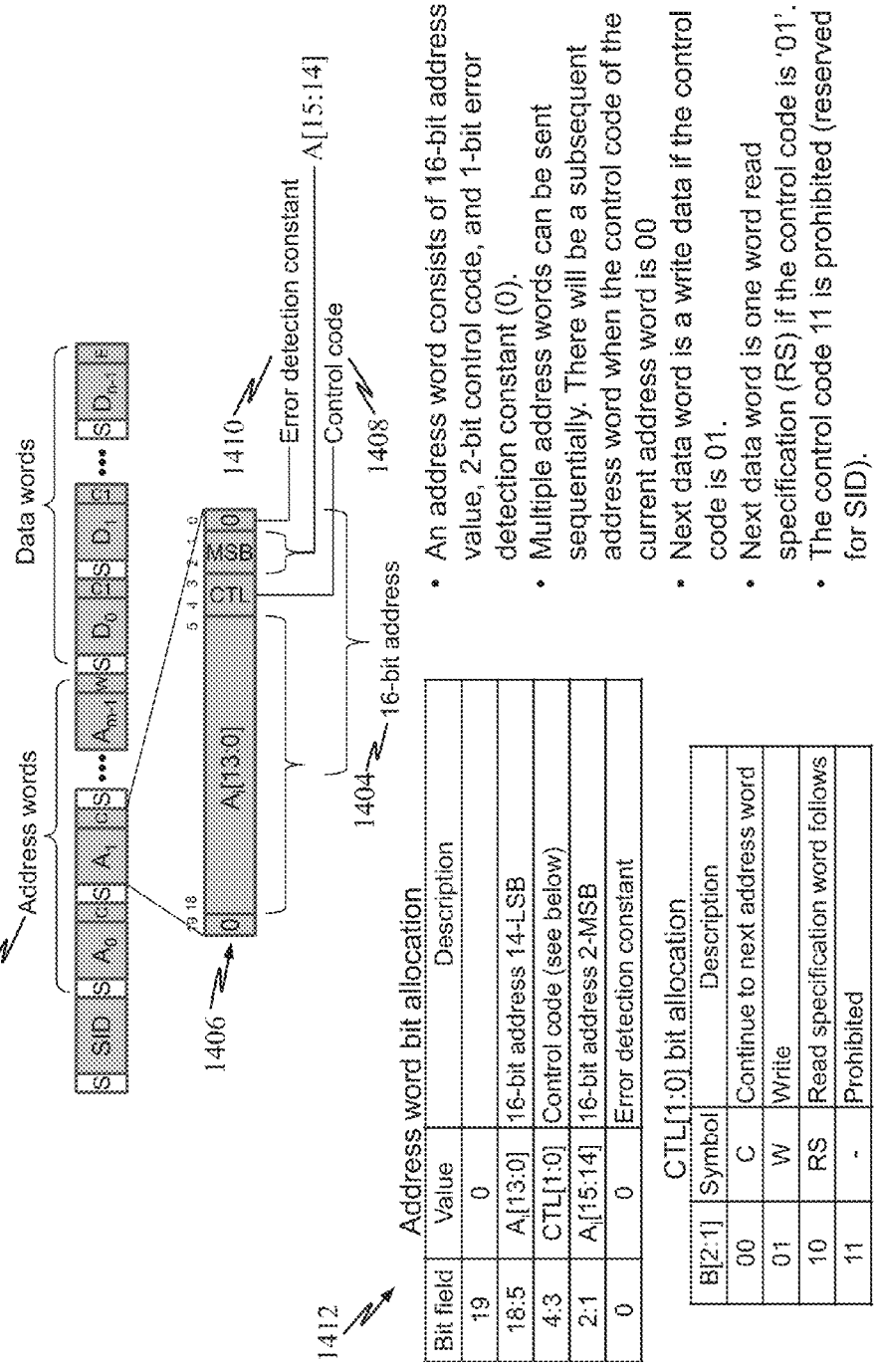

FIG. 14 illustrates an exemplary CCIe address word format.

Figure 15:
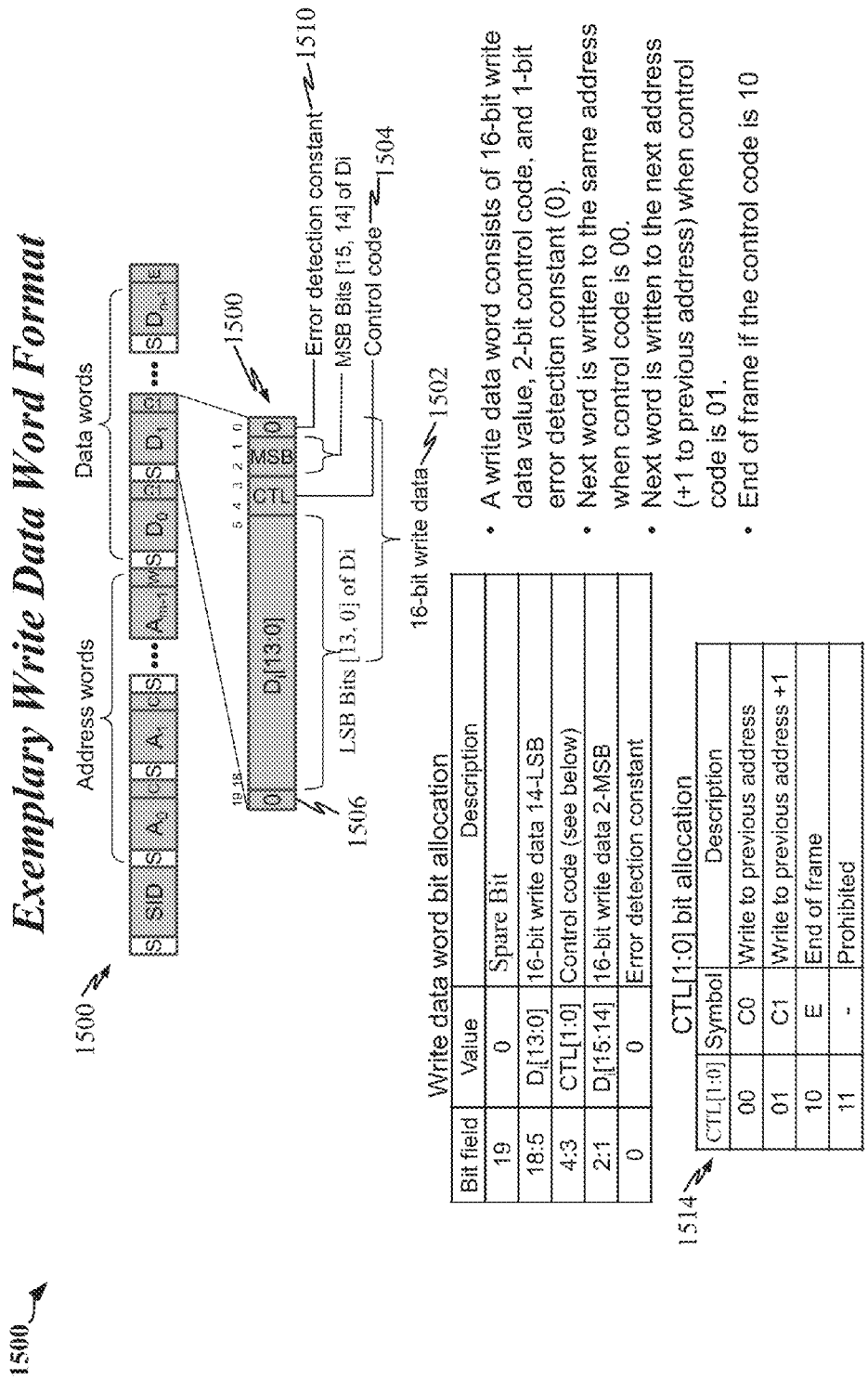

FIG. 15 illustrates an exemplary write data word format.

Figure 16:
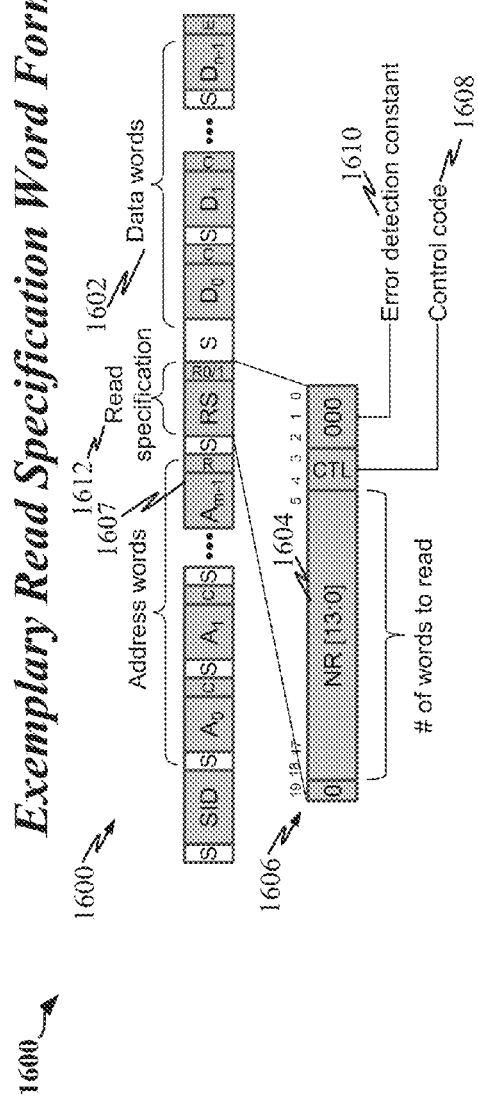

FIG. 16 illustrates an exemplary read specification word format.

Figure 17:
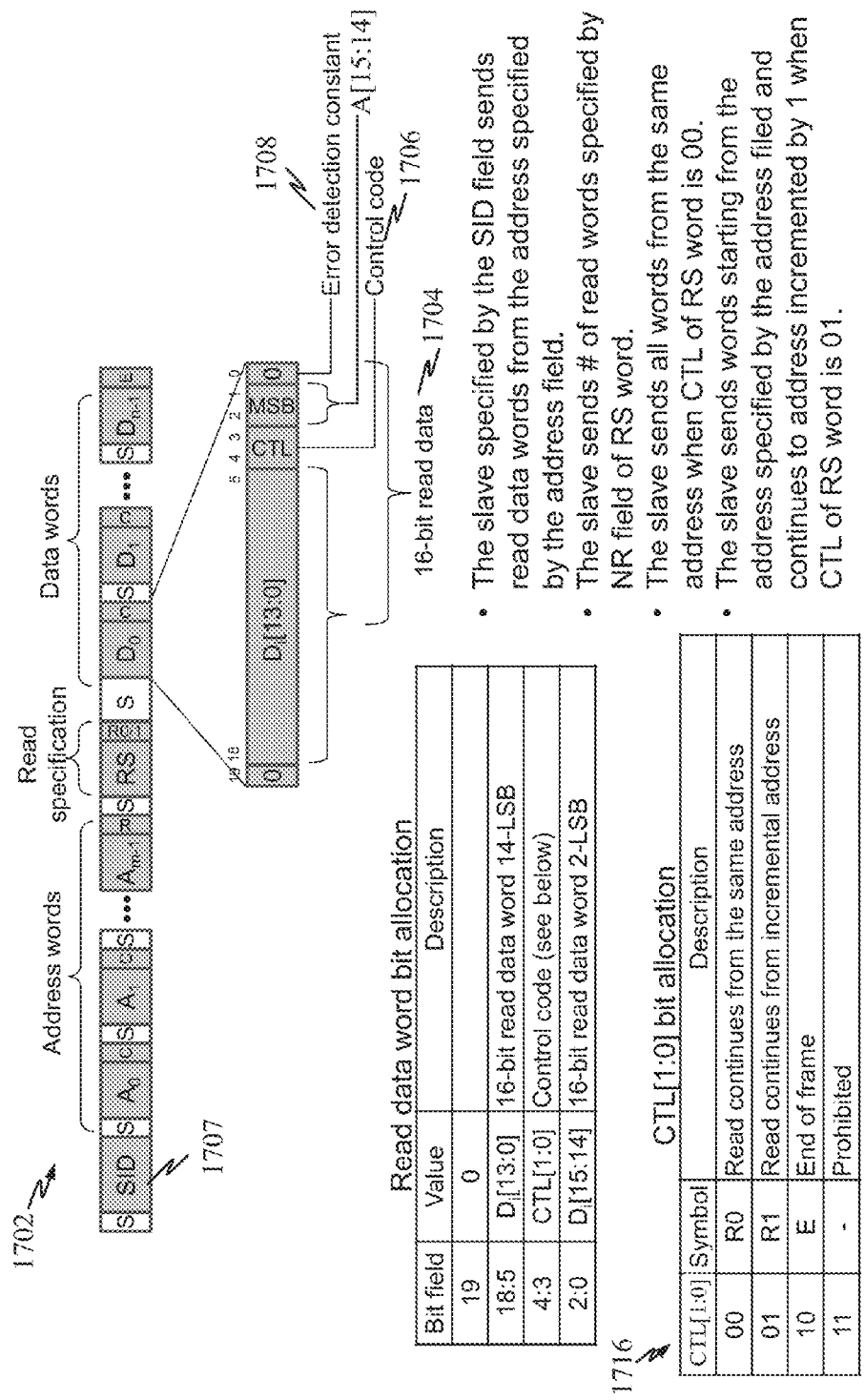

FIG. 17 illustrates an exemplary read data word format.

Figure 18:
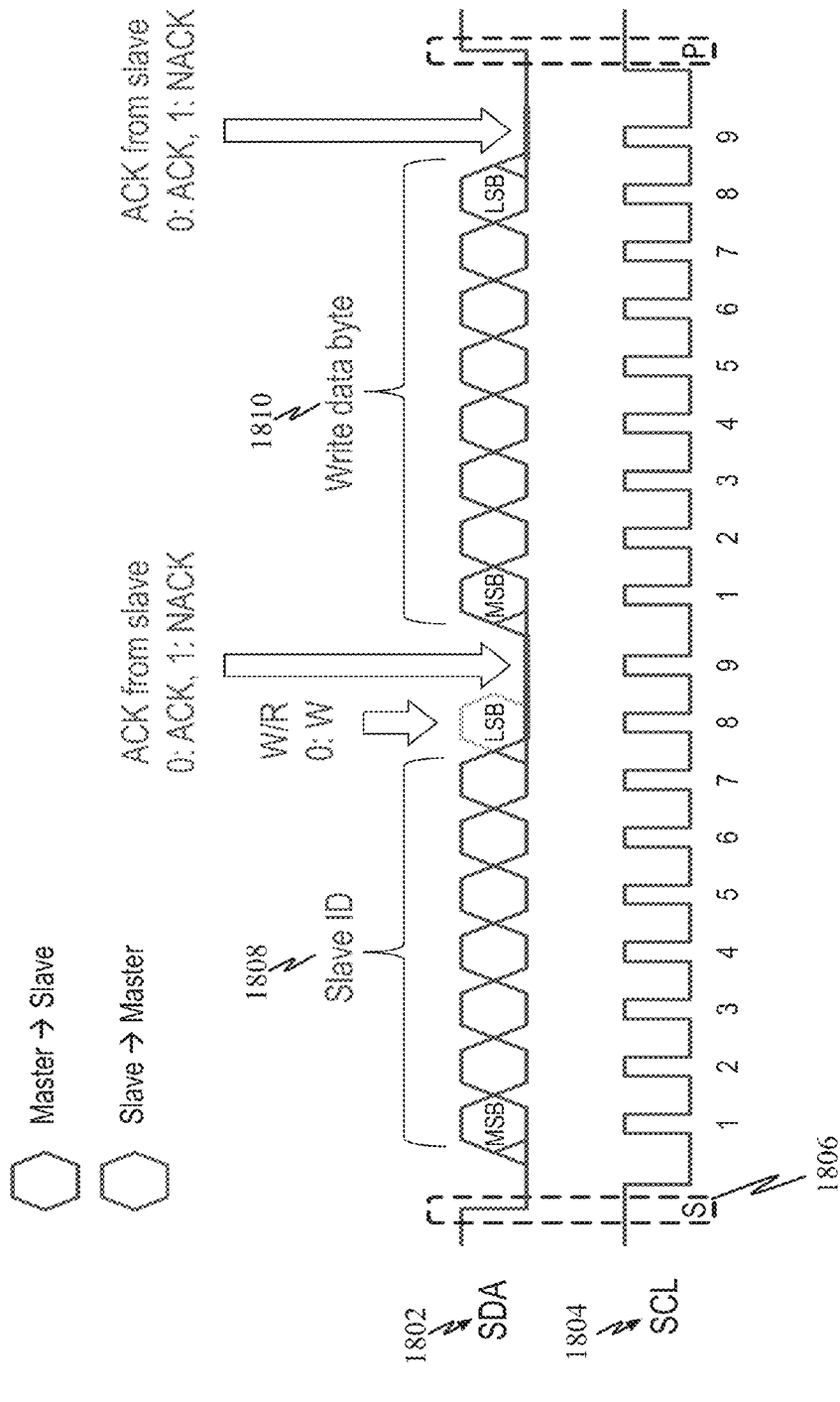

FIG. 18 illustrates an exemplary timing diagram of an I2C one byte write data operation.

Figure 19:
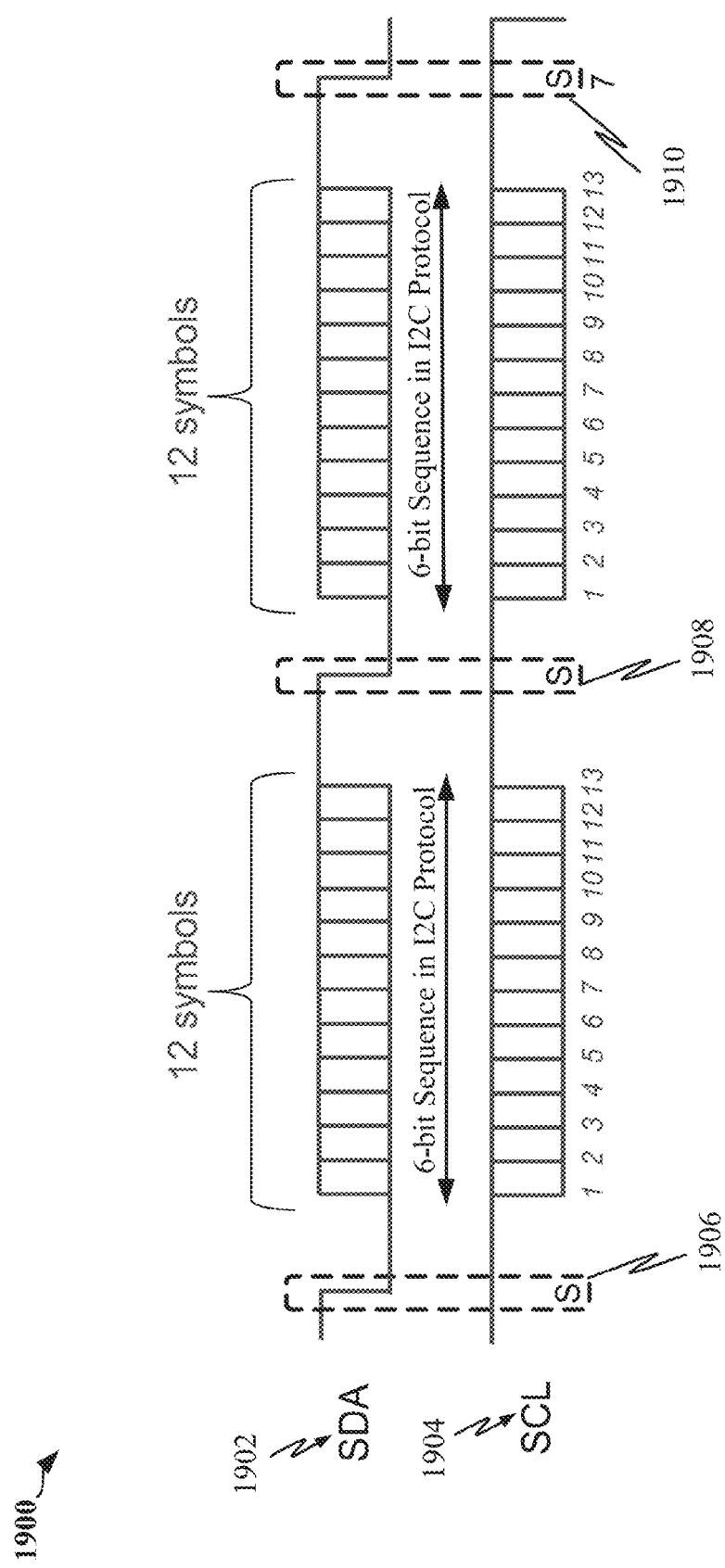

FIG. 19 illustrates an exemplary CCIe transmission in which data bits have be transcoded into twelve symbols for transmission over the SDA line and the SCL line.

FIG. 20 illustrates an exemplary mapping of the $20^{th}$ bit (bit 19) resulting from the encoding scheme illustrated in FIGS. 2-10.

FIG. 21 illustrates details of a sub-region within the exemplary mapping of the $20^{th}$ bit (bit 19) region of FIG. 20.

Figure 22:
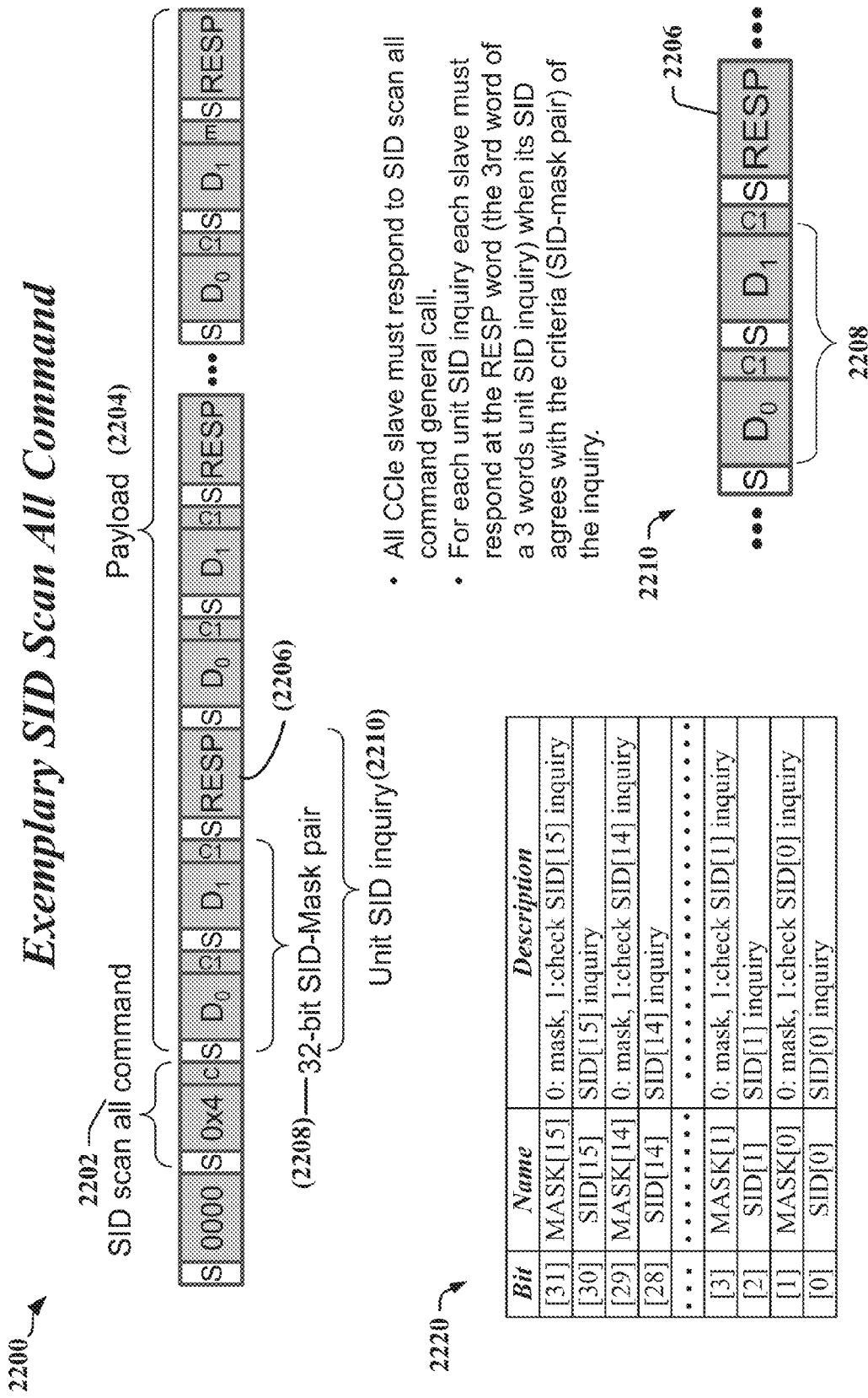

FIG. 22 illustrates one example of an "SID Scan All" command that may be issued by a master device in accordance with certain aspects disclosed herein.

FIG. 23 illustrates an example of an algorithm that may be used to scan for SIDs in accordance with certain aspects disclosed herein.

Figure 24:
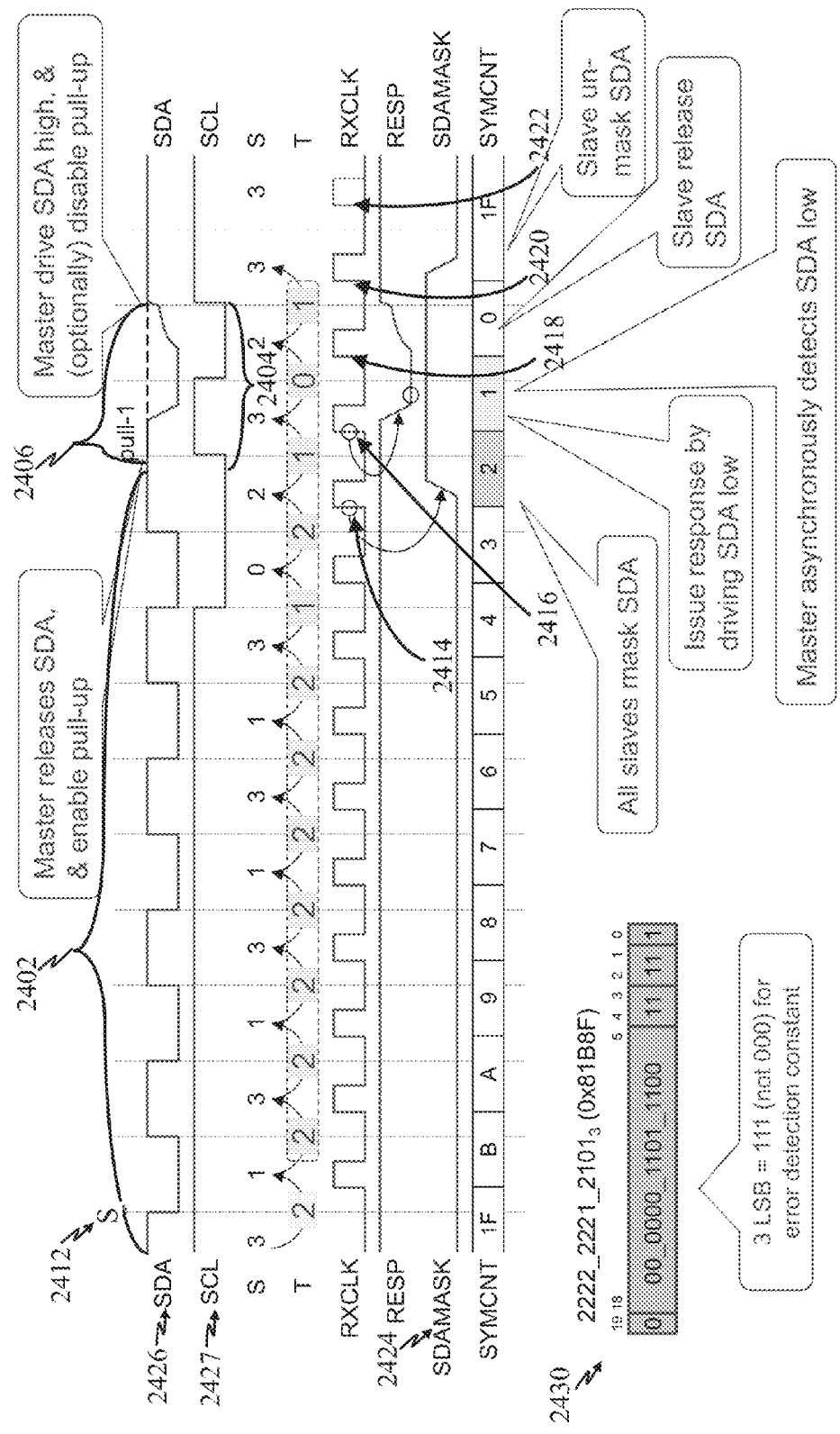

FIG. 24 illustrates a timing diagram for an SID Scan over a shared bus comprising an SDA line and a SCL line.

Figure 25:
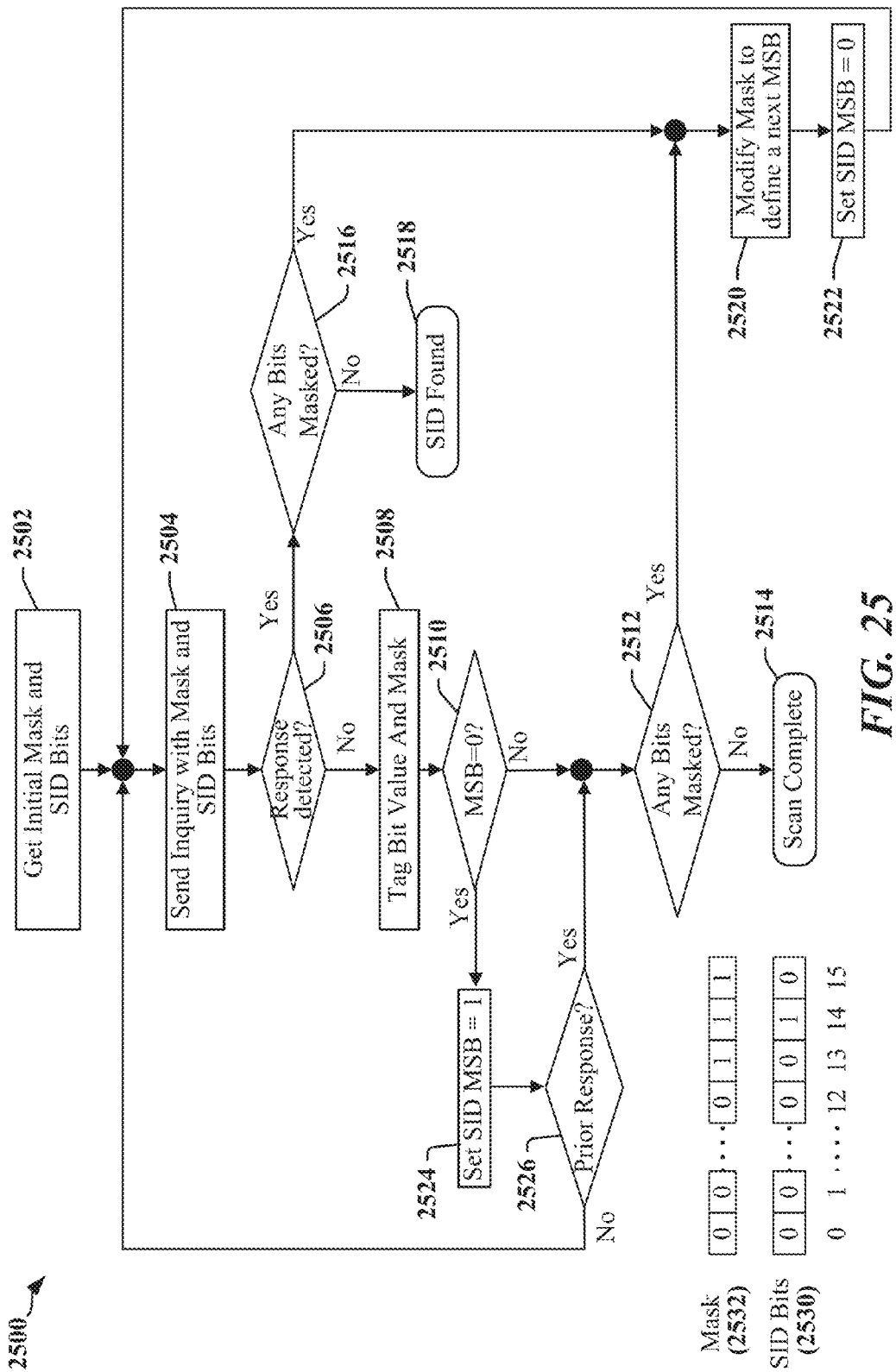

FIG. 25 illustrates an example of various steps of an SID scan performed in accordance with certain aspects disclosed herein.

Figure 26:
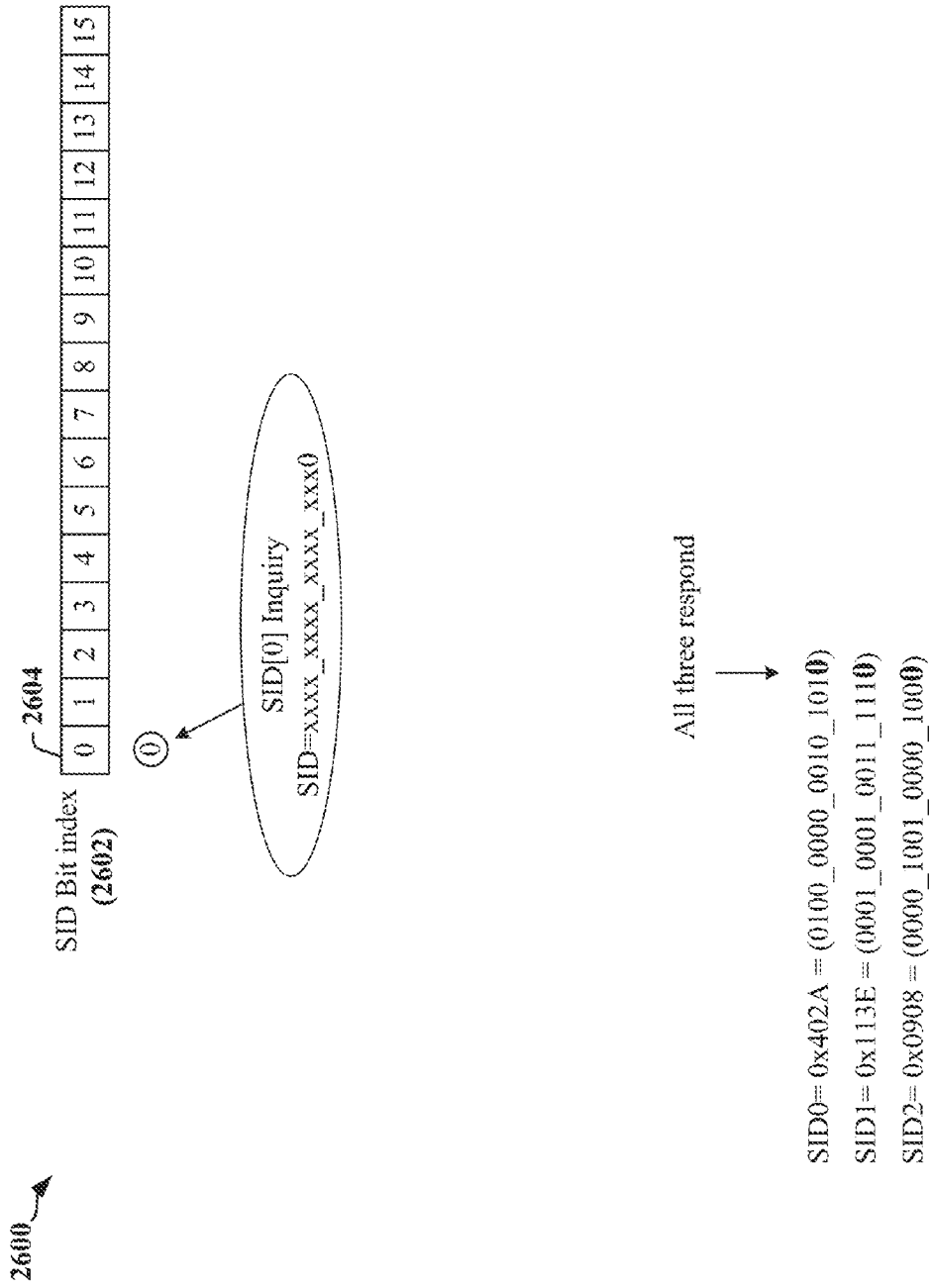

FIG. 26 illustrates an example of various steps of an SID scan performed in accordance with certain aspects disclosed herein.

Figure 27:
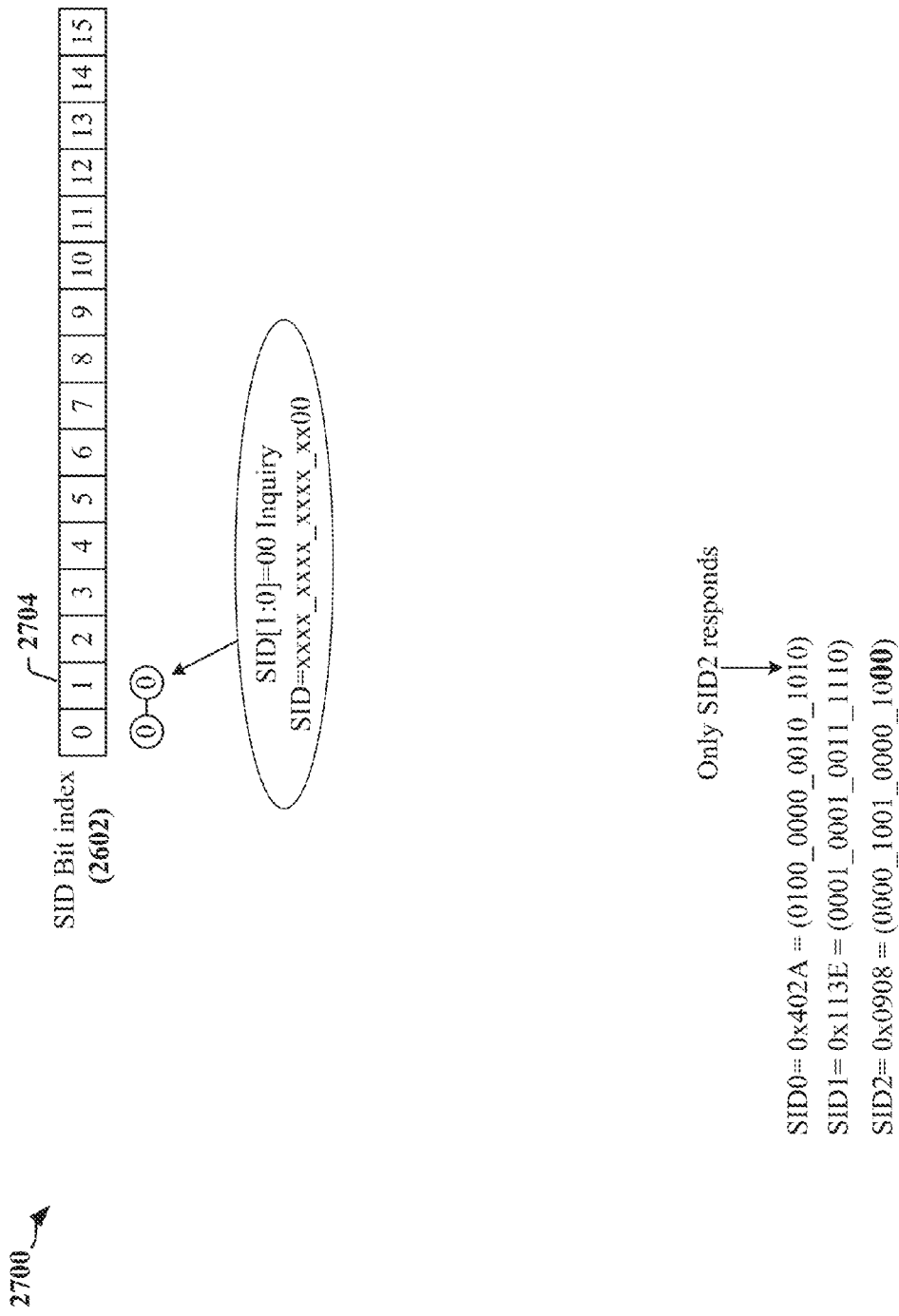

FIG. 27 illustrates an example of various steps of an SID scan performed in accordance with certain aspects disclosed herein.

Figure 28:
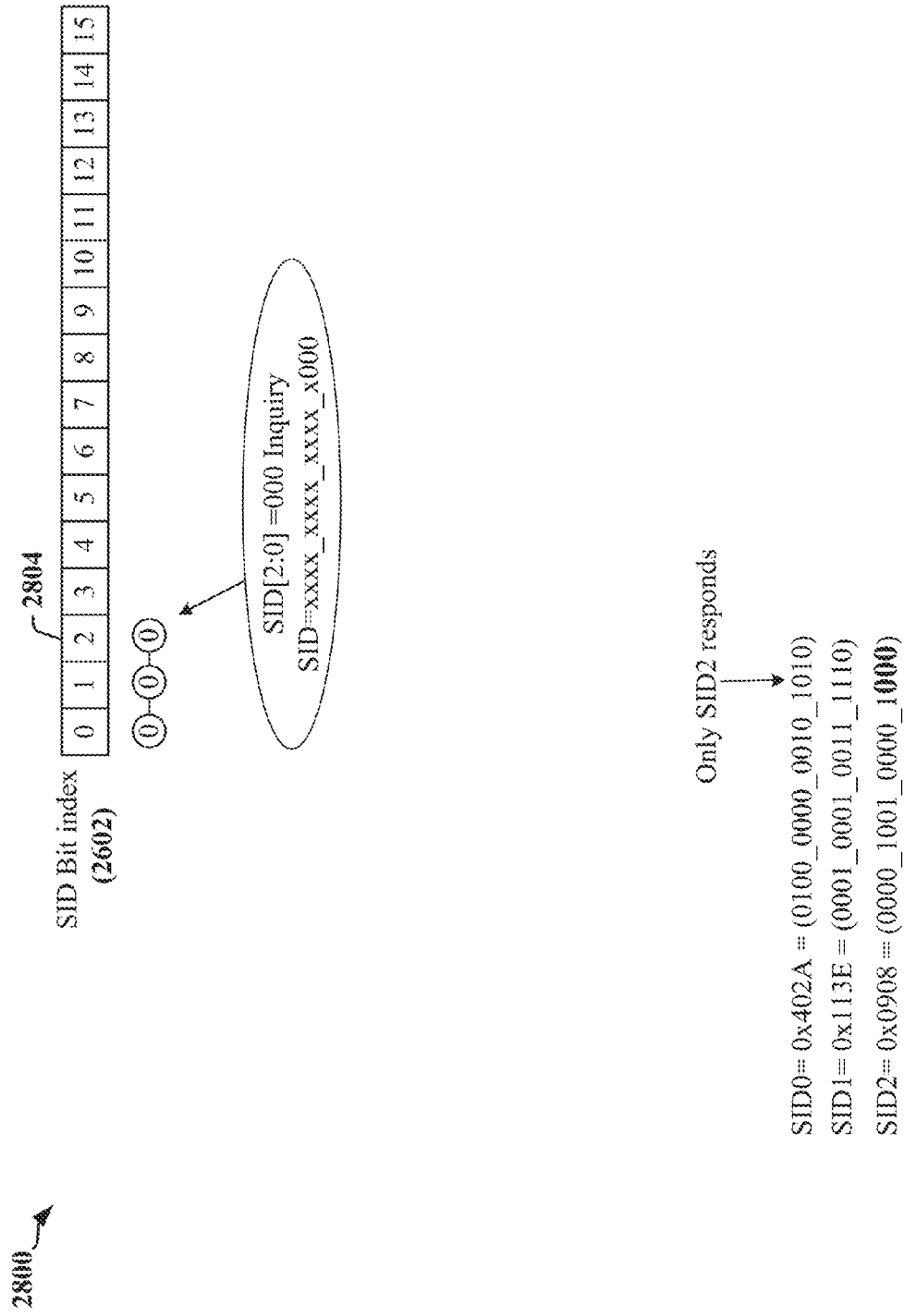

FIG. 28 illustrates an example of various steps of an SID scan performed in accordance with certain aspects disclosed herein.

Figure 29:
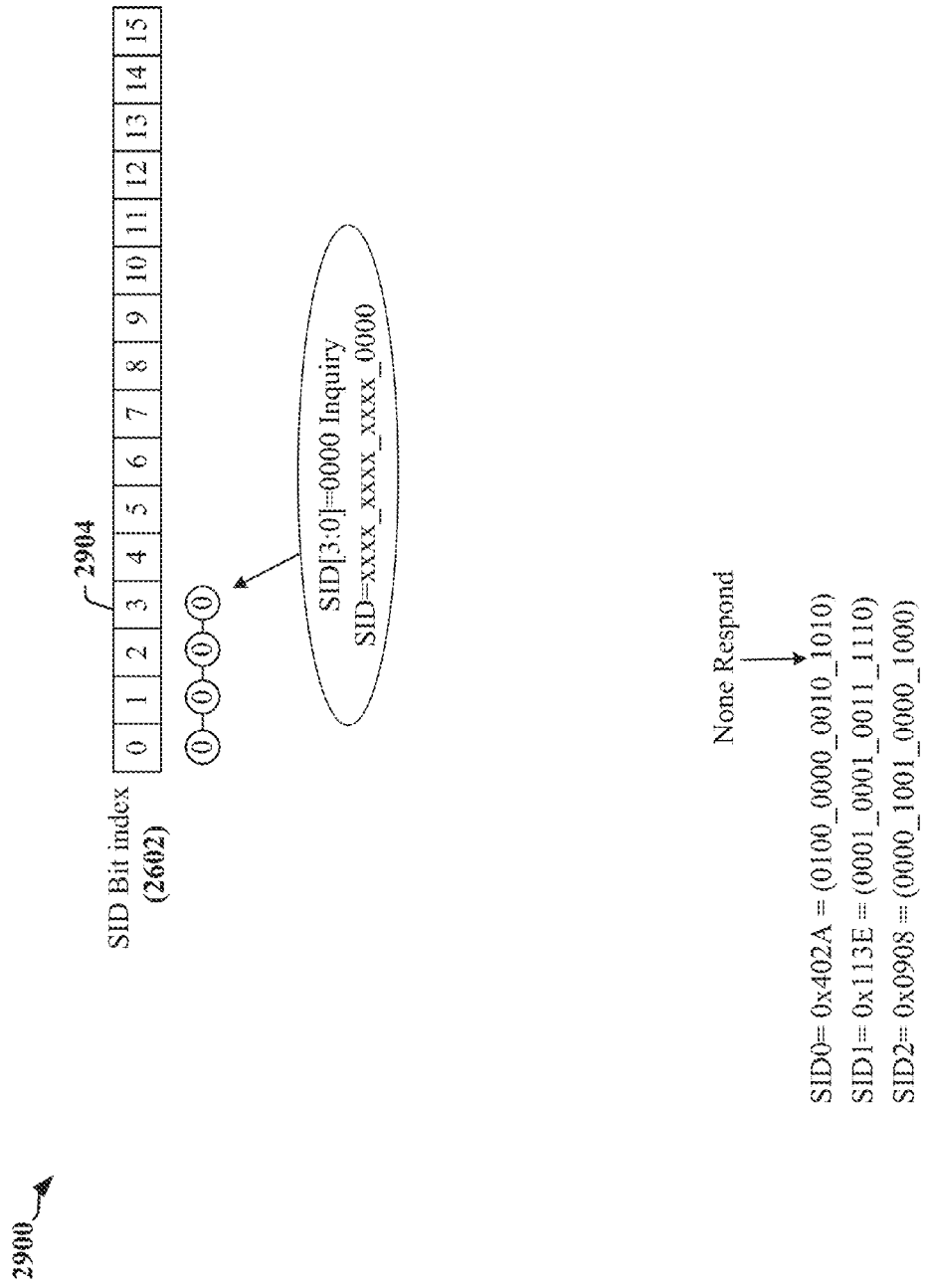

FIG. 29 illustrates an example of various steps of an SID scan performed in accordance with certain aspects disclosed herein.

Figure 30:
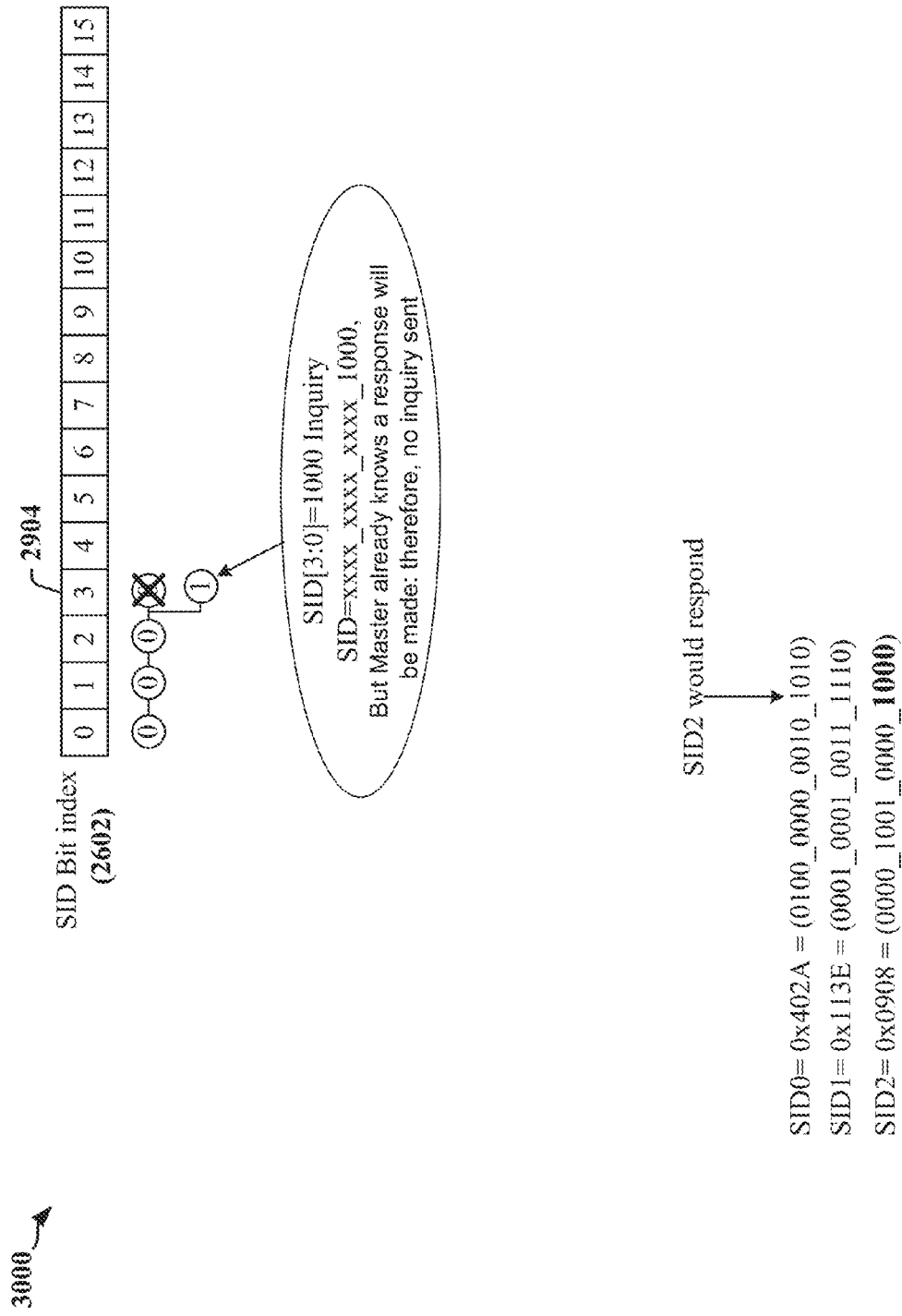

FIG. 30 illustrates an example of various steps of an SID scan performed in accordance with certain aspects disclosed herein.

Figure 31:
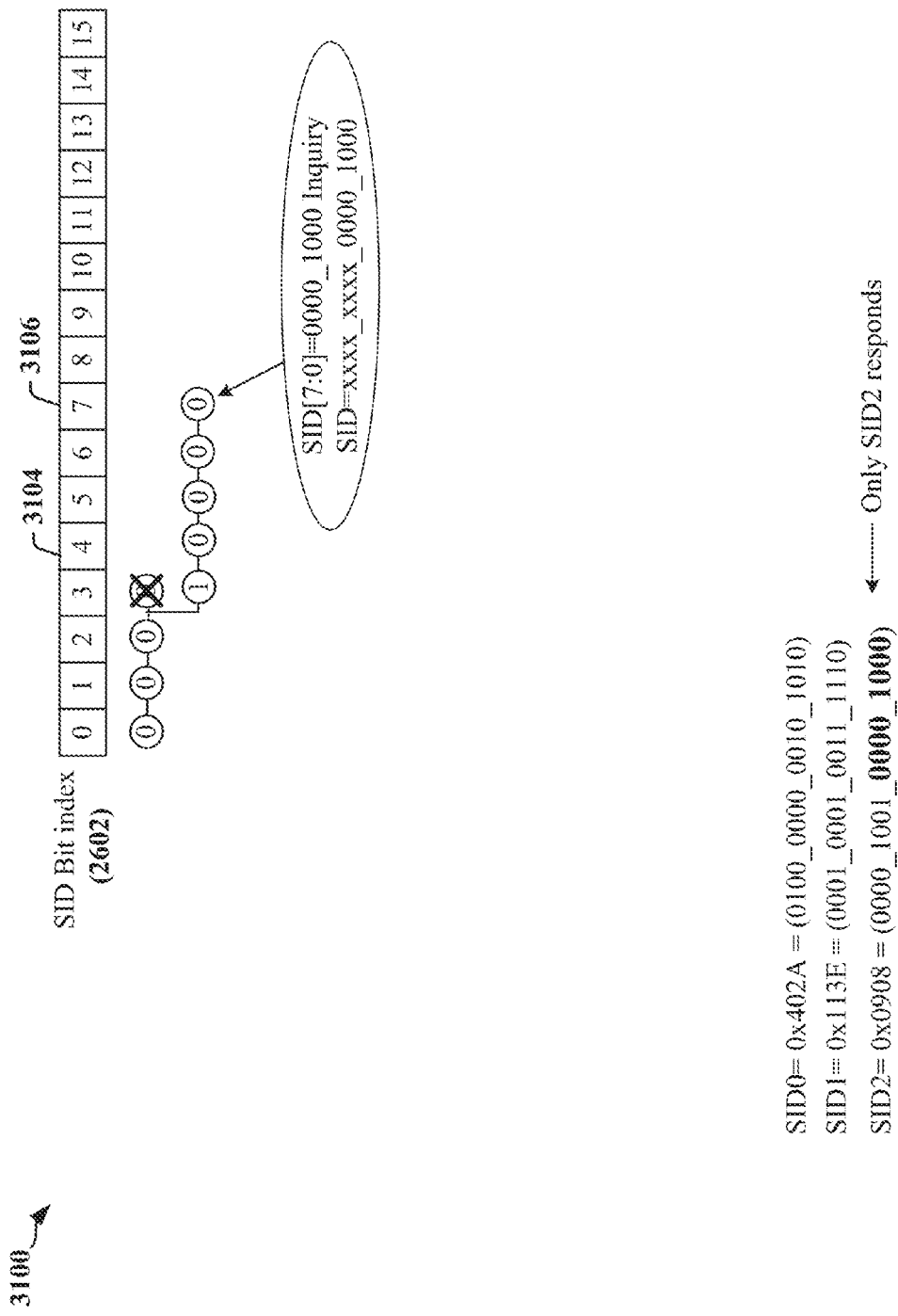

FIG. 31 illustrates an example of various steps of an SID scan performed in accordance with certain aspects disclosed herein.

Figure 32:
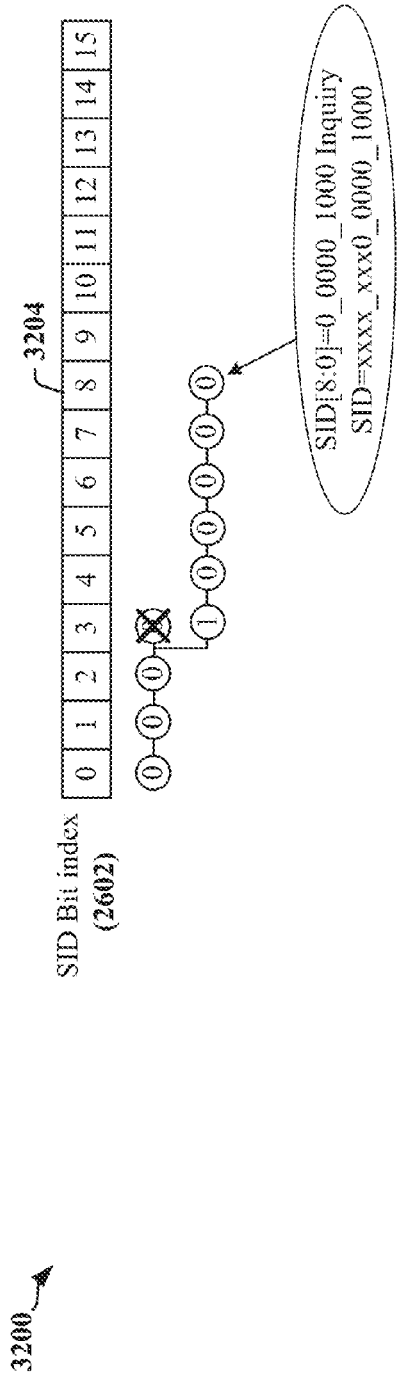

FIG. 32 illustrates an example of various steps of an SID scan performed in accordance with certain aspects disclosed herein.

Figure 33:
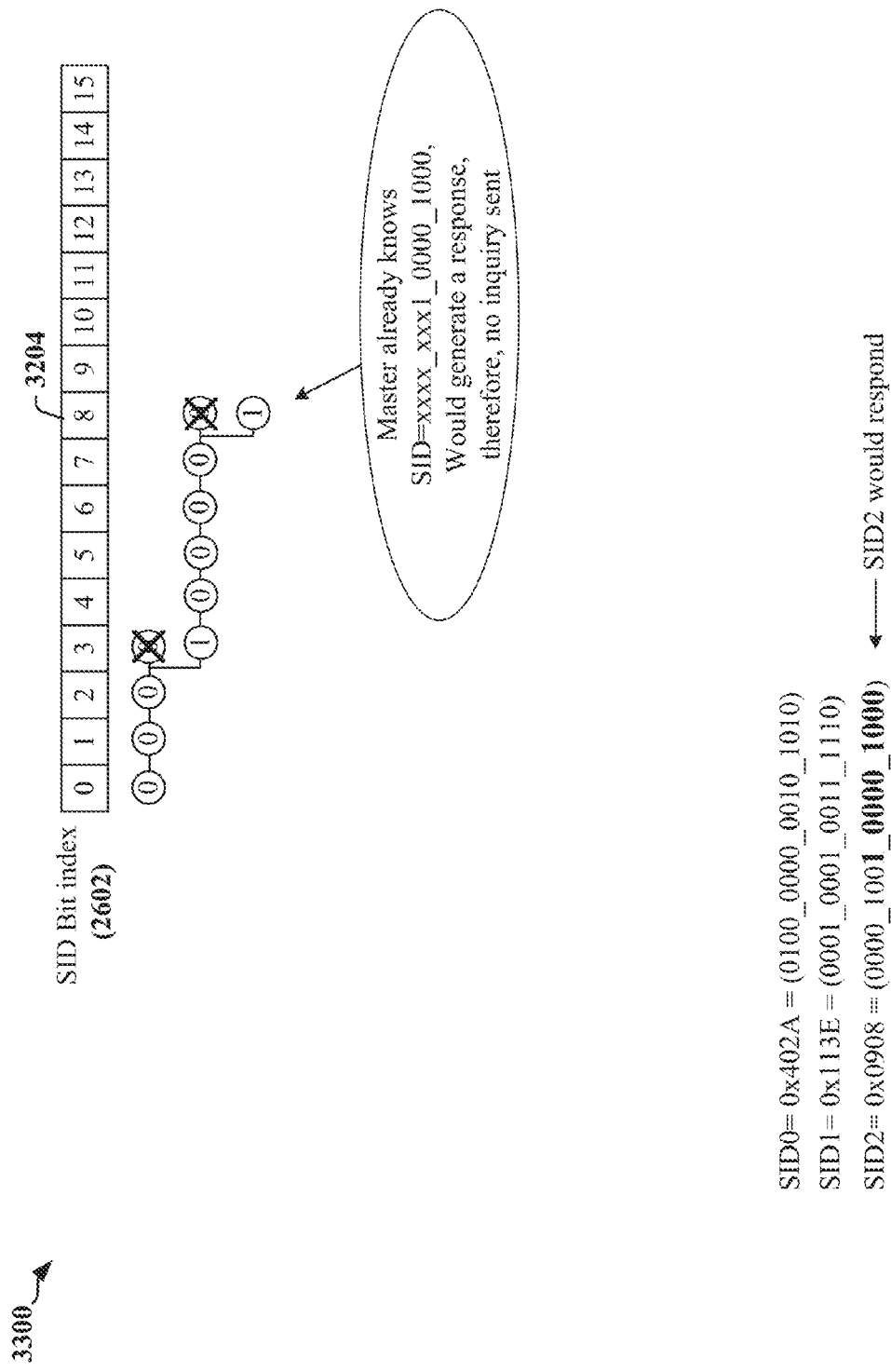

FIG. 33 illustrates an example of various steps of an SID scan performed in accordance with certain aspects disclosed herein.

Figure 34:
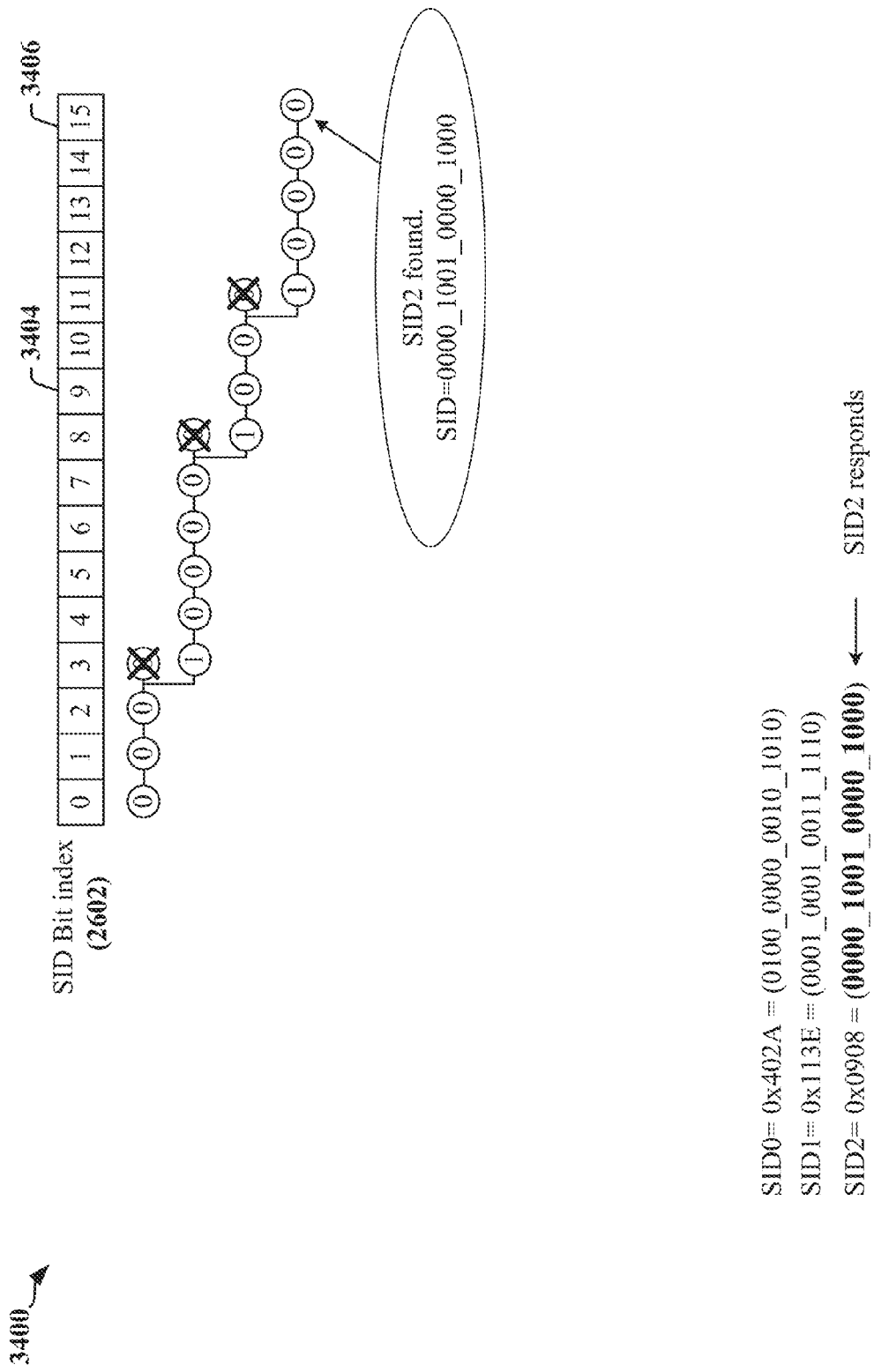

FIG. 34 illustrates an example of various steps of an SID scan performed in accordance with certain aspects disclosed herein.

Figure 35:
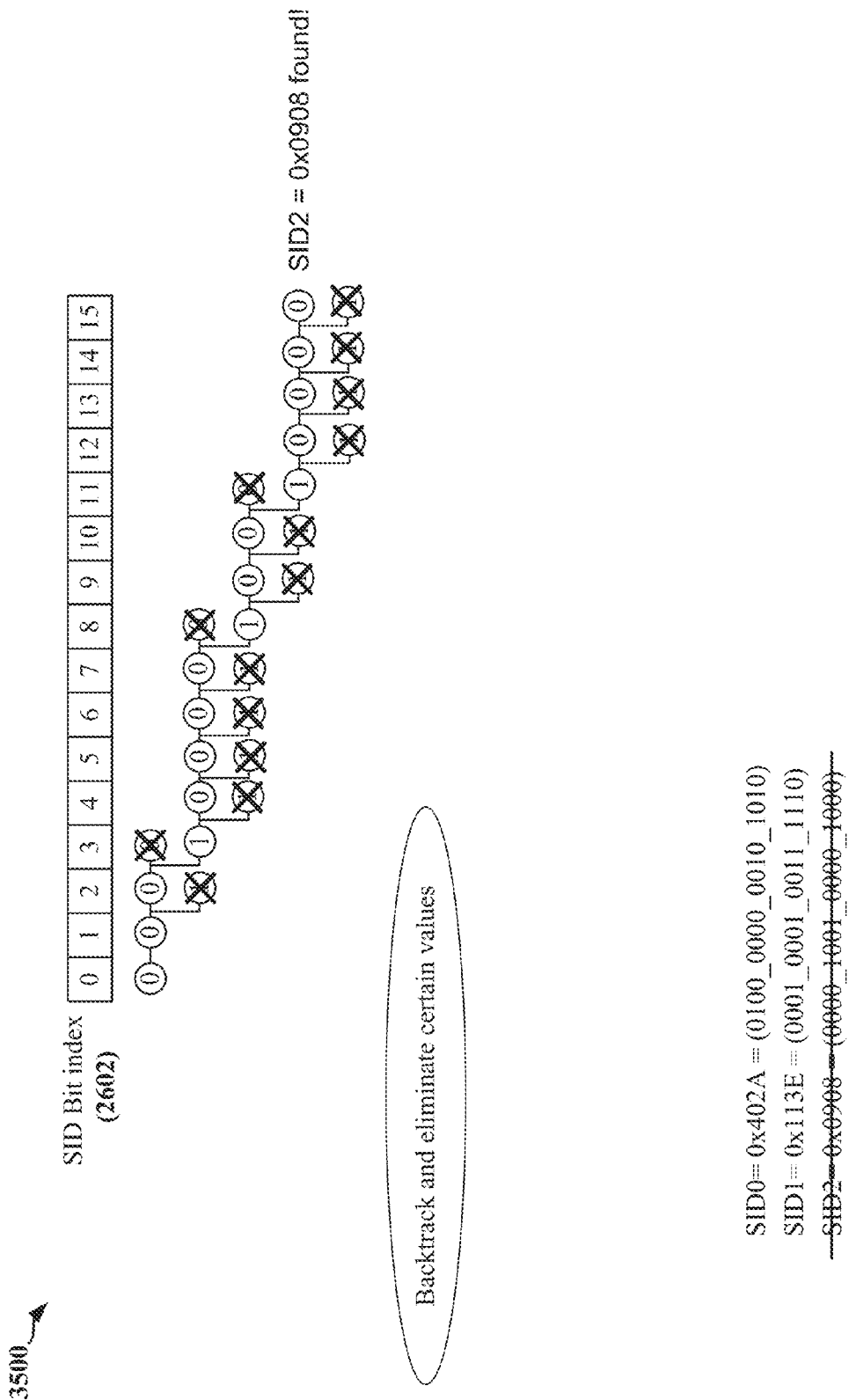

FIG. 35 illustrates an example of various steps of an SID scan performed in accordance with certain aspects disclosed herein.

Figure 36:
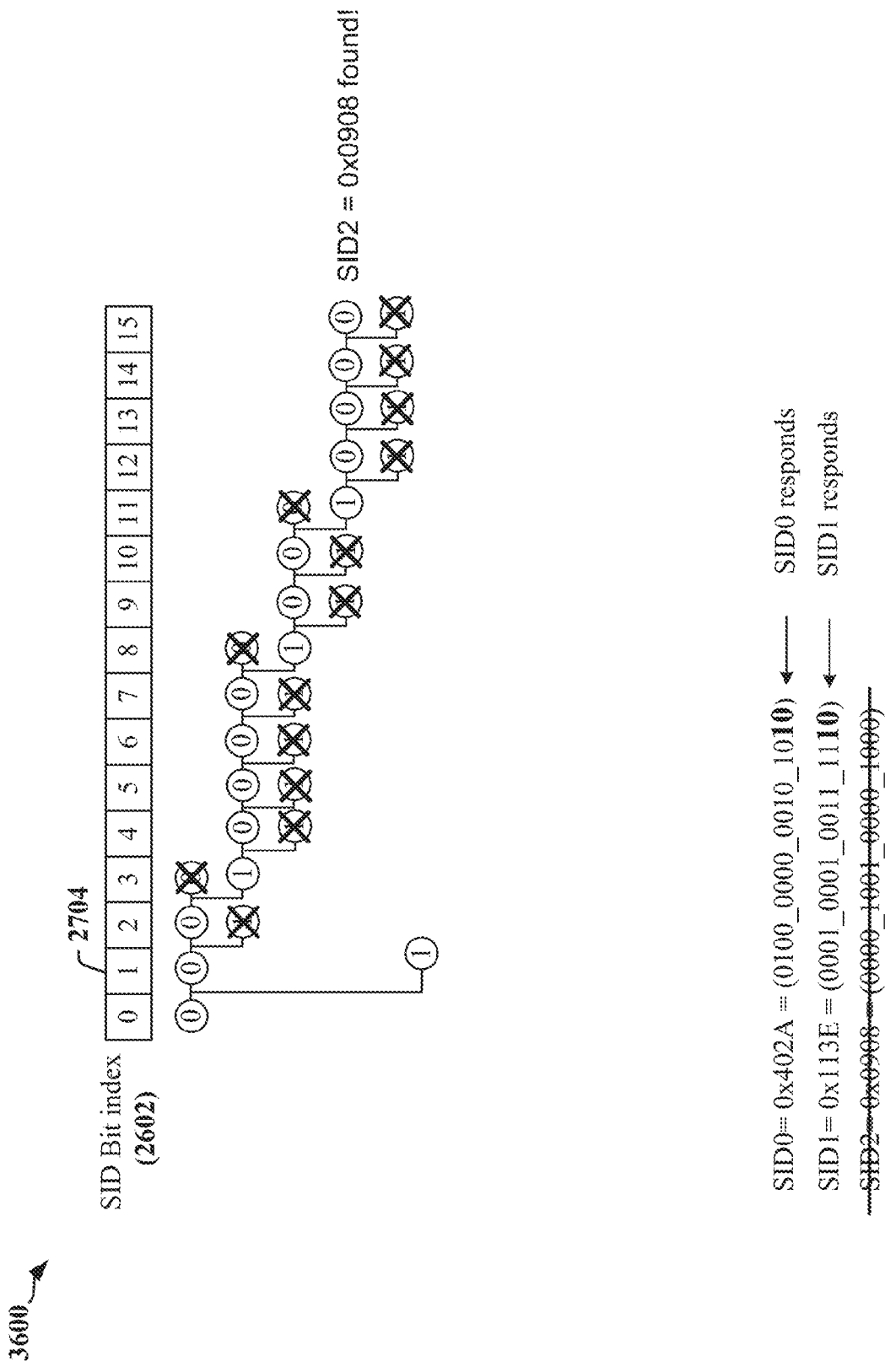

FIG. 36 illustrates an example of various steps of an SID scan performed in accordance with certain aspects disclosed herein.

Figure 37:
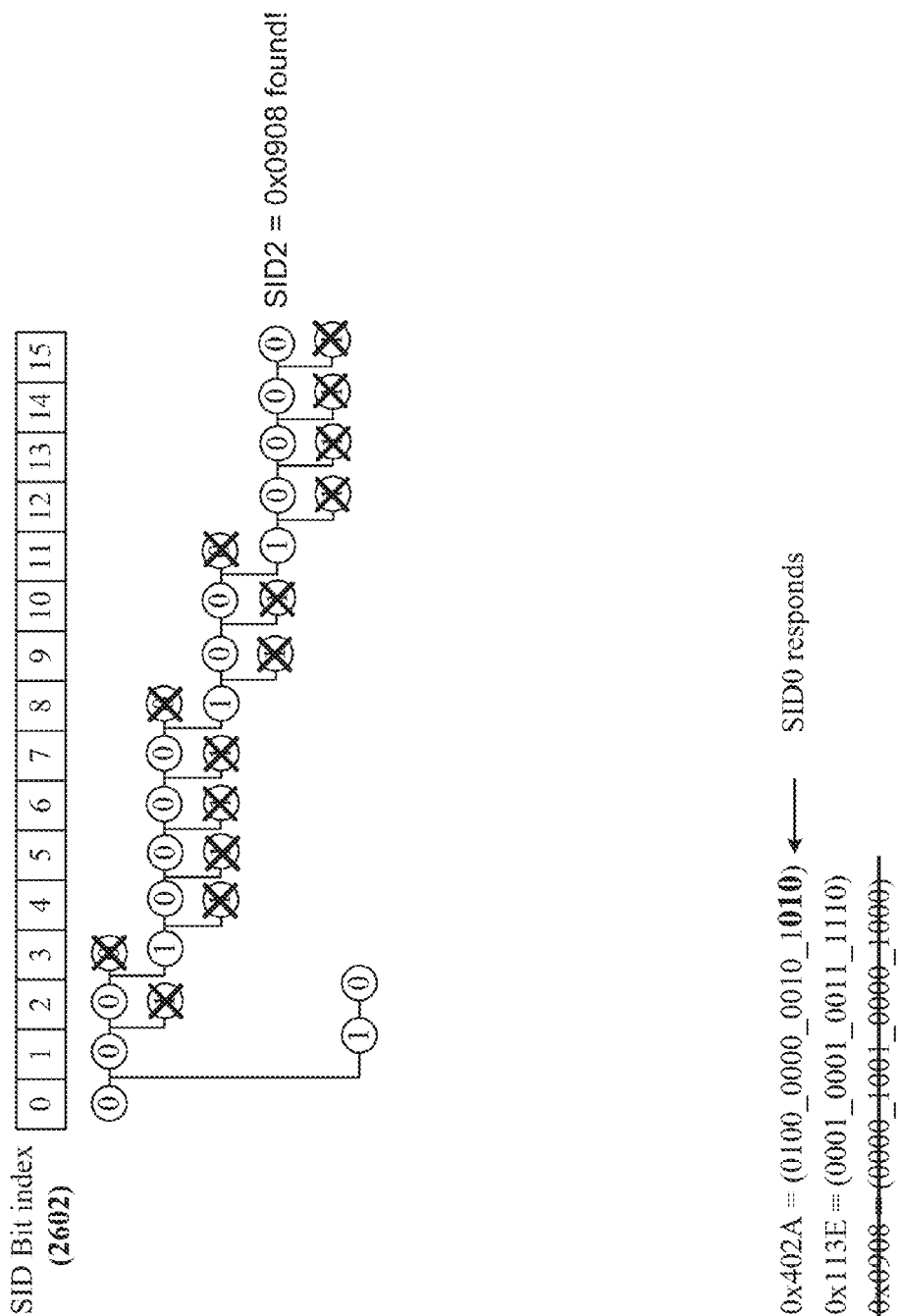

FIG. 37 illustrates an example of various steps of an SID scan performed in accordance with certain aspects disclosed herein.

Figure 38:
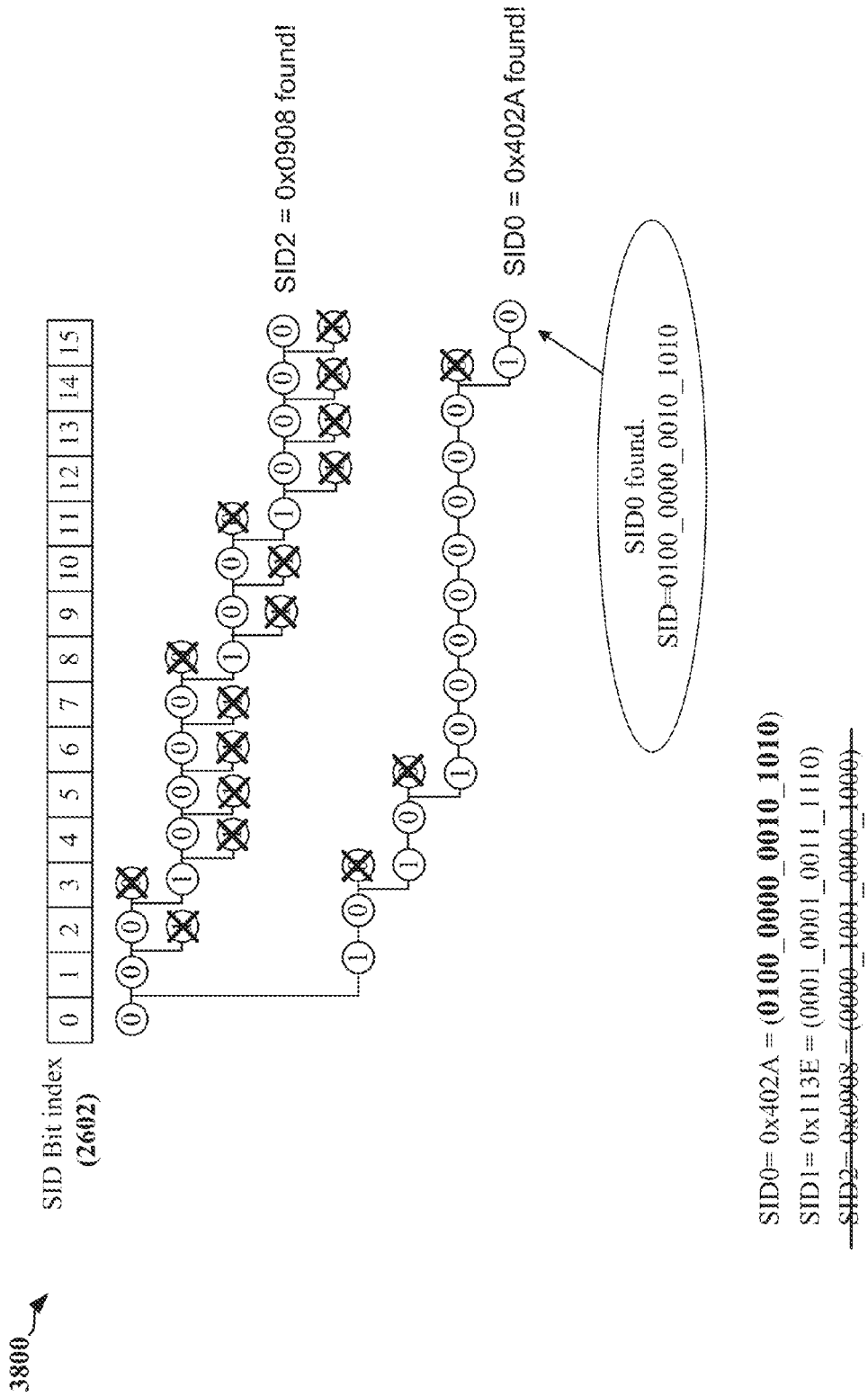

FIG. 38 illustrates an example of various steps of an SID scan performed in accordance with certain aspects disclosed herein.

Figure 39:
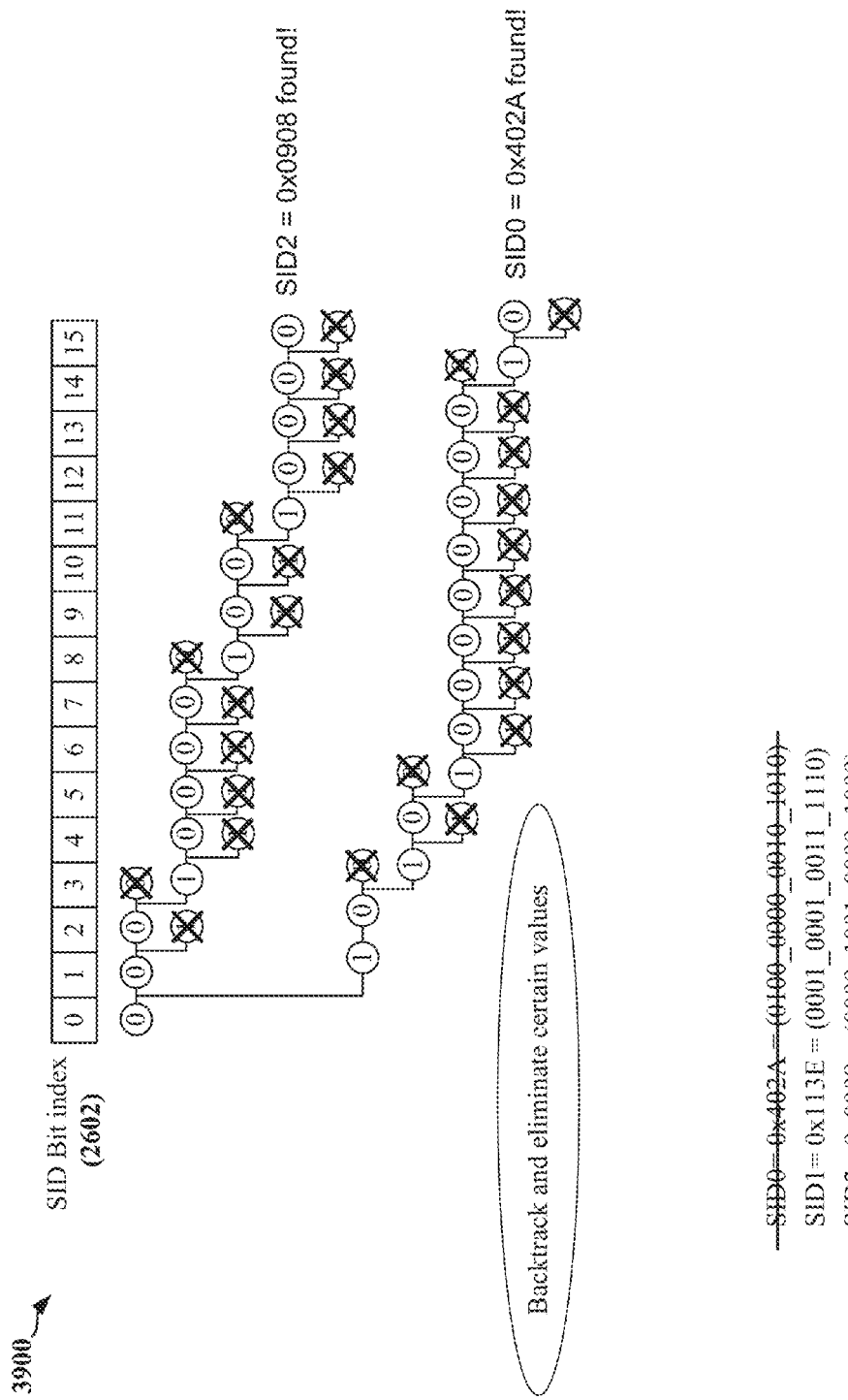

FIG. 39 illustrates an example of various steps of an SID scan performed in accordance with certain aspects disclosed herein.

Figure 40:
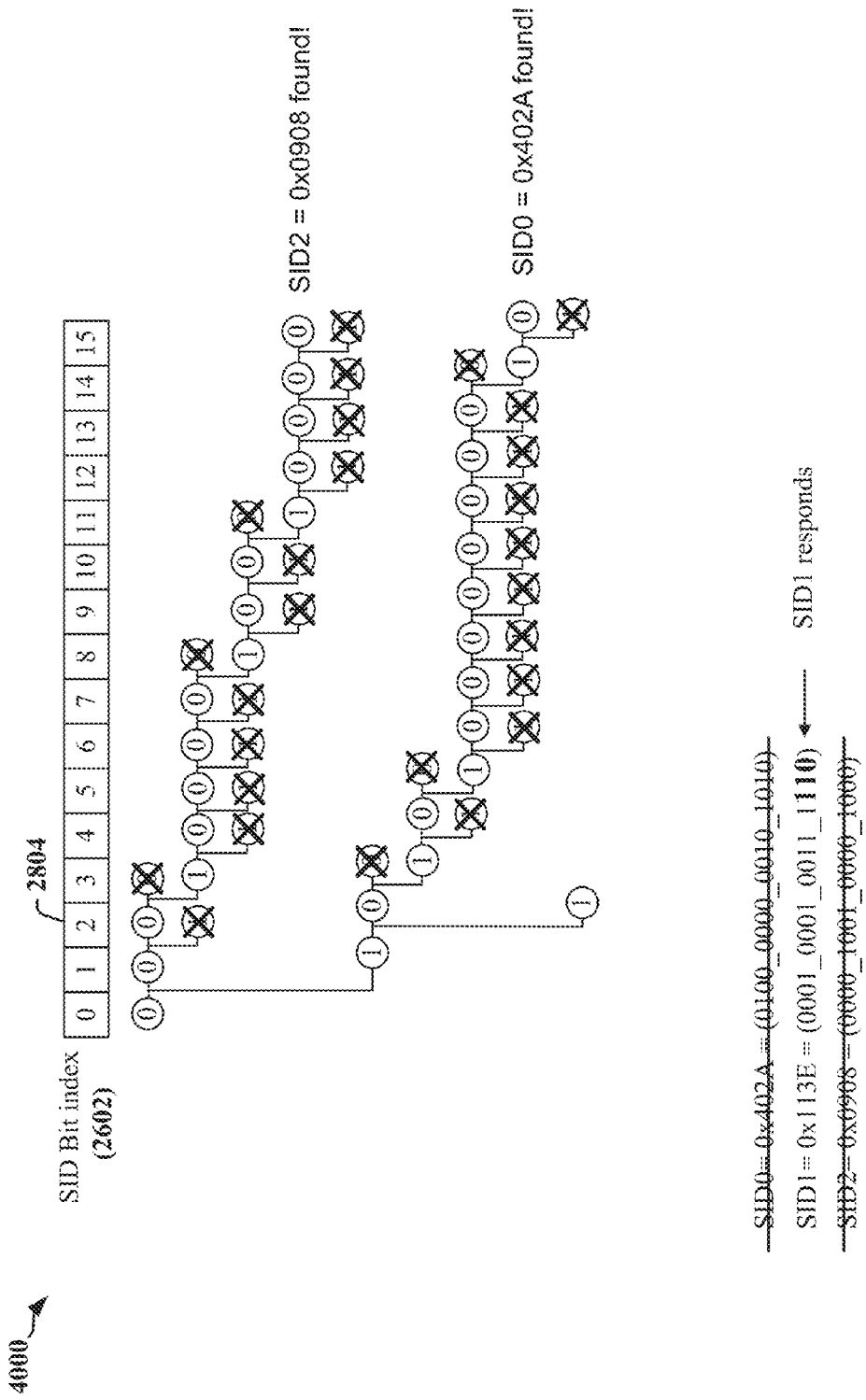

FIG. 40 illustrates an example of various steps of an SID scan performed in accordance with certain aspects disclosed herein.

Figure 41:
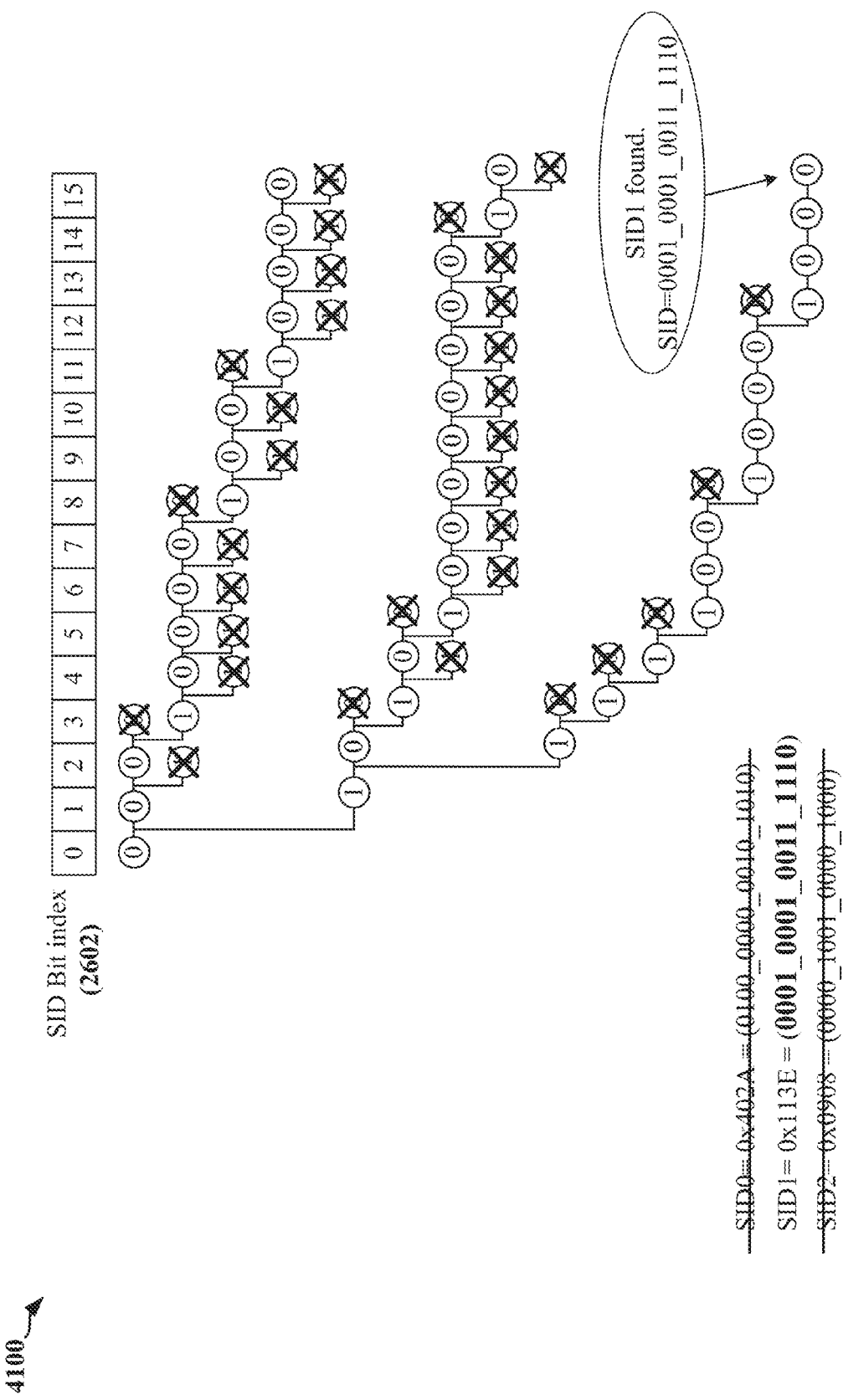

FIG. 41 illustrates an example of various steps of an SID scan performed in accordance with certain aspects disclosed herein.

Figure 42:
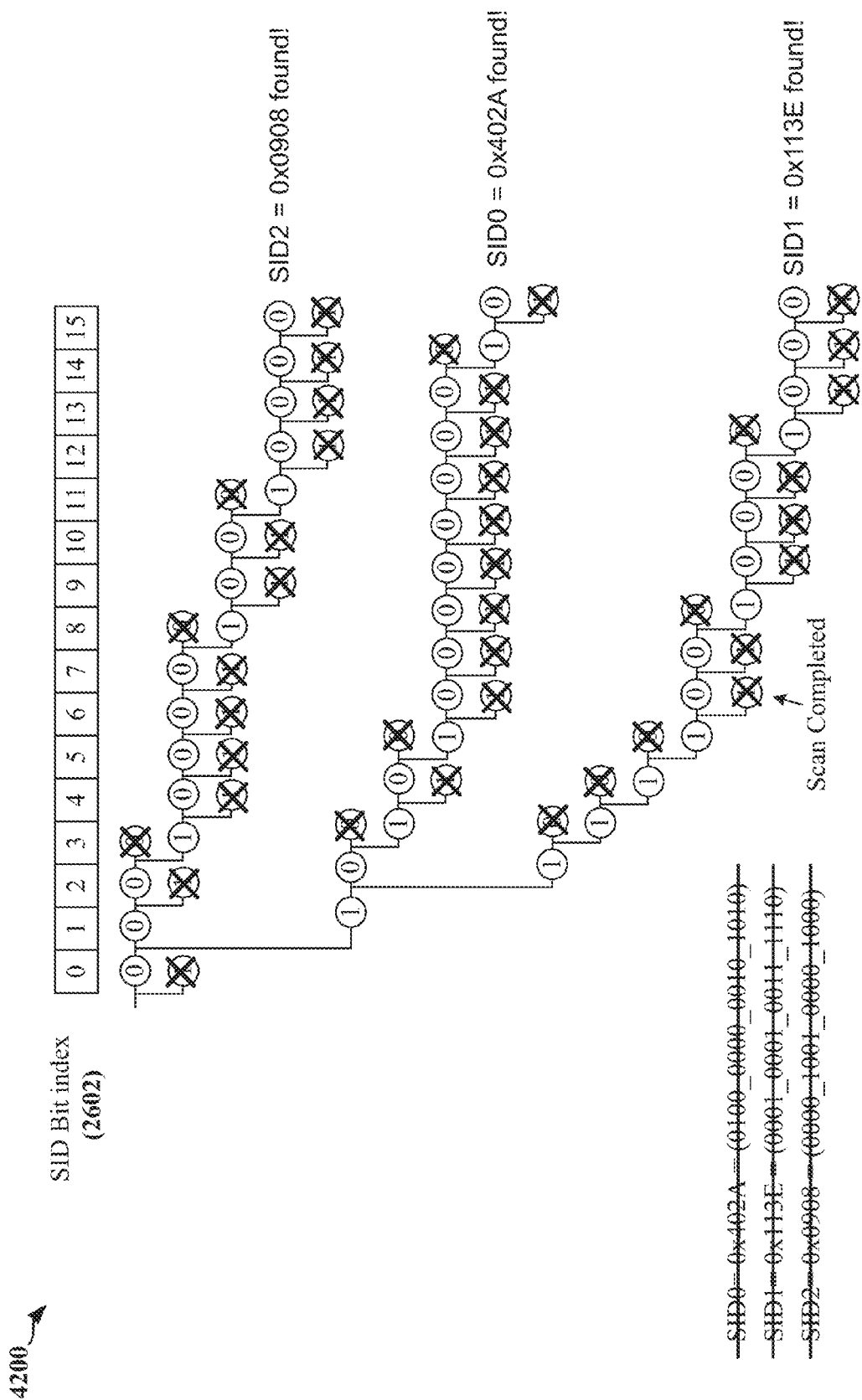

FIG. 42 illustrates an example of various steps of an SID scan performed in accordance with certain aspects disclosed herein.

Figure 43:
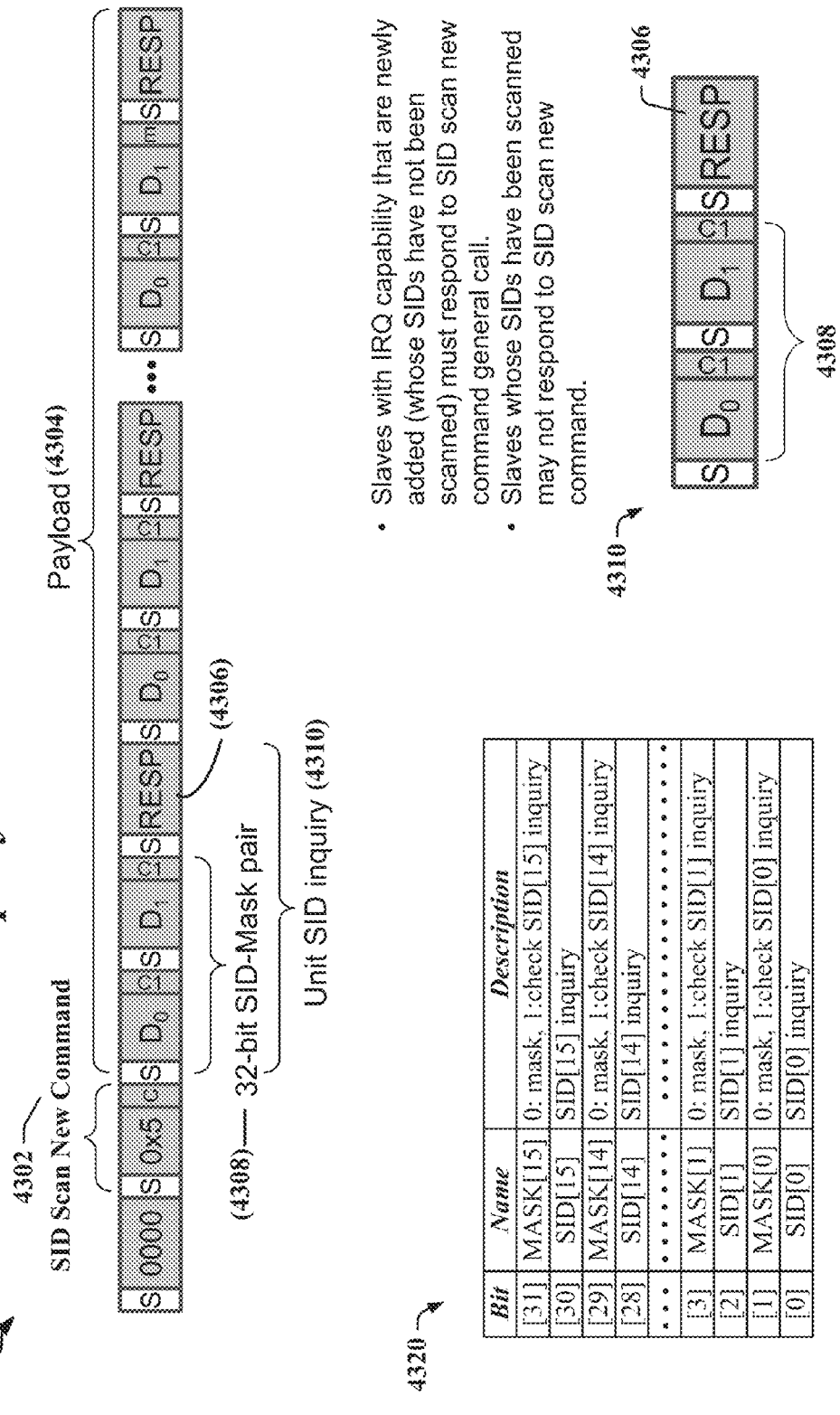

FIG. 43 illustrates one example of an "SID Scan New" command that may be issued by a master device.

Figure 44:
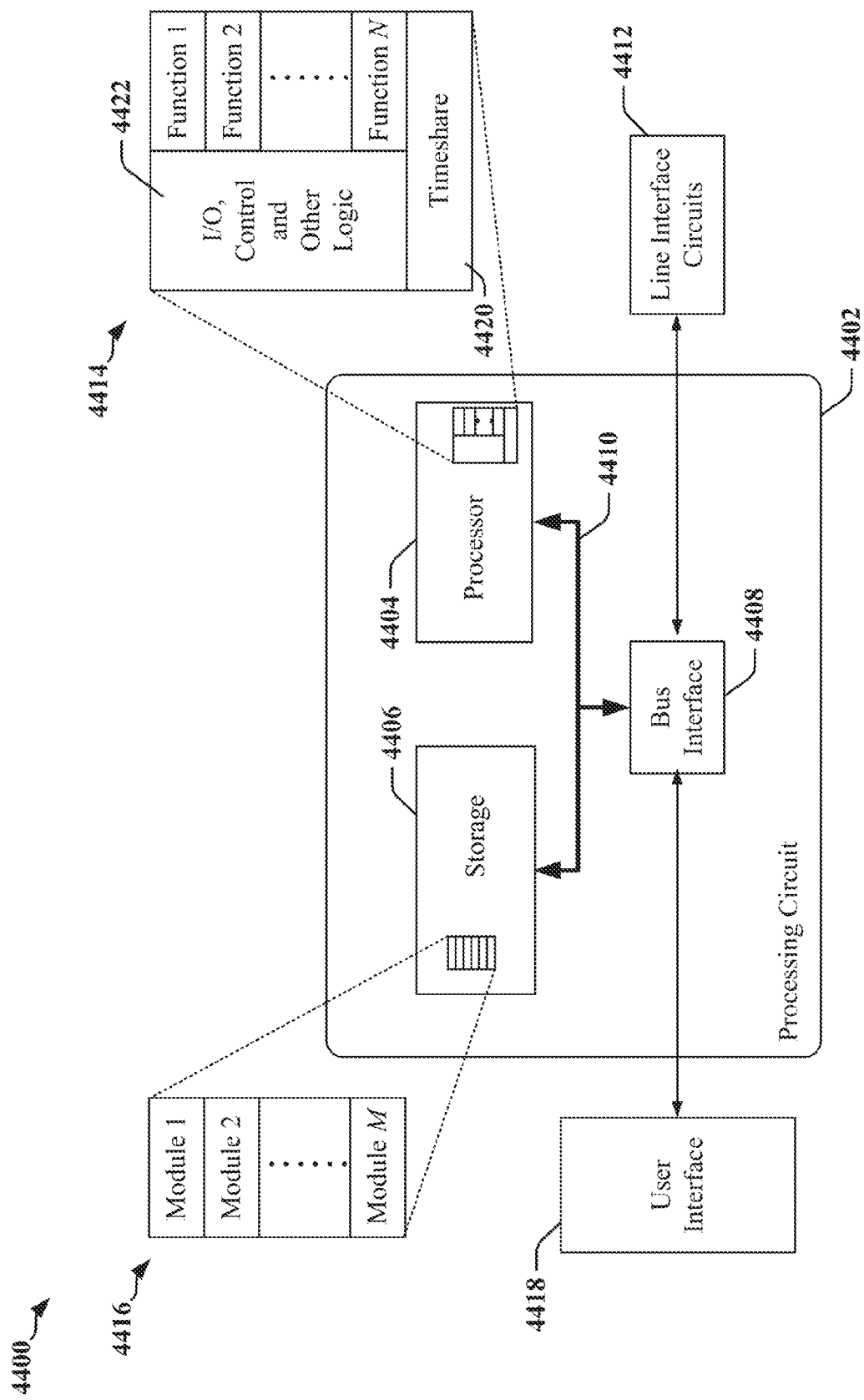

FIG. 44 is a block diagram illustrating an example of an apparatus employing a processing system that may be adapted according to certain aspects disclosed herein.

Figure 45:
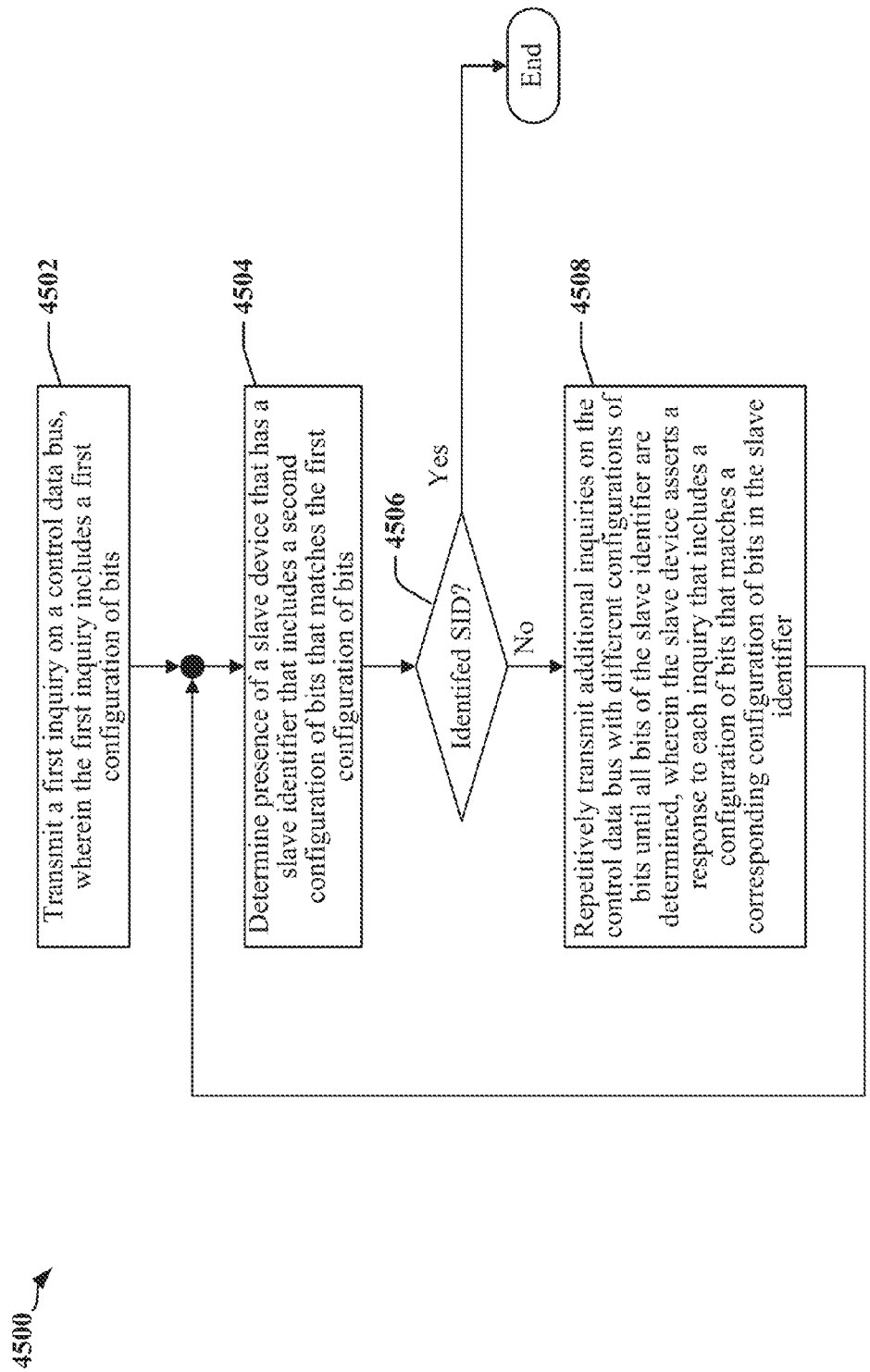

FIG. 45 is a flowchart illustrating a method for conducting a slave identifier scan on a communications link.

Figure 46:
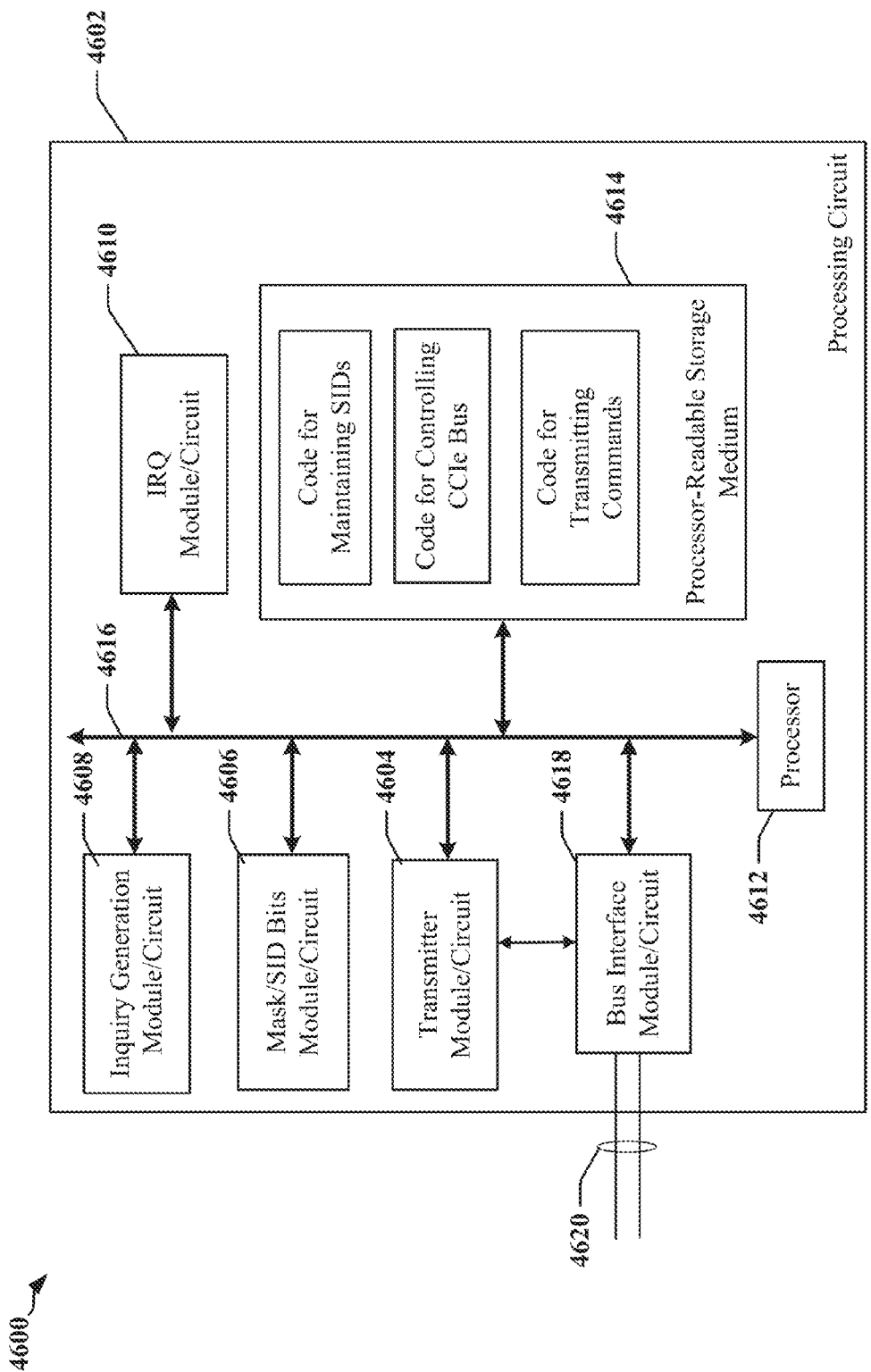

FIG. 46 is a conceptual diagram illustrating an example of a hardware implementation for an apparatus employing a processing circuit configured to conduct conducting a slave identifier scan on a communications link.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Exemplary Operating Environment

Figure 1:
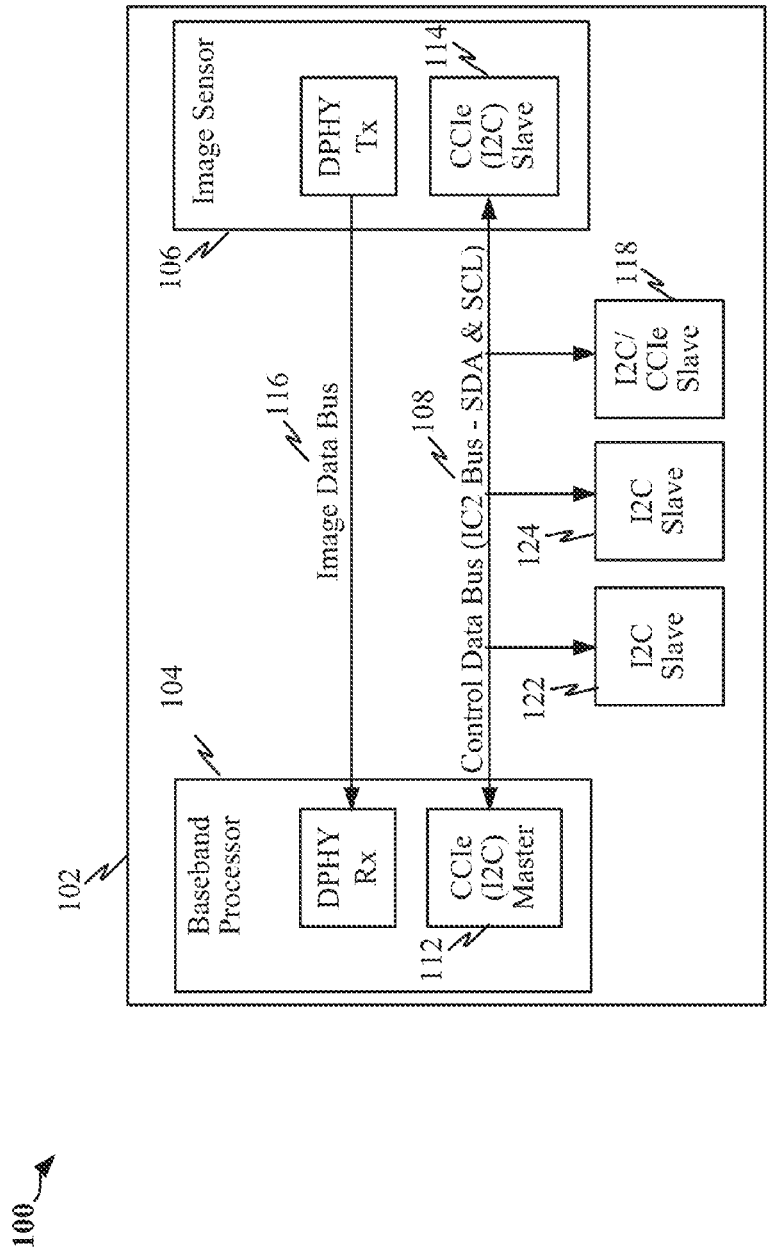
FIG. 1 is a block diagram illustrating a device having a baseband processor and an image sensor and implementing an image data bus and a multi-mode control data bus.

FIG. 1 is a block diagram illustrating a device 102 having a baseband processor 104 and an image sensor 106 and implementing an image data bus 116 and a multi-mode control data bus 108. While FIG. 1 illustrates the multi-mode control data bus 108 within a camera device, it should be clear that this control data bus 108 may be implemented in various different devices and/or systems. Image data may be sent from the image sensor 106 to the baseband processor 104 over an image data bus 116 (e.g., a high speed differential DPHY link).

In one example, the control data bus 108 may be an I2C bus comprising two wires, a clock line (SCL) and a serial data line (SDA). The clock line SCL may be used to send a clock used to synchronize all data transfers over the I2C bus (control data bus 108). The data line SDA and clock line SCL are coupled to all devices 112, 114, and 118 on the I2C bus (control data bus 108). In this example, control data may be exchanged between the baseband processor 104 and the image sensor 106 as well as other peripheral devices 118, 122, and/or 124 via the control data bus 108. The standard clock (SCL) speed for I2C is up to 100 KHz. The standard clock SCL speed in I2C fast mode is up to 400 KHz, and in I2C fast mode plus (Fm+) it is up to 1 MHz. These operating modes over an I2C bus may be referred to as a camera control interface (CCI) mode when used for camera applications.

According to one aspect, an improved mode of operation (i.e., with control data bus transmission frequencies greater than 1 MHz) may be implemented over the multi-mode control data bus 108 to support camera operation. This improved mode of operation over an I2C bus may be referred to as a camera control interface extension (CCIe) mode when used for camera applications. In CCIe mode, the SCL line and the SDA line may both be used to transmit data while a clock is embedded symbol to symbol transitions over the two lines. In this example, the baseband processor 104 includes a master device 112 and the image sensor 106 includes a slave device 114, both the master device 112 and slave device 114 may operate according to the camera control interface extension (CCIe) mode over the control data bus 108 without affecting the proper operation of other legacy I2C devices coupled to the control data bus 108. According to one aspect, this improved mode over the control data bus 108 may be implemented without any bridge device between CCIe devices and legacy I2C slaves devices.

A protocol is provided that permits I2C-compatible devices and CCIe-compatible devices to be concurrently coupled to the shared control data bus 108. The control data bus 108 may dynamically switch between operating according to distinct communication protocols (e.g., I2C mode and CCIe mode). As previously noted, communications and/or access to the shared control data bus 108 is managed by the multi-mode master device 112. The master device transmits an entry call to indicate that the control data bus 108 is to switch its communication protocol from a first protocol mode (e.g., I2C mode) to a second protocol mode (e.g., CCIe mode). Similarly, the master device transmits an exit call to indicate that the control data bus 108 is to switch its communication protocol from the second protocol mode (e.g., CCIe mode) to the first protocol mode (e.g., I2C mode). The slave devices coupled to the shared bus 108 monitor for these entry and exit calls to ascertain when they may operate on the shared bus 108.

Exemplary CCIe Encoding Technique

Figure 2:
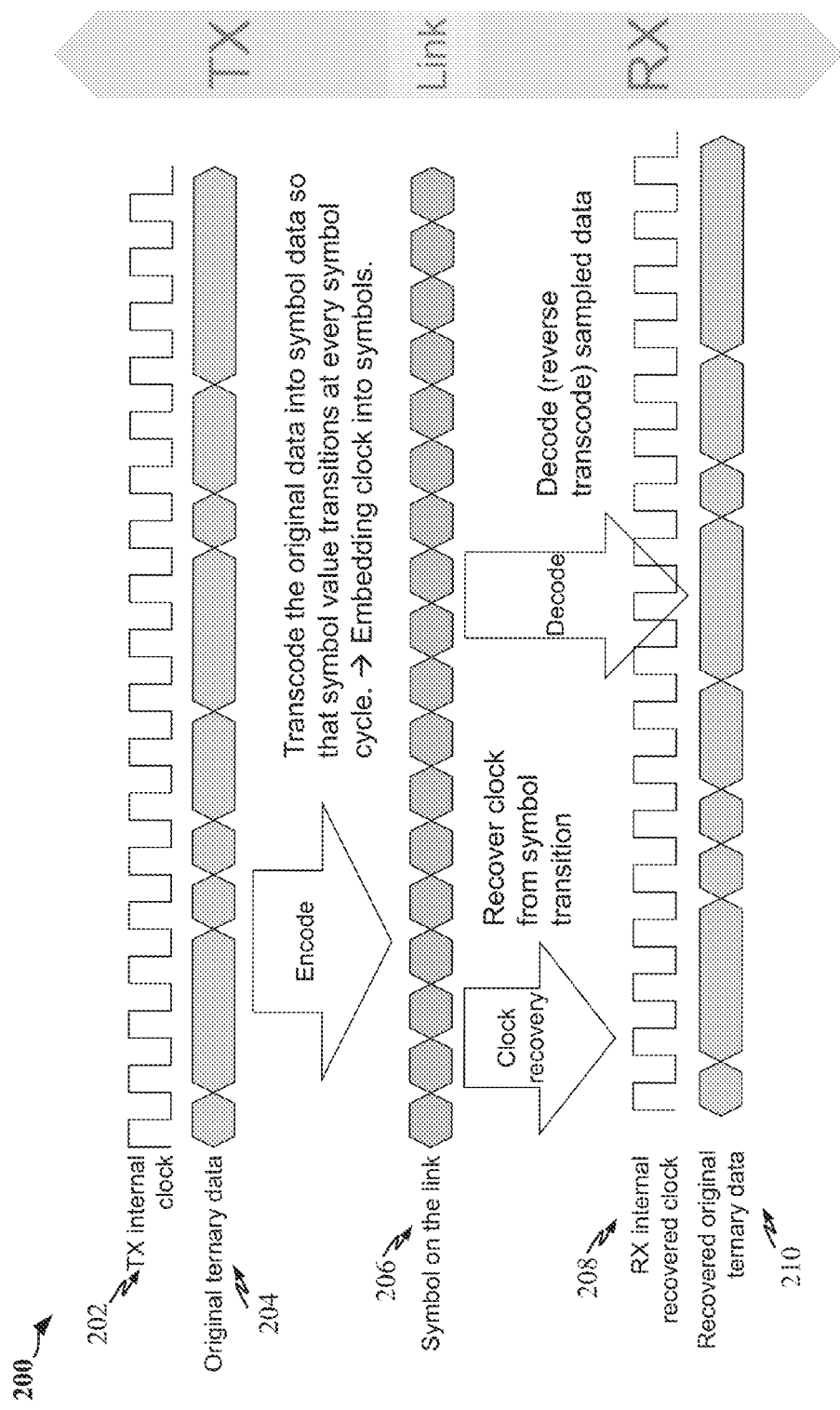
FIG. 2 illustrates how a clock may be embedded within symbol to symbol transitions in CCIe mode, thereby allowing the use of the two lines (i.e., SDA line and SCL line) in an I2C bus for data transmissions.

FIG. 2 illustrates how a clock may be embedded within symbol to symbol transitions in CCIe mode, thereby allowing the use of the two lines (i.e., SDA line and SCL line) in an I2C bus for data transmissions. In one example, this embedding of the clock may be achieved by transition clock transcoding. For instance, the data 204 to be transmitted over the physical link (wires) is transcoded so that transmitted symbols are guaranteed to change state at every symbol cycle or transition of the transmitted symbols 206. In one example, sequences of bits are converted into a ternary number, and each digit of the ternary number is converted into a symbol for transmission. Sequential symbols are guaranteed to be different even when two sequential digits of the ternary number are the same. Consequently, the original clock 202 can be embedded in the change of symbol states at every symbol cycle. A receiver recovers clock information 208 from the state transition at each symbol (in the transmitted symbols 206) and then reverses the transcoding of the transmitted symbols 206 to obtain the original data 210. In one example, each symbol is converted into a digit, a plurality of digits making up a ternary number, where the ternary number is then converted into a plurality of bits. Consequently, the original clock 202 can be embedded in the change of symbol states at every symbol cycle. This allows both wires of the I2C bus (control data bus 108 in FIG. 1, SDA line and SCL line) to be used to send data information. Additionally, the symbol rate can be doubled since it is no longer necessary to have a setup and hold time between clock and data signals.

Figure 3:
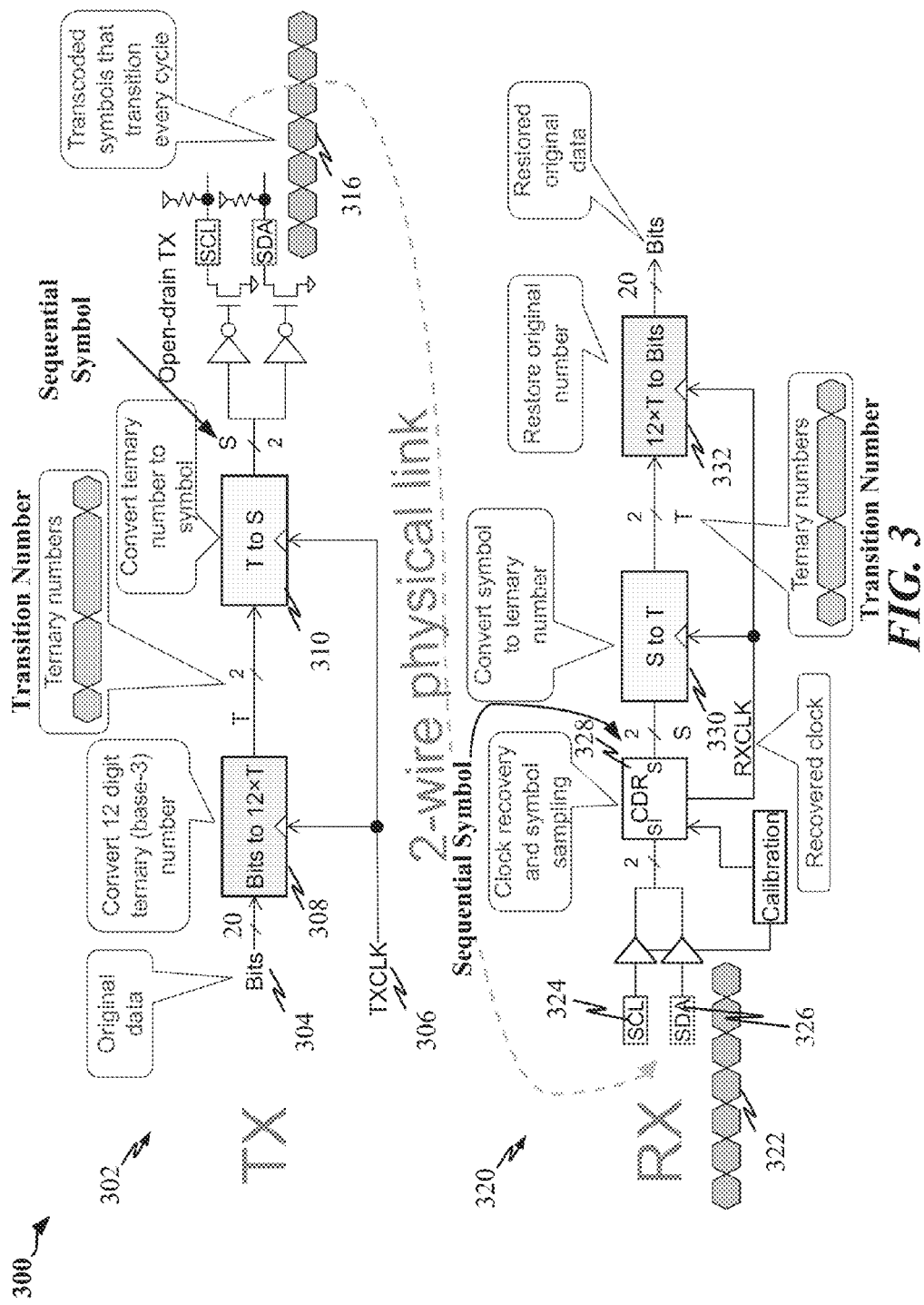
FIG. 3 is a block diagram illustrating an exemplary method for transcoding of data bits into transcoded symbols at a transmitter to embed a clock signal within the transcoded symbols.

FIG. 3 is a block diagram illustrating an exemplary method for transcoding of data bits into transcoded symbols at a transmitter to embed a clock signal within the transcoded symbols. At the transmitter 302, a sequence of data bits 304 are converted into a ternary (base 3) number (i.e., a "transition number"), and the ternary numbers are then converted into (sequential) symbols which are transmitted over the clock line SCL 312 and the data line SDA 314.

In one example, an original 20 bits of binary data is input into a bit-to-transition number converter block 308 to be converted to a 12-digit ternary number. Each digit of a 12-digit ternary number represents a "transition number". Two consecutive transition numbers may have be the same numbers (i.e., consecutive digits of the ternary number may be the same). Each transition number is converted into a sequential symbol at a transition-to-symbol block 310 such that no two consecutive sequential symbols have the same values. Because a transition is guaranteed at every sequential symbol, such sequential symbol transition may serve to embed a clock signal. Each sequential symbol 316 is then sent over a two wire physical link (e.g., I2C bus comprising a SCL line 312 and a SDA line 314).

Figure 4:
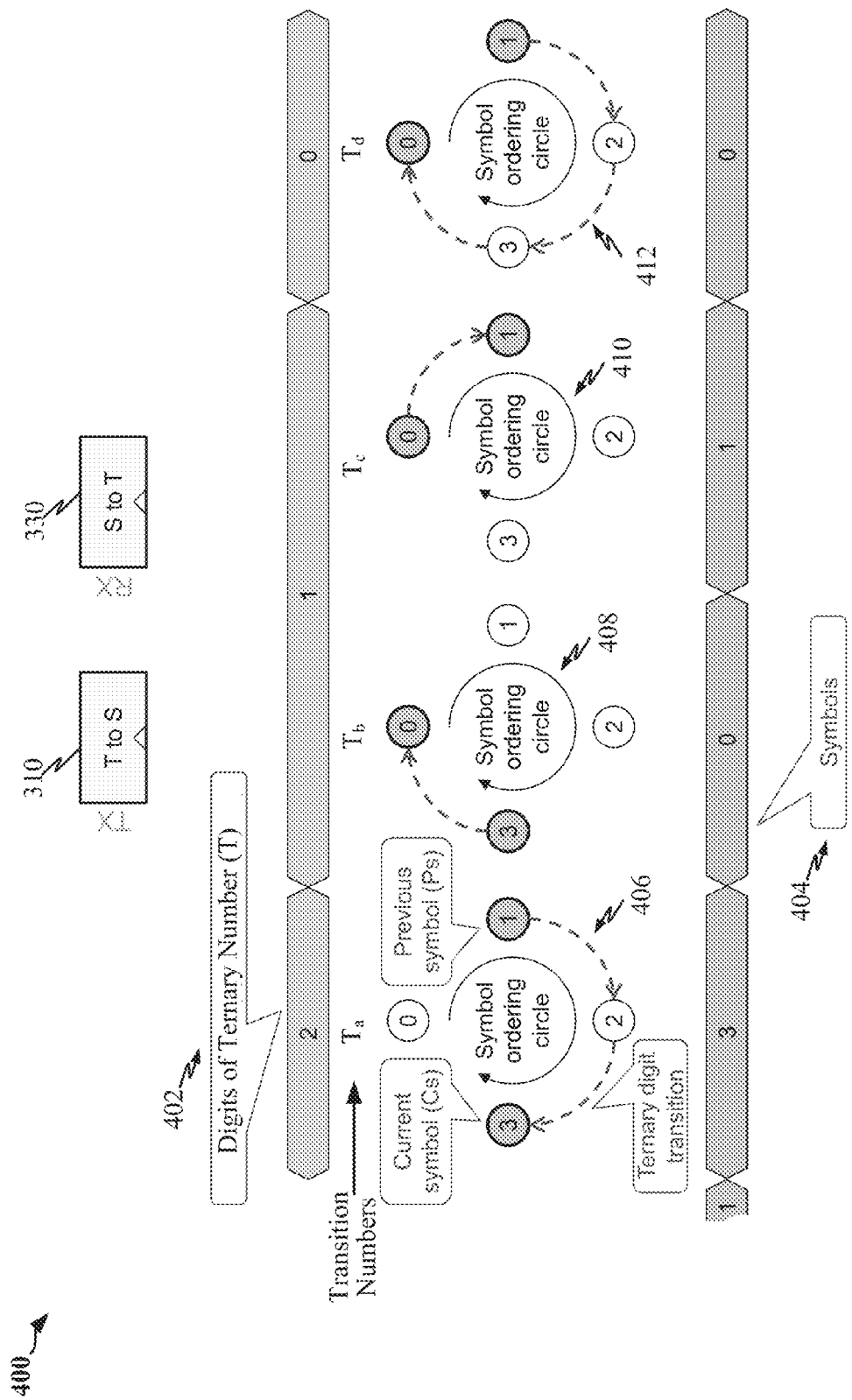
FIG. 4 illustrates an exemplary conversion between transition numbers and sequential symbols.

FIG. 4 illustrates an exemplary conversion between transition numbers 402 and sequential symbols 404. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

Figure 5:
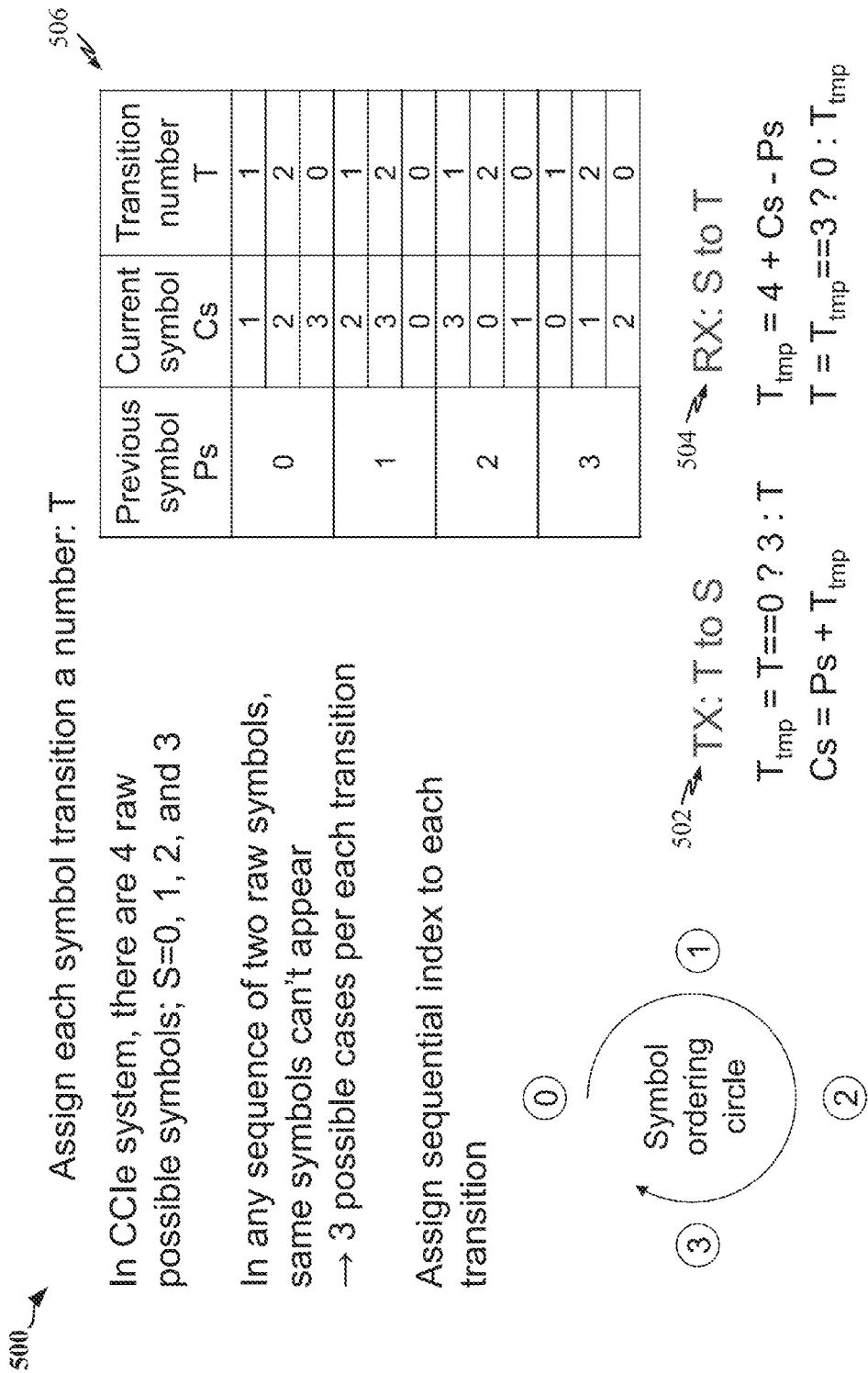
FIG. 5 illustrates the conversion between transition numbers and sequential symbols.

The conversion function is set forth illustratively in FIG. 5. On the transmitter side (TX: T to S) 502, a transition number (T) may be converted to a sequential symbol (S). For instance, a current sequential symbol (Cs) may be obtained based on a previous sequential symbol (Ps) and a temporary transition number ($T_{tmp}$) that is a function of a current transition number (T). The temporary transition number ($T_{tmp}$) may be obtained by comparing the current transition number T to zero and when T=zero, the temporary transition number ($T_{tmp}$) becomes equal to 3, else (when T not equal zero) $T_{tmp}$ becomes equal to T (i.e., $T_{tmp}$=T=0?3:T). The current sequential symbol may be obtained as a sum of the current sequential symbol ($C_s$) plus the previous sequential symbol ($P_s$) plus the temporary transition number ($T_{tmp}$) (i.e., $C_s=P_s+T_{tmp}$).

On the receiver side (RX: S to T) 504 the conversion operation is reversed to obtain a transition number from a current sequential symbol (Cs) and a previous sequential symbol (Ps). A temporary transition number ($T_{tmp}$) may be obtained as the sum of the current sequential symbol (Cs) plus 4 minus the previous symbol (Ps) (i.e., $T_{tmp}=C_s+4-P_s$). The current transition number (T) is equal to the temporary transition number ($T_{tmp}$), but the temporary transition number ($T_{tmp}$) is compared to three (3) and when $T_{tmp}$=3, the temporary transition number ($T_{tmp}$) becomes equal to zero (0), else (when $T_{tmp}$ not equal 3) T becomes equal to $T_{tmp}$ (i.e., T=$T_{tmp}$=3?0:T).

A table 506 illustrates the conversion between transition numbers and sequential symbols.

Referring again to FIG. 4, an example of the conversion between transition numbers and sequential symbols is illustrated therein. For example, in a first cycle 406, the current transition number (Ta) is 2, so $T_{tmp}$ is also 2, and with the previous sequential symbol $P_s$ being 1, the new current sequential symbol $C_s$ is now 3.

In a second cycle 408, the transition number (Tb) is 1. Since the transition number (Tb) is not equal to zero, the temporary transition number $T_{tmp}$ is equal to the transition number (Tb) value of 1. The current sequential symbol (Cs) is obtained by adding the previous sequential symbol (Ps) value of 3 to the temporary transition number $T_{tmp}$ of 1. Since the result of the addition operation equals 4, which is greater than 3, the rolled over number 0 becomes the current sequential symbol (Cs).

In a third cycle 410, the current transition number (T) is 1. Because the transition number T is 1, the temporary transition number $T_{tmp}$ is also 1. The current sequential symbol (Cs) is obtained by adding the previous sequential symbol (Ps) value of 0 to the temporary transition number $T_{tmp}$ of 1. Since the result of the addition operation equals 1, which is not greater than 3, the current symbol (Cs) is equal to 1.

In a fourth cycle 412, current transition number (T) is 0. Because the transition number T is 0, the temporary transition number $T_{tmp}$ is 3.

The current sequential symbol (Cs) is obtained by adding the previous sequential symbol (Ps) value of 1 to the temporary transition number $T_{tmp}$ of 3. Since the result of the addition operation is 4, which is greater than 3, the rolled over number 0 becomes the current sequential symbol (Cs).

Note that even if two consecutive ternary digits Tb and Tc have the same numbers, this conversion guarantees that two consecutive sequential symbols have different state values. Because of this, the guaranteed transition in the sequential symbols 404 may serve to embed a clock signal, thereby freeing the clock line SCL in an I2C bus for data transmissions.

Referring again to FIG. 3, at the receiver 320 the process is reversed to convert the transcoded symbols back to bits and, in the process, a clock signal is extracted from the symbol transition. The receiver 320 receives a sequence of sequential symbols 322 over the two wire physical link (e.g., I2C bus comprising a SCL line 324 and a SDA line 326). The received sequential symbols 322 are input into a clock-data recovery (CDR) block 328 to recover a clock timing and sample the transcoded symbols (S). A symbol-to-transition number converter block 330 then converts the transcoded (sequential) symbols to a transition number, i.e., one ternary digit number. Then, a transition number-to-bits converter 332 converts 12 transition numbers to restore 20 bits of original data from the 12 digit ternary number.

The example illustrated in FIGS. 3 and 4 for a 2-wire bus and 12 transition numbers may be generalized to an n-wire system and m transition numbers. If there are r possible symbol transition states per one T, T0 to Tm−1, m transitions can send $r^m$ different states, i.e., $r=2^n-1$. Consequently, transitions T0 . . . Tm−1 contain data that can have $(2^n-1)^m$ different states.

This technique illustrated herein may be used to increase the link rate of a control bus 108 (FIG. 1) beyond what the I2C standard bus provides and is referred hereto as CCIe mode. In one example, a master device and/or a slave device coupled to the control data bus 108 may implement transmitters and/or receivers that embed a clock signal within symbol transmissions (as illustrated in FIGS. 2, 3, 4, and 5) in order to achieve higher bit rates over the same control data bus than is possible using a standard I2C bus.

Figure 6:
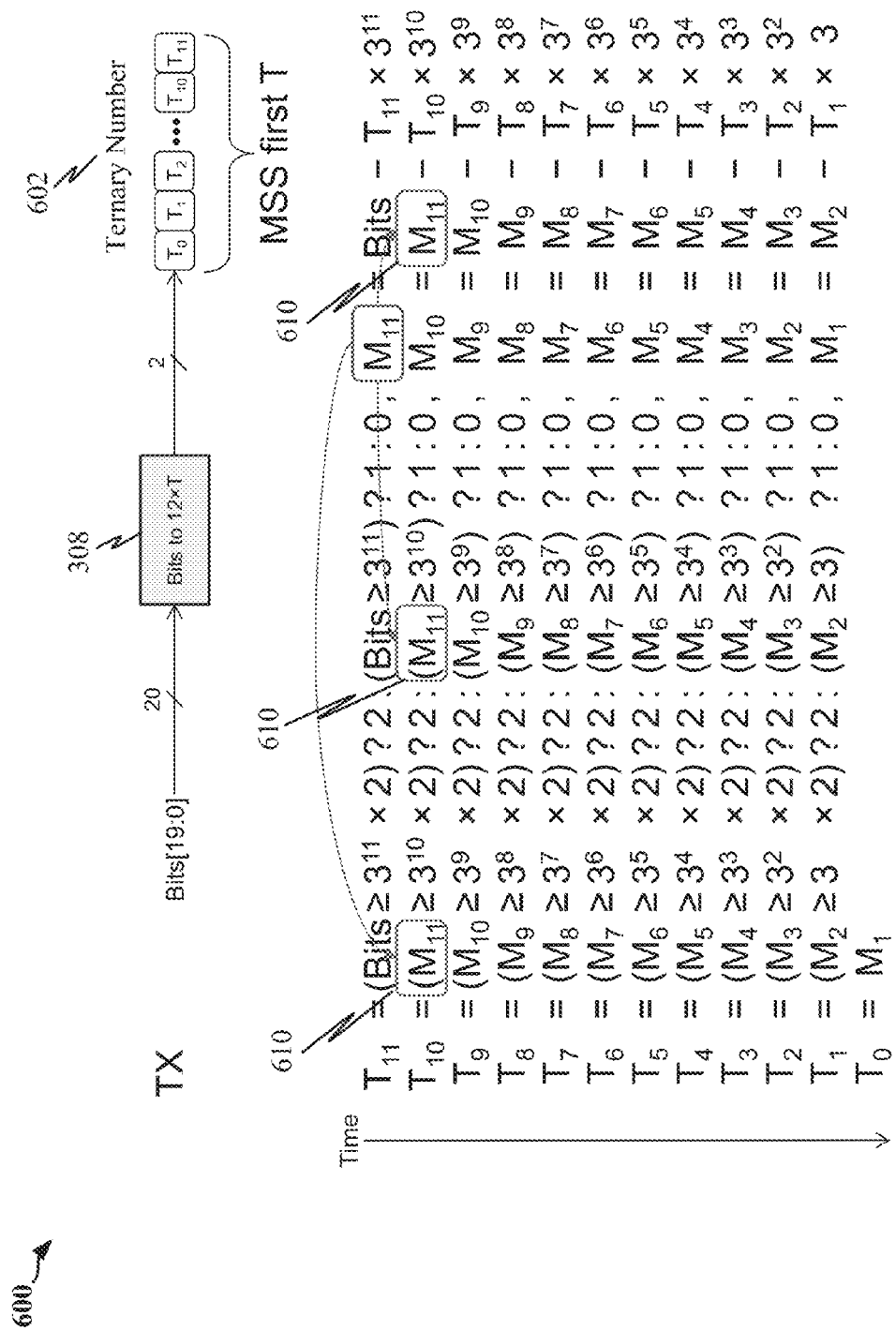
FIG. 6 illustrates a method for converting binary bits into ternary numbers from most significant bit to least significant bit.

FIG. 6 illustrates a method for converting binary bits into ternary numbers from most significant bit to least significant bit. Each digit of a ternary number may be transcoded (converted) into symbols that are transmitted to a receiving device. For a 12 digit ternary number 602 with T0, T1 . . . T11 representing the ternary number, T0 represents the $3^0$ digit (and is the least significant digit) while T11 represents the $3^{11}$ digit (and is the most significant digit). Starting with the received bits (e.g., 20 bit sequence), the most significant digit T11 of the ternary number 602 is obtained first. Then, the next most significant digit T10 is obtained next. This process continues until the least significant digit T0 is obtained. Each of the digit of the ternary number 602 may also referred to as a "transition number".

Figure 7:
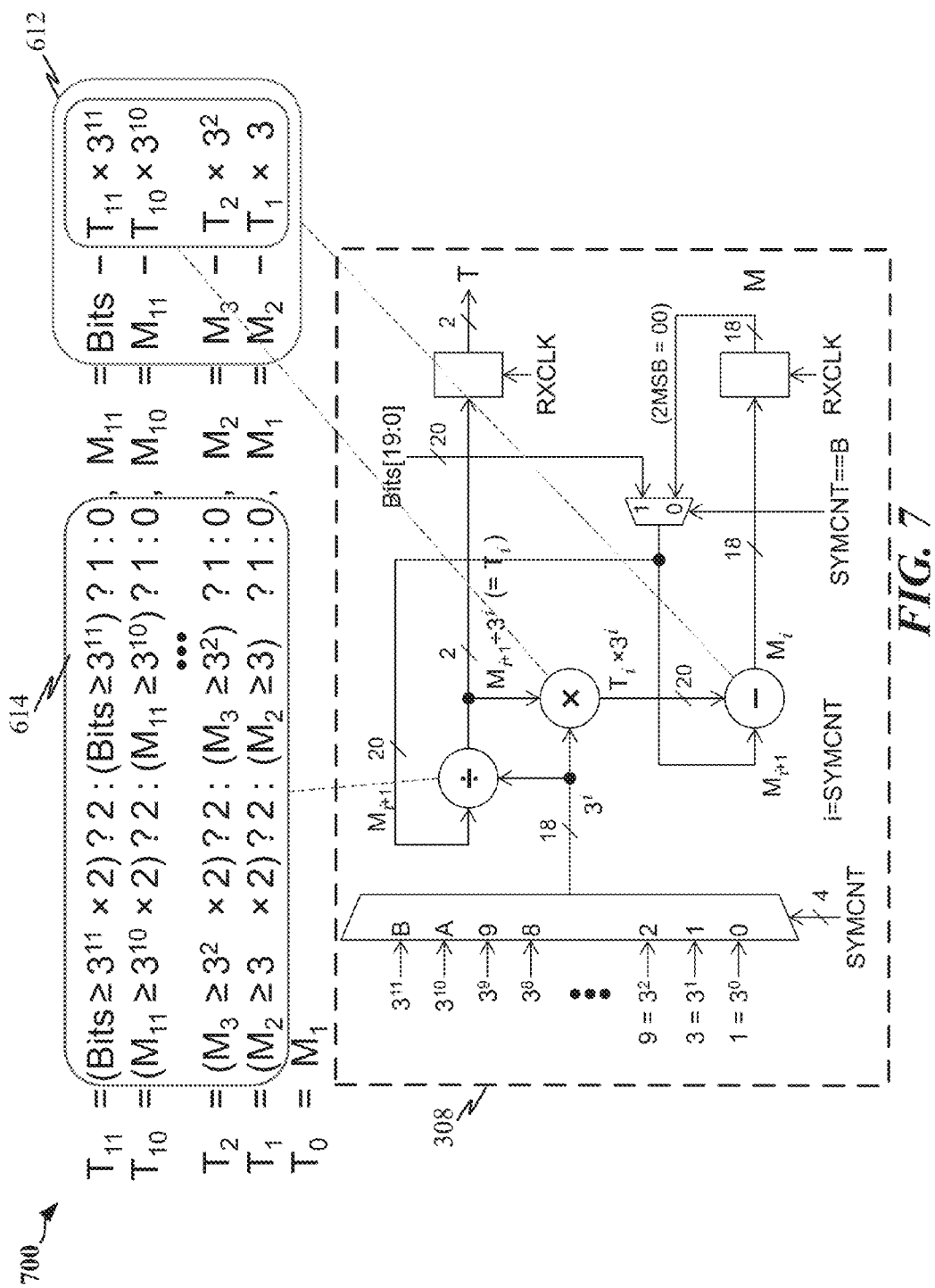
FIG. 7 illustrates a transmitter-side logic circuit for converting binary bits into ternary numbers from most significant bit to least significant bit.

FIG. 7 illustrates a transmitter-side logic circuit for converting binary bits into ternary numbers from most significant bit to least significant bit. FIGS. 6 and 7 illustrate the 12 digit ternary number 602 being sent in order of T11, T10, T9, . . . , T0. By obtaining and sending the most significant bit first, the logic and circuitry involved is simplified in complexity. In the approach in FIGS. 6 and 7, the most significant sequential symbol is transmitted to the receiving device first, and is therefore called MSS first (most significant symbol first). As used herein "least significant symbol" refers to the transcoded symbol corresponding to the least significant digit of the ternary number 602. For example and with reference to the description of FIGS. 4 and 5, when T0 is transcoded into a sequential symbol that is the least significant symbol because it originated from the least significant ternary digit. Similarly, as used herein "most significant symbol" refers to the transcoded symbol corresponding to the most significant digit of the ternary number 602. For example and with reference to the description of FIGS. 4 and 5, when T11 is transcoded into a sequential symbol that is the most significant symbol because it originated from the most significant ternary digit. And when the symbol-to-transition number converter block 330 (FIG. 3) subsequently receives and converts the transcoded (sequential) symbol to a transition number, i.e., a digit of a ternary number it will be the most significant digit T11 first, and least significant digit T0 last.

Referring back to FIG. 3, the original data of twenty bits is converted into a ternary number in reverse order (i.e., the most significant bit is supplied to a converter first), then each digit of the ternary number (e.g., each transition number) is converted (i.e., transcoded) to a sequential symbol in reverse order, and these transcoded symbols are transmitted on the bus in reverse order (i.e., most significant symbol first).

Figure 8:
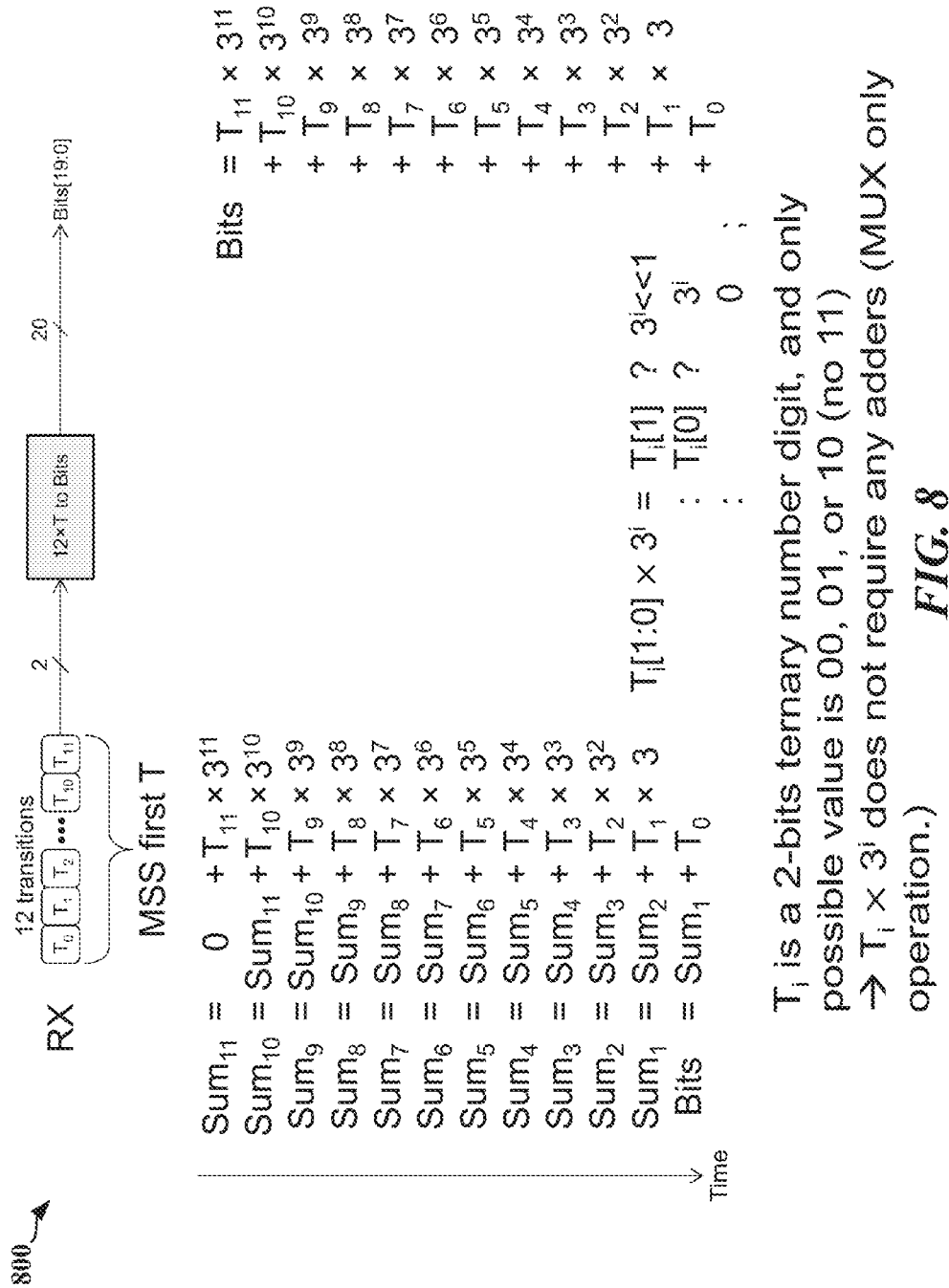
FIG. 8 illustrates a method for converting ternary numbers into binary bits from most significant bit to least significant bit.

FIG. 8 illustrates a method for converting ternary numbers into binary bits from most significant bit to least significant bit. That is, this receiver-side conversion reverses the operations performed in the transmitter-side conversion illustrated in FIGS. 6 and 7. A receiving device (e.g., a slave device) receives the reverse order transmission and performs clock recovery and symbol sampling to convert the transcoded symbols back to a ternary number which is then supplied in reverse order to the logic circuit in FIG. 9 which converts the ternary number back to the 20 bit binary original data. FIG. 7 illustrates a multiplexer with twelve inputs coupled to a single output to a logic device.

Figure 9:
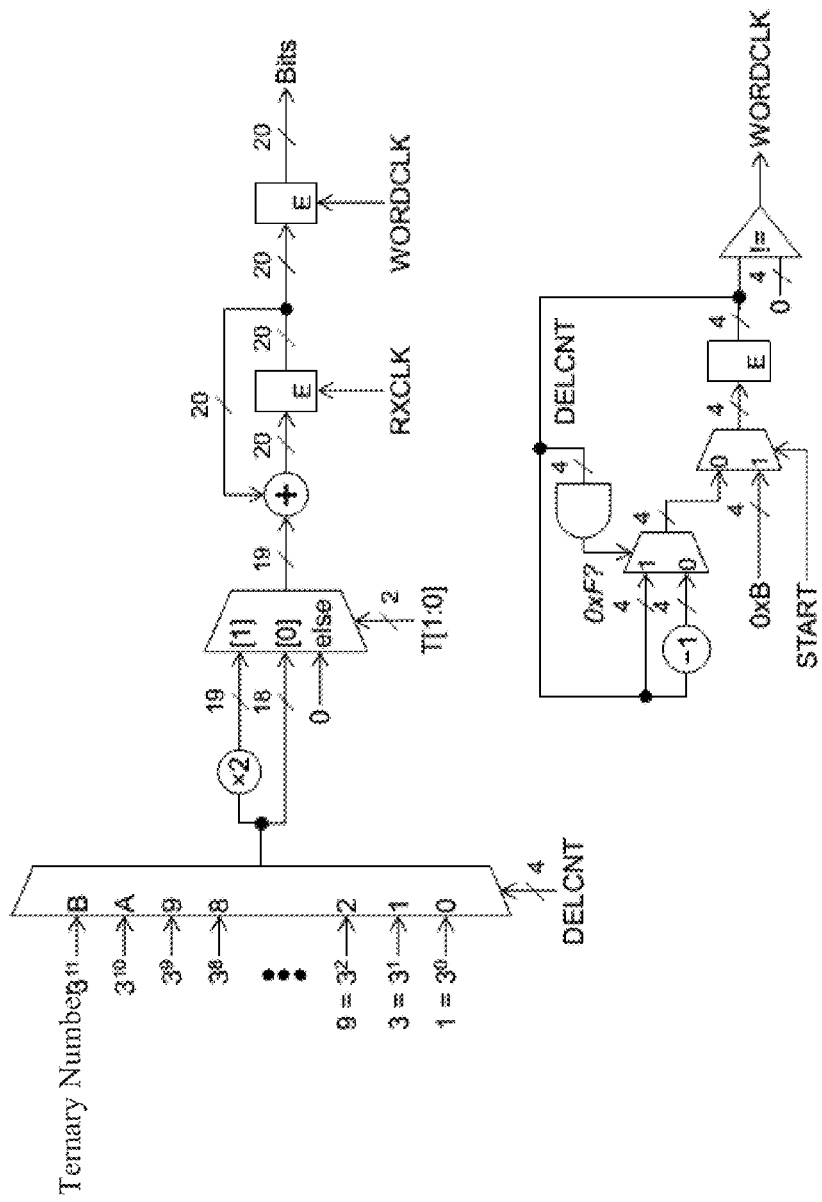
FIG. 9 illustrates a receiver-side logic circuit for converting a twelve digit ternary number into twenty bits.

FIG. 9 illustrates a receiver-side logic circuit for converting a twelve digit ternary number into twenty bits.

FIG. 10 conceptually illustrates a bit 19 (i.e., the $20^{th}$ bit when the bit count starts at the first bit being bit 0) is mostly unused in the CCIe protocol and may be used for commands between devices on the shared bus. That is, as a result of the encoding scheme illustrated in FIGS. 3-9, an extra bit (i.e., bit 19) is now available in the transmitted symbols. More specifically, FIG. 10 illustrates the bit 19 (i.e., the $20^{th}$ bit). In other words, as is typical in the computer sciences, counting bit wise begins at zero, and bit 19 is the $20^{th}$ bit. Here, the bits 0-18 are represented within the ternary number range of $0000\_0000\_0000_3$ to $2221\_2201\_2001_3$. The ternary numbers in the range of $2221\_2201\_2002_3$ to $2222\_2222\_2222_3$ are unused. Consequently, the ternary number range $2221\_2201\_2002_3$ to $2222\_2222\_2222_3$ may be used to represent bit 19 (i.e., $20^{th}$ bit). In other words, $2221,2201,2002_3$ ternary is 10,000,000,000,000,000,000 binary (0x80000 hexadecimal) and $2222\_2222\_2222_3$ ternary (0x81BF0) is the largest 12 digit ternary number possible.

Exemplary Protocol for CCIe Mode

FIG. 11 illustrates an exemplary general call for CCIe mode entry indicator that may be sent by a master device over a shared bus to indicate to slave devices that the shared bus is switching to operate from I2C mode to CCIe mode. The general call 1102 may be issued by an I2C master device over the shared bus (e.g., master device 112 in FIG. 1 while in I2C mode over SDA line and SCL line) to indicate a transition from I2C mode to CCIe mode to all I2C-compatible devices.

In I2C mode, the CCIe master device issues this I2C general call 1102 with a "CCIe mode" byte or indicator 1104. The CCIe-compatible slave devices acknowledge receipt of the general call 1102. CCIe-compatible slave devices can insert wait cycles by holding the SCL line (of the control data bus 108) low during the general call if necessary.

Once in CCIe mode, all CCIe-compatible devices are able to respond to requests from the CCIe master device. Operational states or any functionalities of legacy I2C-compatible slave devices on the shared control data bus that do not support CCIe mode are not be affected by any CCIe transactions.

FIG. 12 illustrates an exemplary CCIe call 1202 that may be issued by a CCIe master device (e.g., master 112 in FIG. 1 while in I2C mode) to indicate a transition from CCIe mode to I2C mode to all CCIe able devices. The CCIe master device may issue this exit call 1202 in place of CCIe SID.

In CCIe mode, after the last data in CCIe mode followed by S, the CCIe master sends special CCIe SID code, "Exit" code/indicator 1204, to indicate (e.g., to CCIe-compatible devices) the end of CCIe mode and transition back to I2C mode. Additionally, after the "exit" code/indicator 1204, the CCIe master device sends S (start-bit) followed by "general call" 1206, according to the I2C protocol, with an "exit" code 1208 at the 2nd byte within I2C protocol. All CCIe capable slaves must acknowledge to the general call 1204.

FIG. 13 illustrates an exemplary CCIe slave identifier (SID) word format. This illustrates the use of a 16-bit slave identifier (SID) 1304 as part of the CCIe SID word format 1302. Such SID word format would be used to identify a particular slave device when the word is place on the control data bus.

FIG. 14 illustrates an exemplary CCIe address word format 1402. This illustrates that each address word 1406 includes a 16-bit address 1404. The address word 1406 also includes a 2-bit control code 1408 and a 1-bit error detection constant 1410. The table 1412 illustrates various possible values for the control code.

Multiple address words may be sent sequentially. If the current control word is '00', this means an address word will follow. If the control code is '01', the next data word is a write data word. If the control code is '01', the next data word is one word read data word. The control code is '11' is prohibited.

FIG. 15 illustrates an exemplary write data word format 1502. This illustrates that each data word 1500 includes a 16-bit write data portion 1502. The write data word 1500 also includes a 2-bit control code 1504, and 1-bit error detection constant 1510. The table 1514 illustrates various possible values for the control code.

Multiple write data words can be sent sequentially. If the control code of the current write word is '00' (symbol C0), then the data is to be written to the previous address. If the control code of the current write word is '01' (symbol C1), then the data is to be written to the previous address+1. If the control code is '10' (symbol E), the next word will be a SID or an Exit code.

FIG. 16 illustrates an exemplary read specification word format 1600. The read specification data word 1600 may include a 16-bit read data value portion 1604, a 2-bit control code 1608, and 3-bit error detection constant 1610.

After the last address word 1607, a "read spec" (RS) word 1612 follows. The read spec (RS) word 1612 specifies the number of read data words that follows. As illustrated in the table 1616, the control code '00' is used to indicate a read word from the same address. The control code '01' is use to indicate a read words from incremental address. The slave device (from where the data is being read) shall not send more data words (not including CHK words) than specified by the "read spec" (RS) word 1604. The slave device shall send at least one read word (not including CHK word). The slave device may end a read transfer before sending the number of words specified by the "read spec" (RS) 1604 word.

FIG. 17 illustrates an exemplary read data word format 1702. The read data word 1702 may include a 16-bit read data value portion 1704, a 2-bit control code 1706, and 1-bit error detection constant 1708. A slave device addressed by the SID 1707 determines the number of words to return to a requesting master device. As illustrated in table 1716, the control code is "00" (symbol R0) if the read word continues from the same address. Control code is "01" (symbol R1) if the read word continues from an incremental address. The control code is "10" (symbol E) if the word is the last read word and there's no CHK after that. Control code is "00" is prohibited.

Exemplary I2C Transmissions Versus CCIe Transmissions Over Shared Bus

FIG. 18 illustrates an exemplary timing diagram of an I2C one byte write data operation. In this example, the shared control data bus 108 (FIG. 1) includes a serial data line SDA 18 02 and a serial clock line SCL 1804. The transmission scheme illustrated in FIG. 18 may be referred to as "I2C mode". The SCL line 1804 is used to send a clock from the master device to all slave devices while the SDA line 1802 transmits data bits. An I2C master device sends a 7-bit slave ID 1808 in the SDA line 1802 to indicate which slave device on the I2C bus the master device wishes to access, then one bit to indicate a write operation. Only the slave device whose ID matches with the 7-bit slave ID 1808 can cause intended actions. In order for an I2C slave device to detect its own ID, the master device has to send at least 8-bits on the SDA line (or 8 clock pulses on the SCL line 2204).

The I2C standard requires that all I2C compatible slave devices reset their bus logic on receipt of a START condition 1806 (e.g., indicated by a high-to-low transition on the SDA line while the SCL line is high).

The CCIe protocol uses both the SDA line 1802 and the SCL line 1804 for data transmissions while embedding a clock signal within the data transmissions. For example, data bits may be transcoded into a plurality of symbols which are then transmitted over lines. By embedding the clock signal (SCL line for I2C bus in FIG. 18) within symbol transitions, both the SDA line 1802 and SCL line 1804 may be used for data transmission.

FIG. 19 illustrates an exemplary CCIe transmission in which data bits have be transcoded into twelve symbols for transmission over the SDA line 1902 and the SCL line 1904. The transmission scheme illustrated in FIG. 19 may be referred to as "CCIe mode". CCIe mode is source synchronous, driven by push-pull drivers. Whoever sends out data over the shared control data bus also sends out clock information embedded in the data (e.g., within the symbol-to-symbol transitions). Consequently, only one device on the control data bus is allowed to drive the share control data bus at any one time.

In order to support both legacy I2C devices and CCIe devices over the same bus, CCIe mode operations use the same START condition 1906, 1908, 1910, which prevents legacy I2C slave devices from reacting to any CCIe operations (e.g., the Start condition during CCIe mode causes the legacy I2C slave devices to reset). In this example, the START condition 1906, 1908, 1910 (i.e., indicated by a high to low transition on the SDA line 1902 while the SCL line

1904 is high) is detected before a full slave ID (i.e., a full 7 bits) is transmitted, therefore this is an incomplete slave ID (less than 7 bits). If a master device sends 6 SCL pulses then issues a START condition 1906, 1908, 1910, then all legacy I2C slave devices reset their bus logic before they recognize the data as an I2C Slave ID. Since the 6-bit sequences (e.g., corresponding to every two symbols) are sent between two START conditions 1906, 1908, 1910, these 6-bit sequences are not decoded as a valid slave ID by any I2C slave device. Consequently, legacy I2C slave devices will not act upon the incomplete Slave IDs.

In this system, the master device controls access to the bus. So, any device that wishes to transmit over the control data bus must typically request such access from the master device, for example, by issuing an interrupt request. Prior art mechanisms for issuing interrupts have relied on dedicated interrupts lines or a dedicated interrupt bus. However, such dedicated interrupt lines or bus means that the devices must include at least one additional pin to accommodate such interrupt line or bus. In order to eliminate the need for such dedicated interrupt pin and lines/bus, a mechanism for in-band interrupts within CCIe is needed.

The use of in-band interrupts should also avoid bus contention or collisions. For example, to avoid collisions, a slave device should not be allowed to drive the control data bus (e.g., either SDA line 1802 or SCL line 1904) to assert an IRQ while the master device is driving the control data bus.

Exemplary Bit 19 Region and Checksum

FIG. 20 illustrates an exemplary mapping of the $20^{th}$ bit (bit 19) resulting from the encoding scheme illustrated in FIGS. 2-10. As can be appreciated, the ternary numbers available may serve to expand the features and capabilities between master devices and slave devices. For example, this ternary number space available within bit 19 (i.e., the data region whose bit 19 is '1') may serve to facilitate or indicate: (a) slave-to-slave transmissions, (b) checksums for transmissions, (c) master operation handover to slave devices, (d) a heartbeat clock, etc.

FIG. 21 illustrates details of a sub-region within the exemplary mapping of the $20^{th}$ bit (bit 19) region of FIG. 20.

SID Scanning Functionality

According to one aspect, it may be desirable for a master device to efficiently scan for all devices coupled to the control data bus. For example, the master device may scan for all slave devices coupled to the control bus when the master device boots up.

FIG. 22 illustrates one example 2200 of a CCIe transmission that includes an SID "Scan All" command 2202 and its corresponding payload 2204. The SID "Scan All" command 2202 (identified by "0x4" code) may be issued by a master device. The payload 2204 may include a plurality of Unit Scan IDs 2210. Each Unit Scan ID 2210 includes an SID Mask Pair 2208 and a Response period 2206. The SID Mask Pair 2208 may define a mask that identifies a single bit position within an SID to inquire about.

As illustrated in the table 2220, the 32-bit SID Mask Pair 2208 (spread over two 16-bit data D0 and D1 serves to identify whether a particular bit location of a 16-bit SID is being queried and, if so, for which value (i.e., 0 or 1) it is being queried. For instance, bit [1] of the SID Mask Pair 2208 may define whether bit [0] of an SID is to be checked or masked (i.e., not checked). If bit[1] indicates "check", then bit[0] of the SID Mask Pair 2208 defines whether the inquiry is for "0" or "1".

A period defined by the Response 2206 allows slave devices to respond to the SID inquiry in-band over the shared bus. For each Unit SID inquiry 2210, each slave device whose non-masked SID bit matches the inquiry bit (i.e., the slave device's SID has a bit at the inquired bit location that matches the inquiry bit) sends an inquiry response in-band over at least one line of the shared bus. This allows the master device to ascertain whether or not any slave device on the bus has a partially matching SID (i.e., an SID that has a bit at the inquired bit location that matches the inquiry bit).

Multiple Unit SID Inquiries 2210 are sent by the master device to fully identify the SID for all devices coupled to the shared bus.

The "Scan All" command 2202, or a variant thereof, may be issued on occasions that are not directly related to boot up of the master. In one example, the master device may scan for all slave devices coupled to the control bus in order to check whether all slave devices are in synchronization. In this example, the master device need not necessarily execute a complete "blind scan" (see FIGS. 26-42, for example), and the master may issue inquiries without masks and/or with masks that do not exclude any SID bits from comparison because the master device may already know which slave devices are coupled to the bus. In another example, the master device may scan for all slave devices coupled to the control bus in order to check whether one or more specific devices are in synchronization. In this example, the master device may send only one unit SID inquiry for each slave device to be scanned.

FIG. 23 illustrates an example of one algorithm 2300 that may be used to scan for SIDs. The algorithm 2300 may operate by iteratively masking SID bits and requesting each slave device that has a bit matching the unmasked bit sends a response. In one example, the SID bits may be iteratively masked from least significant bit to most significant bit, although other masking sequences may be adopted.

FIG. 24 illustrates a timing diagram for an SID Scan Response word, "RESP" 2206, over a shared bus comprising an SDA line and a SCL line. In this example, an SID scan response 2430 is identified by ternary number 2222_2221_21013 or hex 0x81B8F which is equal to the twelve-symbol sequence 3131_3130_2323. These symbols are transmitted over the SDA line 2426 and SCL line 2427. To allow the slave devices to use the SDA line 2426 to respond to an SID scan inquiry during a response period 2406, the master device releases the SDA line. Each receiver device then masks the SDA line input to its clock data recovery circuit (CDR) for the response period 2406. The master toggles (changes states of) the SCL line so that each receiver device is able to recover a clock from such toggling on the SCL line while the SDA line is in use.

According to the CCIe protocol, a receiving slave device may detect, for example, the nth RXCLK 2414 after the start S indicator 2412. The nth RXCLK 2414 may trigger an internal SDA mask 2424 to internally (e.g., within a receiving slave device) mask the SDA line 2426.

At the n+1 RXCLK 2416, the slave device may assert/ issue a response by pulling the SDA line 2426 low. The SDA line 2426 is weakly pulled high by the master device, so that when it is pulled low (by a slave device) this serves to indicate a positive response to the SID scan inquiry. By weakly pulling the SDA line 2426 high, this allows a slave device to pull the SDA line 2426 low to assert the response to the SID scan inquiry.

Rather than waiting until the next clock cycle, between the n+1 RXCLK 2416 but before the n+2 RXCLK 2418, the master device may monitor the SDA line 2426 to ascertain if and/or when it goes low, meaning a response has been asserted/issued. Note that such monitoring of the SDA line 2426 by the master device may be performed only during the response period 2406 to asynchronously detect any asserted/issued response from slave devices.

At the n+2 RXCLK 2418, the slave device may release the SDA line 2426.

Between n+2 RXCLK 2418 and n+3 RXCLK 2420, the master device may re-enable its SDA line driver and starts driving the SDA line 2426 high. Consequently, the receiver device (e.g., asserting slave device) can safely release SDA mask 2424 at n+3 RXCLK 2420.

At the n+3 RXCLK 2420, the slave device may release the SDA mask 2424. In this manner, an SID scan response may be transmitted by a slave device during the response period 2406 defined on the SDA line 2426.

FIG. 25 is a flowchart 2500 illustrating a scan sequence that may be iteratively performed to find the SIDs of a plurality of devices coupled to a serial bus. The scan includes transmitting an inquiry on the serial bus that includes SID bits 2530 and a mask 2532. A slave device coupled to the serial bus applies the mask 2532 to its own unique SID such that, for example, masked bits are forced to binary 0. The slave device may then compare its masked SID with the SID bits 2530 transmitted in the inquiry. If the comparison yields a match, then the slave device drives the SDA line 2426 low to signal the occurrence of the match to the master device during the response period 2406. The master device may then transmit a new inquiry after modifying the mask to reduce the number of bits that are eliminated from comparison at the slave device. The master device can discover the SID of the slave device bit position by bit position. In the example illustrated in the flowchart 2400, the master looks for SID bit positions with a value of zero, and if no response occurs, the master scans for a slave device with a binary 1 value in the SID bit position.

It will be appreciated that multiple devices may respond to an inquiry when the mask operates to mask at least one bit position. When the mask allows all bits to be tested in an SID, the SID bits correspond to a unique SID and only the slave device associated with the unique SID can be expected to respond to the inquiry.

When the SDA line 2426 is driven low in response to any inquiry, the master device may note that at least one slave device is responding to its SID scan inquiry. The master device may then test the remaining SID bits until the unique SID of a first slave device is discovered. The master device may then "back-track" to find other slave devices that may have responded to the same inquiries as first slave device. For example, a second slave device may have an SID that has a certain number of least significant bits that are identical to the same number of bits in the SID of the first slave device. The master device may return to each previous inquiry where the most significant bit (MSB) that was unmasked (the effective MSB) in the SID bits was set to 0, and the master device may transmit an inquiry with the effective MSB set to a value of 1. This approach can discover one or more slave devices which responded to one or more inquiries in tandem with a discovered slave device. In other words, back-tracking revisits and searches paths that were not covered during a preceding scan.

When the master device receives no response to an inquiry, it may refrain from sending further inquiries that include the SID bit configuration in the inquiry.

The flowchart 2500 illustrates a scan process followed from a given point in the scan sequence. Initially, all of the SID bits may be set to 0 and the mask may be set to block comparison by the slave devices of all but the least significant bit (LSB) of their unique SIDs, The process commences at block 2502, where the master device determines the starting point for a scan. The starting point may be an initial starting point or a resumption of a scan after an SID has been discovered. The starting point may be defined as a current mask 2532 and current SID bits 2530. At block 2504, the master device sends an inquiry with the current mask 2532 and current SID bits 2530. Slave devices receive the inquiry and mask their respective unique SIDs using the mask 2532 provided in the inquiry. In one example, masking leaves a certain number of least significant bits as the masked SID. The slave device may drive the SDA line 2426 low if the masked SID matches the SID bits 2530 received in the inquiry.

The master device considers the assertion of the SDA line 2426 as confirmation that slave device has a unique SID that has at least some bits that match the SID bits 2530 transmitted in the inquiry. Accordingly, the master device may determine that the SDA line 2426 has been asserted at block 2506, and may proceed to block 2516. At block 2516, the master device determines whether the mask 2532 caused any bit in the slave SID to be ignored during comparison. If not, then at block 2518 the master devices determines that a slave device has an SID that exactly matches the SID bits sent in the inquiry. If at block 2516 it is determined that the mask 2532 blocked one or more bits of the slave SID from consideration, the process continues at block 2520. At block 2520, the master device may modify the mask such that a next more significant bit of the slave SID is compared to the SID bits 2530 to be transmitted in the next inquiry. The master device may clear the current MSB of the SID bits 2530 at block 2522. The scan may then resume at block 2504 with the updated mask 2532 and SID bits 2530. In some instances, the master device may skip sending an inquiry for the bit configuration generated at step 2524. At block 2526, the master device may determine whether a previous positive response was received. If no previous response is determined to have been received, then the scan continues at block 2504. If it is determined at block 2526 that a previous response has been received, then at least one slave device has the bit configuration generated at step 2524 because the alternative value for the MSB (=0) induced no response from the at least one slave device. Accordingly, the scan may continue at block 2512.

If at block 2506 the master device determines that the SDA line 2426 was not asserted in response to an inquiry, the process continues at block 2508. At block 2508, the master device may optionally tag the current SID bits 2530 as a bit pattern that does not occur in an SID of any slave device coupled to the serial bus. The master device may then refrain from scanning for any device with the current SID bits in bit positions corresponding the mask 2532. The process then continues at block 2510, where the master device determines whether the current MSB of the SID bits 2530, as defined by the operation of the mask 2532, is set to 0. If the current MSB of the SID bits 2530 is determined to be set to 1 at block 2510, then it can be assumed that no device responded to an inquiry with the current MSB set to 1 or 0 and the scan may be terminated at block 2528. It will be appreciated that block 2528 may be reached when no slave devices respond to any inquiry in the scan sequence.

If the current MSB of the SID bits 2530 is determined to be set to 0 at block 2510, then at block 2524 the current MSB of the SID bits 2530 is set to a value of binary 1. The scan then proceeds to block 2526 with the updated SID bits 2530.

If at block 2526, it is determined that no previous response has been received in the current scan, then the scan continues at block 2504 where an inquiry is sent with the current MSB set to 1. If at block 2526, a prior response was received, then it can be assumed that a slave device that did not respond to the inquiry with the current MSB set to 0, will respond to an inquiry with the current MSB set to 1. Accordingly, the inquiry with the current MSB set to 1 need not be sent and the scan proceeds to block 2512. At block 2512, the master device determines whether the mask 2532 caused any bit in the slave SID to be ignored during comparison. If not, then it is determined that an SID has been identified and the current scan may terminate at block 2514.

If it is determined at block 2512 that the mask 2532 blocked one or more bits of the slave SID from consideration, the process continues at block 2520. At block 2520, the master device may modify the mask such that a next current MSB of the slave SID is compared to the SID bits 2530 to be transmitted in the next inquiry. The master device may clear the current MSB of the SID bits 2530 at block 2522. The scan then resumes at block 2504 with the updated mask 2532 and SID bits 2530.

The master device may track any mask 2532 and SID bits 2530 combination that resulted in an assertion of the SDA line 2426, and may initiate a new scan based on one or more of these mask 2532 and SID bits 2530 combinations. In one example, the master device may initiate a new scan (e.g., the flowchart 2500) after discovering a first SID, or after realizing that no slave device has the SID pattern subset when no response is received from an inquiry with the MSB bit set to 1. The new scan begins at the last SDA line 2426 assertion in response to SID bits 2530 with an MSB value of 0, where the MSB value is determined by the action of a corresponding mask 2532.

FIGS. 26-41 illustrate various the results of an iterative SID scan according to certain aspects disclosed herein. The SID scan may be performed using the process illustrated in FIG. 25, for example, and a scan sequence is depicted in FIGS. 26-41, which illustrate progression of a scan sequence with respect to an SID Bit Index 2602. For the purposes of this description, a scan is performed when three slave devices are coupled to the serial bus. A first slave device may have a device identifier SID0 equal to hexadecimal number 0x402A or binary number 0100_0000_0010_1010. A second slave device may have a device identifier SID1 equal to hexadecimal number 0x113E or binary number 0001_0001_0011_1110. A third slave device may have a device identifier SID2 equal to hexadecimal number 0x0908 or binary number 0000_1001_0000_1000.

As illustrated in FIG. 26, starting with the least significant bit 2604 of a 16-bit SID, the master device sends an inquiry requesting that all slave devices with a '0' in the least significant bit (bit 0) of their SIDs respond by holding the SDA line 2426 low, for example. All three slave devices respond in the example of the three SIDs illustrated in FIG. 26.

As illustrated in FIG. 27, the inquiry process is repeated for bit 1 2704 and an inquiry requesting that all slave devices with a '0' in that bit position of their SIDs respond. Only the slave device having the SID 0x0908 (SID2) responds by holding the SDA line 2426 low.

As illustrated in FIG. 28, the inquiry process is repeated for bit 2 2804 and an inquiry requesting that all slave devices with a '0' in that bit position of their SIDs respond. The slave device having the SID 0x0908 (SID2) responds.

As illustrated in FIG. 29, the inquiry process is repeated for bit 3 2904 and an inquiry requesting that all slave devices with a '0' in that bit position of their SIDs respond. No slave device responds.

As illustrated in FIG. 30, the inquiry process may be repeated for bit 3 2904 and an inquiry requesting that all slave devices with a '1' in that bit position of their SIDs respond. The slave device having the SID 0x0908 (SID2) would respond. However, because the master device knows that a positive response will be made here, no inquiry need be made by the master device. Instead, the master device may simply set the "1" value in the SID Bit index 2602 and move on to bit 4 3104 (FIG. 31).

As illustrated in FIG. 31, the inquiry process is iteratively repeated for bit 4 3104 through bit 7 3106 and an inquiries requesting that all slave devices with a '0' in the corresponding bit positions of their SIDs respond. The slave device having the SID 0x0908 (SID2) responds to each of these separate inquiries.

As illustrated in FIG. 32, the inquiry process is repeated for bit 8 3204 and an inquiry requesting that all slave devices with a '0' in that bit position of their SIDs respond. No slave device responds.

As illustrated in FIG. 33, because the master device knows that a positive response will be made for an inquiry of "1" at bit 8 3204, no inquiry need be made by the master device. Instead, the master device may simply set the "1" value in the SID Bit index 2602 and move on to bit 9 3204.

Generally, this process of inquiring using for a bit equal to '0' until no response is received and then switching to a bit equal to '1' is repeated until the full SID for a first device is found.

As illustrated in FIG. 34, the inquiry process is iteratively repeated for bit 9 3404 through bit 15 3406. The slave device having the SID 0x0908 (SID2) responds to each of these separate inquiries. Since all 16 bits of the SID have been checked, the slave device associated with SID2 0x0908 is positively identified.

Having identified the slave device SID2, FIG. 35 illustrates that the inquiry process is now backtracked to try to identify another slave device along this path. This backtracking process is repeated until no slave device responds. At each of the backtracked bit positions, the master device performs the inquiry with a previously untested value. For example, at bit 15, the inquiry uses '1' for its backtracked inquiry. The, at bit 14, the inquiry uses '1' for its backtracked inquiry.

FIG. 36 illustrates that, having backtracked and eliminated all possible paths down to bit 1 2704, the inquiry process continues for bit 1 2704, which is the first inquiry for which the "back-tracking" gets a response. An inquiry is transmitted requesting that all slave devices with a '1' in that bit position of their SIDs respond. The slave device having the SID 0x402A (SID0) and the slave device having the SID 0x113E (SID1) respond by holding the SDA line 2426 low.

FIGS. 37 and 38 illustrate the inquiry process continuing until all 16 bits of the SID have been checked, the slave device associated with SID0 0x402A is positively identified.

FIG. 39 again illustrates the backtracking process in search of more matching SIDs.

FIG. 40 illustrates that, having backtracked and eliminated all possible paths down to bit 2 2804, the inquiry process continues for bit 2 2804 and an inquiry requesting that all slave devices with a '1' in that bit position of their SIDs respond. Only the slave device having the SID 0x113E (SID1) responds by holding the SDA line 2426 low.

FIG. 41 illustrates the inquiry process continuing until all 16 bits of the SID have been checked, the slave device associated with SID1 0x113E is positively identified.

FIG. 42 again illustrates the backtracking process in search of more matching SIDs until all alternative bits have been tested for this path.

The master device may map or otherwise track SID values used in inquiries that resulted in a positive response and track SID values used in inquiries that yielded no response.

The master device may employ this SID Scan All command to scan for all SIDs for newly plugged as well as pre-existing devices coupled to a shared control data bus. It will be appreciated that the master device is not restricted to specific order in which it traverses the SID bit index 2602. In the example, the described herein, the SID bit index 2602 is traversed from bit 0 to bit 15. In another example, the SID bit index 2602 may be traversed from bit 15 to bit 0. In other examples, the described herein, the SID bit index 2602 may be traversed in a non-linear and/or random or pseudorandom order, where for example slave devices are expected to be provided with SIDs that have been assigned according to a particular order or scheme.

Supporting Hot-plugging with an SID Scan

According to one aspect, it may be desirable to "hot-plug" a device (e.g., a slave device) to the shared control data bus after the shared bus and/or master device are operational. However, allowing a device to be coupled to the control data bus after an initial boot up of a master device that controls the data bus requires some way of allowing a master device to detect the newly plugged slave device (or inactive master device). To accomplish such "hot-plug" functionality, a newly plugged in slave device may send an IRQ signal to the master device (e.g., via a dedicated IRQN) and using the longest possible signal period. The master device may then issue an "SID Scan New" command to scan all slave devices coupled to the shared control data bus that have not been previously scanned and identify the newly added slave device.

According to one aspect, a slave device that supports SID scanning can store information that indicates whether its SID has been scanned after power-up. For instance, once a device has been scanned for its SID, the slave device may set an internal register indicating that it has already been scanned. This register allows the previously scanned slave device to ignore the SID Scan New command, so only newly plugged devices respond.

Devices that are newly coupled to the shared control data bus, including devices which have SIDs that have not been previously scanned, are typically required and/or expected to respond to this SID scan new command. Devices which have SIDs that have been previously scanned need not respond to the "SID Scan New" command.

FIG. 43 illustrates one example 4300 of a CCIe transmission that includes an SID "Scan New" command 4302 and its corresponding payload 4304. The SID "Scan New" command 4302 (identified by "0x5" code) may be issued by a master device. The payload 4304 may include a plurality of Unit Scan IDs 4310. Each Unit Scan ID 4310 includes an SID Mask Pair 4308 and a Response period 4306. The SID Mask Pair 4308 may define a mask that identifies a single bit position within an SID to inquire about. Because this is an SID Scan New command 4302, all previously scanned devices may ignore it. Consequently, only devices that are newly plugged into the shared bus are identified.

As illustrated in the table 4320, the 32-bit SID Mask Pair 4308 (spread over two 20-bit words D0 and D1) serves to identify whether a particular bit location of a 16-bit SID is being queried and, if so, for which value (i.e., 0 or 1) it is being queried. For instance, bit [1] of the SID Mask Pair 4308 may define whether bit [0] of an SID is to be checked or masked (i.e., not checked). If bit[1] indicates "check", then bit[0] of the SID Mask Pair 4308 defines whether the inquiry is for "0" or "1".

A period defined by the Response 4306 allows slave devices to respond to the SID inquiry in-band over the shared bus. For each Unit SID inquiry 4310, each slave device whose non-masked SID bit matches the inquiry bit (i.e., the slave device's SID has a bit at the inquired bit location that matches the inquiry bit) sends an inquiry response in-band over at least one line of the shared bus. This allows the master device to ascertain whether or not any slave device on the bus has a partially matching SID (i.e., an SID that has a bit at the inquired bit location that matches the inquiry bit).

Multiple Unit SID Inquiries 4310 are sent by the master device to fully identify the SID for all devices coupled to the shared bus.

Scanning or discovery of the SID for newly hot-plugged slave devices may be performed as illustrated in FIGS. 25-42.

FIG. 44 is a conceptual diagram 4400 illustrating a simplified example of a hardware implementation for an apparatus employing a processing circuit 4402 that may be configured to perform one or more functions disclosed herein. In accordance with various aspects of the disclosure, an element, or any portion of an element, or any combination of elements as disclosed herein may be implemented using the processing circuit 4402. The processing circuit 4402 may include one or more processors 4404 that are controlled by some combination of hardware and software modules. Examples of processors 4404 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 4404 may include specialized processors that perform specific functions, and that may be configured, augmented or controlled by one of the software modules 4416. The one or more processors 4404 may be configured through a combination of software modules 4416 loaded during initialization, and further configured by loading or unloading one or more software modules 4416 during operation.

In the illustrated example, the processing circuit 4402 may be implemented with a bus architecture, represented generally by the bus 4410. The bus 4410 may include any number of interconnecting buses and bridges depending on the specific application of the processing circuit 4402 and the overall design constraints. The bus 4410 links together various circuits including the one or more processors 4404, and storage 4406. Storage 4406 may include memory devices and mass storage devices, and may be referred to herein as computer-readable media and/or processor-readable media. The bus 4410 may also link various other circuits such as timing sources, timers, peripherals, voltage regulators, and power management circuits. A bus interface 4408 may provide an interface between the bus 4410 and one or more transceivers 4412. A transceiver 4412 may be provided for each networking technology supported by the processing circuit. In some instances, multiple networking technologies may share some or all of the circuitry or processing modules found in a transceiver 4412. Each transceiver 4412 provides a means for communicating with various other apparatus over a transmission medium. Depending upon the nature of the apparatus, a user interface 4418 (e.g., keypad, display, speaker, microphone, joystick) may also be provided, and may be communicatively coupled to the bus 4410 directly or through the bus interface 4408.

A processor 4404 may be responsible for managing the bus 4410 and for general processing that may include the execution of software stored in a computer-readable medium that may include the storage 4406. In this respect, the processing circuit 4402, including the processor 4404, may be used to implement any of the methods, functions and techniques disclosed herein. The storage 4406 may be used for storing data that is manipulated by the processor 4404 when executing software, and the software may be configured to implement any one of the methods disclosed herein.

One or more processors 4404 in the processing circuit 4402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 4406 or in an external computer readable medium. The external computer-readable medium and/or storage 4406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 4406 may also include, by way of example, a carrier wave, a transmission line, and any other suitable medium for transmitting software and/or instructions that may be accessed and read by a computer. Computer-readable medium and/or the storage 4406 may reside in the processing circuit 4402, in the processor 4404, external to the processing circuit 4402, or be distributed across multiple entities including the processing circuit 4402. The computer-readable medium and/or storage 4406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 4406 may maintain software maintained and/or organized in loadable code segments, modules, applications, programs, etc., which may be referred to herein as software modules 4416. Each of the software modules 4416 may include instructions and data that, when installed or loaded on the processing circuit 4402 and executed by the one or more processors 4404, contribute to a run-time image 4414 that controls the operation of the one or more processors 4404. When executed, certain instructions may cause the processing circuit 4402 to perform functions in accordance with certain methods, algorithms and processes described herein.

Some of the software modules 4416 may be loaded during initialization of the processing circuit 4402, and these software modules 4416 may configure the processing circuit 4402 to enable performance of the various functions disclosed herein. For example, some software modules 4416 may configure internal devices and/or logic circuits 4422 of the processor 4404, and may manage access to external devices such as the transceiver 4412, the bus interface 4408, the user interface 4418, timers, mathematical coprocessors, and so on. The software modules 4416 may include a control program and/or an operating system that interacts with interrupt handlers and device drivers, and that controls access to various resources provided by the processing circuit 4402. The resources may include memory, processing time, access to the transceiver 4412, the user interface 4418, and so on.

One or more processors 4404 of the processing circuit 4402 may be multifunctional, whereby some of the software modules 4416 are loaded and configured to perform different functions or different instances of the same function. The one or more processors 4404 may additionally be adapted to manage background tasks initiated in response to inputs from the user interface 4418, the transceiver 4412, and device drivers, for example. To support the performance of multiple functions, the one or more processors 4404 may be configured to provide a multitasking environment, whereby each of a plurality of functions is implemented as a set of tasks serviced by the one or more processors 4404 as needed or desired. In one example, the multitasking environment may be implemented using a timesharing program 4420 that passes control of a processor 4404 between different tasks, whereby each task returns control of the one or more processors 4404 to the timesharing program 4420 upon completion of any outstanding operations and/or in response to an input such as an interrupt. When a task has control of the one or more processors 4404, the processing circuit is effectively specialized for the purposes addressed by the function associated with the controlling task. The timesharing program 4420 may include an operating system, a main loop that transfers control on a round-robin basis, a function that allocates control of the one or more processors 4404 in accordance with a prioritization of the functions, and/or an interrupt driven main loop that responds to external events by providing control of the one or more processors 4404 to a handling function.

FIG. 45 is a flowchart 4500 illustrating a method for data communications on a communications link. The method may be performed by a master device in a control data bus such as a CCIe bus. At block 4502, a first inquiry may be transmitted on the control data bus. The first inquiry may include a first configuration of bits.

At block 4504, presence of a slave device may be determined, where the slave device has a slave identifier that includes a second configuration of bits that matches the first configuration of bits.

At block 4506, it may be determined whether the SID of the slave device has been identified. If the SID has been identified, the method may terminate. If the SID has not been identified, the method continues at block 4508.

At block 4508, additional inquiries may be repetitively transmitted on the control data bus with different configurations of bits until all bits of the slave identifier are determined.

In one example, the slave device asserts a response to each inquiry that includes a configuration of bits that matches a corresponding configuration of bits in the slave identifier.

The slave device may identify a match between the first configuration of bits and the second configuration of bits by comparing a word transmitted in the first inquiry with a copy of the slave identifier that has been masked by applying a mask transmitted in the first inquiry. The additional inquiries may include a second inquiry. The mask may be modified to obtain a modified mask that exposes an additional bit of the slave identifier for comparison, and the second inquiry may be transmitted on the control data bus, where the second inquiry includes the first configuration of bits and the modified mask. The additional inquiries may include a third inquiry that is transmitted when no response to a preceding inquiry is received. The first configuration of bits may be modified to obtain a third configuration of bits and the third inquiry may be transmitted on the control data bus, where the third inquiry includes the third configuration of bits and the mask transmitted in the preceding inquiry.

The additional inquiries may include a fourth inquiry that is transmitted after all bits of the slave identifier have been determined. The mask may be restored as a restored mask having a value that was transmitted in a prior inquiry that caused at least one slave device to assert the response. The configuration of bits transmitted in the prior inquiry may be modified to obtain a fourth configuration of bits. The fourth inquiry may be transmitted on the control data bus, where the fourth inquiry includes the fourth configuration of bits and the restored mask.

A different slave device may respond to the fourth inquiry. The different slave device may assert the response when the fourth configuration of bits matches a corresponding configuration of bits in a different slave identifier that is associated with the different slave device.

In some instances, modifying the first configuration of bits includes toggling a value of an effective MSB of the first configuration of bits. The effective MSB may be defined as a bit corresponding to a highest value bit that is not suppressed in the slave identifier by application of the mask.

In some instances, a plurality of slave devices may respond to the first inquiry within a response period defined by the inquiry. The plurality of slave devices may respond by asserting a response when the first configuration of bits matches corresponding configurations of bits in respective slave identifiers of the plurality of slave devices. The response may be asserted, for example, over the control data bus shared by the plurality of slave devices.

In one example, the control data bus is a two-line bus. The first inquiry may be transmitted in response to a power on/reset event or an interrupt generated by the slave device when it is first coupled to the control data bus. The slave device may operate according to a CCIe protocol. The inquiry may be transmitted in a scan command. The scan command may be directed to all slave devices coupled to the control data bus (e.g. an "SID Scan All" command). The scan command may be directed to slave devices coupled to the control data bus that have not been previously identified (e.g. an "SID Scan New" command).

FIG. 46 is a conceptual diagram illustrating an example of a hardware implementation for an apparatus 4600 employing a processing circuit 4602. In this example, the processing circuit 4602 may be implemented with a bus architecture, represented generally by the bus 4616. The bus 4616 may include any number of interconnecting buses and bridges depending on the specific application of the processing circuit 4602 and the overall design constraints. The bus 4616 links together various circuits including one or more processors, represented generally by the processor 4612, and computer-readable media, represented generally by the processor-readable storage medium 4614. The bus 4616 may also link various other circuits such as timing sources, timers, peripherals, voltage regulators, and power management circuits. A bus interface 4618 provides an interface between the bus 4616 and a transceiver 4620. The transceiver 4620 may include a bus interface that provides a means for communicating with various other apparatus over a transmission medium. Depending upon the nature of the apparatus, a user interface 4622 (e.g., keypad, display, speaker, microphone, joystick) may also be provided. One or more clock generation circuits or modules 4624 may be provided within the processing circuit 4602 or controlled by processing circuit 4602 and/or one or more processors 4612. In one example, the clock generation circuits or modules 4624 may include one or more crystal oscillators, one or more phase-locked loop devices, and/or one or more configurable clock trees.

The processor 4612 is responsible for managing the bus 4616 and general processing, including the execution of software stored on the processor-readable storage medium 4614. The software, when executed by the processor 4612, causes the processing circuit 4602 to perform the various functions described supra for any particular apparatus. The processor-readable storage medium 4614 may be used for storing data that is manipulated by the processor 4612 when executing software.

In one configuration, the processing circuit may include modules and/or circuits 4604 that transmit information on a control data bus 4620, such as a CCIe bus. The processing circuit may include one or more modules and/or circuits 4606 configured to modify the mask and/or SID bits transmitted in an inquiry. The processing circuit may include modules and/or circuits 4608 for configuring inquiries and conducting a scan for SIDs using a sequence of inquiries. The processing circuit may include modules and/or circuits 4610 that detects and handles assertions of an IRQ on the IRQ bus, for example. In one example, the modules and/or circuits 4604, 4606, 4608, 4610 and bus interface 4618 may cooperate to transmit a first inquiry on a control data bus, the first inquiry including a first configuration of bits, determine presence of a slave device that has a slave identifier that includes a second configuration of bits that matches the first configuration of bits, and repetitively transmit additional inquiries on the control data bus with different configurations of bits until all bits of the slave identifier are determined. The slave device may assert an interrupt in response to each inquiry that includes a configuration of bits that matches a corresponding configuration of bits in the slave identifier. The slave device may identify a match between the first configuration of bits and the second configuration of bits by comparing a word transmitted in the first inquiry with a copy of the slave identifier that has been masked by applying a mask transmitted in the first inquiry.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, comprising:
    transmitting a first inquiry on a control data bus, wherein the first inquiry includes a first configuration of bits and a mask;

determining a presence of a slave device that has a slave identifier that includes a second configuration of bits that matches the first configuration of bits; and repetitively transmitting additional inquiries on the control data bus with different configurations of bits until all bits of the slave identifier are determined, wherein a response is asserted to each inquiry that includes a configuration of bits that matches a corresponding configuration of bits in the slave identifier, wherein a match between the first configuration of bits and the second configuration of bits is identified by comparing the first configuration of bits transmitted in the first inquiry with a copy of the slave identifier that has been masked by applying the mask transmitted in the first inquiry.

2. The method of claim 1, wherein the additional inquiries include a second inquiry, and further comprising:

modifying the mask to obtain a modified mask that exposes an additional bit of the slave identifier for comparison; and transmitting the second inquiry on the control data bus, wherein the second inquiry includes the first configuration of bits and the modified mask.

3. The method of claim 1, wherein the additional inquiries include a third inquiry that is transmitted when no response to a preceding inquiry is received, and further comprising:

modifying the first configuration of bits to obtain a third configuration of bits by toggling a value of an effective most significant bit (MSB) of the first configuration of bits, wherein the effective MSB is defined as a bit corresponding to a highest value bit that is not suppressed in the slave identifier by application of the mask transmitted in the preceding inquiry;

modifying the mask to obtain a modified mask that exposes an additional bit of the slave identifier for comparison; and transmitting the third inquiry on the control data bus, wherein the third inquiry includes the third configuration of bits and the mask transmitted in the preceding inquiry.

4. The method of claim 1, wherein the additional inquiries include a fourth inquiry that is transmitted after all bits of the slave identifier have been determined, and further comprising:

restoring the mask to obtain a restored mask having a value that was transmitted in a prior inquiry that caused at least one slave device to assert the response;

modifying the configuration of bits transmitted in the prior inquiry to obtain a fourth configuration of bits; and transmitting the fourth inquiry on the control data bus, wherein the fourth inquiry includes the fourth configuration of bits and the restored mask.

5. The method of claim 4, wherein a different slave device responds to the fourth inquiry, wherein the different slave device asserts the response when the fourth configuration of bits matches a corresponding configuration of bits in a different slave identifier that is associated with the different slave device.

6. The method of claim 1, wherein a plurality of slave devices responds to the first inquiry, wherein the plurality of slave devices assert a same response when the first configuration of bits matches corresponding configurations of bits in respective slave identifiers of the plurality of slave devices.

7. The method of claim 6, wherein the response is asserted using a first line of the control data bus.

8. The method of claim 1, wherein the control data bus is a two-line bus, wherein both lines of the two-line bus are used to transfer the first inquiry.

9. The method of claim 1, wherein after all bits of the slave identifier are determined, the method further comprises:

repetitively transmitting additional inquiries on the control data bus with different configurations of bits until all slave identifiers for all slave devices coupled to the control data bus have been determined.

10. The method of claim 1, wherein the first inquiry is directed to all slave devices coupled to the control data bus.

11. The method of claim 1, wherein the first inquiry is directed to slave devices coupled to the control data bus that have not been previously identified.

12. The method of claim 1, wherein the first inquiry defines a response period in which the slave device must respond over the control data bus if there is a match between the second configuration of bits and the first configuration of bits.

13. The method of claim 1, wherein the response is asserted by the slave device momentarily pulling down a first line of the control data bus if there is a match between the second configuration of bits and the first configuration of bits.

14. The method of claim 13, wherein other devices coupled to the control data bus mask their input to the first line of the control data bus during a response period.

15. A device comprising:

a slave device coupled to a control data bus;

a master device coupled to the control data bus and adapted to manage communications on the control data bus, and configured to:

transmit a first inquiry on the control data bus, wherein the first inquiry includes a first configuration of bits and a mask;

determine presence of a slave device that has a slave identifier that includes a second configuration of bits that matches the first configuration of bits; and repetitively transit additional inquiries on the control data bus with different configurations of bits until all bits of the slave identifier are determined, wherein a response is asserted to each inquiry that includes a configuration of bits that matches a corresponding configuration of bits in the slave identifier, wherein a match between the first configuration of bits and the second configuration of bits is identified by comparing the first configuration of bits transmitted in the first inquiry with a copy of the slave identifier that has been masked by applying the mask transmitted in the first inquiry.

16. The device of claim 15, wherein the additional inquiries include a second inquiry, wherein the master device is further configured to:

modify the mask to obtain a modified mask that exposes an additional bit of the slave identifier for comparison; and transmit the second inquiry on the control data bus, wherein the second inquiry includes the first configuration of bits and the modified mask.

17. The device of claim 15, wherein the additional inquiries include a third inquiry that is transmitted when no response to a preceding inquiry is received, and wherein the master device is further configured to:

modify the first configuration of bits to obtain a third configuration of bits by toggling a value of an effective most significant bit (MSB) of the first configuration of bits, wherein the effective MSB is defined as a bit corresponding to a highest value bit that is not suppressed in the slave identifier by application of the mask transmitted in the preceding inquiry;
modify the mask to obtain a modified mask that exposes an additional bit of the slave identifier for comparison; and
transmit the third inquiry on the control data bus, wherein the third inquiry includes the third configuration of bits and the mask transmitted in the preceding inquiry.

18. The device of claim 15, wherein the additional inquiries include a fourth inquiry that is transmitted after all bits of the slave identifier have been determined, and wherein the master device is further configured to:
restore the mask to obtain a restored mask having a value that was transmitted in a prior inquiry that caused at least one slave device to assert the response;
modify the configuration of bits transmitted in the prior inquiry to obtain a fourth configuration of bits; and
transmit the fourth inquiry on the control data bus, wherein the fourth inquiry includes the fourth configuration of bits and the restored mask,
wherein a different slave device responds to the fourth inquiry, wherein the different slave device responds by asserting the response when the fourth configuration of bits matches a corresponding configuration of bits in a different slave identifier that is associated with the different slave device.

19. The device of claim 15, wherein a plurality of slave devices responds to the first inquiry, wherein the plurality of slave devices responds by asserting the response when the first configuration of bits matches corresponding configurations of bits in respective slave identifiers of the plurality of slave devices.

20. The device of claim 15, wherein the first inquiry defines a response period in which the slave device must respond over the control data bus if there is a match between the second configuration of bits and the first configuration of bits.

21. The device of claim 15, wherein the response is asserted by the slave device momentarily pulling down a first line of the control data bus if there is a match between the second configuration of bits and the first configuration of bits.

22. The device of claim 21, wherein other devices coupled to the control data bus mask their input to the first line of the control data bus during a response period.

23. A device, comprising:
means for transmitting a first inquiry on a control data bus, wherein the first inquiry includes a first configuration of bits; and
means for determining presence of a slave device that has a slave identifier that includes a second configuration of bits that matches the first configuration of bits,
wherein the means for transmitting is configured to repetitively transmit additional inquiries on the control data bus with different configurations of bits until all bits of the slave identifier are determined,
wherein a response is asserted to each inquiry that includes a configuration of bits that matches a corresponding configuration of bits in the slave identifier,
wherein a match between the first configuration of bits and the second configuration of bits is identified by comparing a word transmitted in the first inquiry with a copy of the slave identifier that has been masked by applying a mask transmitted in the first inquiry.

24. The device of claim 23, wherein the additional inquiries include a second inquiry, and further comprising:
means for modifying the mask to obtain a modified mask that exposes an additional bit of the slave identifier for comparison; and
means for transmitting the second inquiry on the control data bus, wherein the second inquiry includes the first configuration of bits and the modified mask.

25. The device of claim 23, wherein the additional inquiries include a third inquiry that is transmitted when no response to a preceding inquiry is received, and further comprising:
means for modifying the first configuration of bits to obtain a third configuration of bits by toggling a value of an effective most significant bit (MSB) of the first configuration of bits, wherein the effective MSB is defined as a bit corresponding to a highest value bit that is not suppressed in the slave identifier by application of the mask transmitted in the preceding inquiry;
means for modifying the mask to obtain a modified mask that exposes an additional bit of the slave identifier for comparison; and
means for transmitting the third inquiry on the control data bus, wherein the third inquiry includes the third configuration of bits and the mask transmitted in the preceding inquiry.

26. The device of claim 23, wherein a plurality of slave devices responds to the first inquiry, the plurality of slave devices asserts the response when the first configuration of bits matches corresponding configurations of bits in respective slave identifiers of the plurality of slave devices, and the response is asserted over the control data bus shared by a plurality of slaves devices and within a response period defined by the first inquiry.

27. A non-transitory machine-readable storage medium having one or more instructions stored thereon, which when executed by at least one processor causes the at least one processor to:
transmit a first inquiry on a control data bus, wherein the first inquiry includes a first configuration of bits;
determine presence of a slave device that has a slave identifier that includes a second configuration of bits that matches the first configuration of bits; and
repetitively transmit additional inquiries on the control data bus with different configurations of bits until all bits of the slave identifier are determined,
wherein a response is asserted to each inquiry that includes a configuration of bits that matches a corresponding configuration of bits in the slave identifier,
wherein a match between the first configuration of bits and the second configuration of bits is identified by comparing a word transmitted in the first inquiry with a copy of the slave identifier that has been masked by applying a mask transmitted in the first inquiry.

28. The non-transitory machine-readable storage medium of claim 27, wherein a plurality of slave devices responds to the first inquiry, wherein the plurality of slave devices asserts the response when the first configuration of bits matches corresponding configurations of bits in respective slave identifiers of the plurality of slave devices, and wherein the response is asserted over the control data bus shared by the plurality of slaves devices and within a response period defined by the first inquiry.

* * * * *